United States Patent
Templeton et al.

(10) Patent No.: US 9,576,159 B1
(45) Date of Patent: *Feb. 21, 2017

(54) MULTIPLE PAYMENT CARD READER SYSTEM

(71) Applicant: Square, Inc., San Francisco, CA (US)

(72) Inventors: Thomas Templeton, San Francisco, CA (US); Michael C. Lamfalusi, Cupertino, CA (US); Jeremy Wade, San Francisco, CA (US); James McKelvey, Miami, FL (US); Jesse Dorogusker, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,104

(22) Filed: Oct. 10, 2014

Related U.S. Application Data

(63) Continuation-in-part of application No. 14/012,655, filed on Aug. 28, 2013, now abandoned, which is a continuation of application No. 13/043,203, filed on Mar. 8, 2011, now Pat. No. 8,573,487, which is a continuation-in-part of application No. 13/012,495, filed on Jan. 24, 2011, now Pat. No. 8,500,018.

(60) Provisional application No. 62/000,479, filed on May 19, 2014.

(51) Int. Cl.
*G06K 7/08* (2006.01)
*G06K 7/00* (2006.01)

(52) U.S. Cl.
CPC .............. *G06K 7/0004* (2013.01); *G06K 7/087* (2013.01)

(58) Field of Classification Search
CPC ............ G06Q 20/327; G06Q 20/3227; G06Q 20/322; G06Q 20/353; G06K 7/08; G06K 7/082; G06K 7/089; G07F 7/0873; G07F 7/0886; G07F 7/0893
USPC ....... 235/375, 380, 381, 435, 439, 440, 486, 235/492
See application file for complete search history.

(56) References Cited

U.S. PATENT DOCUMENTS

| | | |
|---|---|---|
| 3,854,036 A | 12/1974 | Gupta |
| 4,035,614 A | 7/1977 | Frattarola et al. |
| 4,254,441 A | 3/1981 | Fisher |

(Continued)

FOREIGN PATENT DOCUMENTS

| | | |
|---|---|---|
| CA | 2 812 251 A1 | 4/2012 |
| CA | 2 920 589 A1 | 8/2016 |

(Continued)

OTHER PUBLICATIONS

Non-Final Office Action mailed Sep. 11, 2014, for U.S. Appl. No. 13/298,510, of Lamba, K. et al., filed Nov. 17, 2011.

(Continued)

*Primary Examiner* — Thien M Le
*Assistant Examiner* — April Taylor
(74) *Attorney, Agent, or Firm* — Polsinelli PC

(57) ABSTRACT

Approaches provide for a mobile point-of-sale system configured to facilitate the transfer of funds between entities (e.g., customers and merchants). A card reader can include two different types of slots configured for conducting a financial transaction between entities. A first slot can allow for a magnetic stripe element of a card to be swiped. A second slot can include contact elements which allow the card to be "dipped in". In this way, the device can receive a (Continued)

swipe and/or a "dipping" of a card into a respective slot for conducting a financial transaction.

18 Claims, 48 Drawing Sheets

(56) References Cited

U.S. PATENT DOCUMENTS

| | | | |
|---|---|---|---|
| 4,591,937 A | 5/1986 | Nakarai et al. | |
| 4,609,957 A | 9/1986 | Gentet et al. | |
| 4,727,544 A | 2/1988 | Brunner et al. | |
| 4,788,420 A | 11/1988 | Chang et al. | |
| 4,845,740 A | 7/1989 | Tokuyama et al. | |
| 5,173,597 A | 12/1992 | Anglin | |
| 5,266,789 A | 11/1993 | Anglin et al. | |
| 5,406,627 A | 4/1995 | Thompson et al. | |
| 5,434,395 A * | 7/1995 | Storck et al. | 235/380 |
| 5,434,400 A | 7/1995 | Scherzer | |
| 5,463,678 A | 10/1995 | Kepley, III et al. | |
| 5,589,855 A | 12/1996 | Blumstein et al. | |
| 5,603,078 A | 2/1997 | Henderson et al. | |
| 5,616,904 A | 4/1997 | Fernadez | |
| 5,679,943 A | 10/1997 | Schultz et al. | |
| 5,729,591 A | 3/1998 | Bailey | |
| 5,764,742 A | 6/1998 | Howard et al. | |
| 5,850,599 A | 12/1998 | Seiderman | |
| 5,878,337 A | 3/1999 | Joao et al. | |
| 5,907,801 A | 5/1999 | Albert et al. | |
| 5,945,654 A | 8/1999 | Huang | |
| 5,991,410 A | 11/1999 | Albert et al. | |
| 5,991,749 A | 11/1999 | Morrill, Jr. | |
| D417,442 S | 12/1999 | Butts et al. | |
| 6,006,109 A | 12/1999 | Shin | |
| 6,010,067 A | 1/2000 | Elbaum | |
| 6,021,944 A | 2/2000 | Arakaki | |
| 6,032,859 A | 3/2000 | Hughes et al. | |
| 6,061,666 A | 5/2000 | Do et al. | |
| 6,129,277 A | 10/2000 | Grant et al. | |
| 6,234,389 B1 | 5/2001 | Valliani et al. | |
| 6,308,227 B1 | 10/2001 | Kumar et al. | |
| 6,363,139 B1 | 3/2002 | Zurek et al. | |
| 6,400,517 B1 | 6/2002 | Murao | |
| 6,431,445 B1 | 8/2002 | Deland et al. | |
| 6,476,743 B1 | 11/2002 | Brown et al. | |
| 6,481,623 B1 | 11/2002 | Grant et al. | |
| 6,497,368 B1 | 12/2002 | Friend et al. | |
| 6,536,670 B1 | 3/2003 | Postman et al. | |
| D477,321 S | 7/2003 | Baughman | |
| 6,612,488 B2 | 9/2003 | Suzuki | |
| 6,813,608 B1 | 11/2004 | Baranowski | |
| 6,832,721 B2 | 12/2004 | Fujll | |
| 6,850,147 B2 | 2/2005 | Prokoski et al. | |
| 6,868,391 B1 | 3/2005 | Hultgren | |
| 6,896,182 B2 | 5/2005 | Sakaguchi | |
| 6,944,782 B2 | 9/2005 | von Mueller et al. | |
| 6,979,231 B2 | 12/2005 | Shinohara | |
| 7,003,316 B1 | 2/2006 | Elias et al. | |
| 7,013,149 B2 | 3/2006 | Vetro et al. | |
| 7,149,296 B2 | 12/2006 | Brown et al. | |
| 7,167,711 B1 | 1/2007 | Dennis | |
| 7,252,232 B2 | 8/2007 | Fernandes et al. | |
| 7,309,012 B2 | 12/2007 | Von Mueller et al. | |
| 7,324,836 B2 | 1/2008 | Steenstra et al. | |
| 7,363,054 B2 | 4/2008 | Elias et al. | |
| D575,056 S | 8/2008 | Tan | |
| 7,409,234 B2 | 8/2008 | Glezerman | |
| 7,424,732 B2 * | 9/2008 | Matsumoto et al. | 726/2 |
| 7,433,452 B2 | 10/2008 | Taylor et al. | |
| 7,505,762 B2 | 3/2009 | Onyon et al. | |
| 7,506,812 B2 | 3/2009 | von Mueller et al. | |
| D590,828 S | 4/2009 | Sherrod et al. | |
| 7,520,430 B1 | 4/2009 | Stewart et al. | |
| 7,581,678 B2 | 9/2009 | Narendra et al. | |
| 7,600,673 B2 | 10/2009 | Stoutenburg et al. | |
| D607,000 S | 12/2009 | Cheng et al. | |
| 7,668,308 B1 | 2/2010 | Wurtz | |
| 7,703,676 B2 | 4/2010 | Hart et al. | |
| 7,708,189 B1 | 5/2010 | Cipriano | |
| 7,757,953 B2 | 7/2010 | Hart et al. | |
| 7,793,834 B2 | 9/2010 | Hachey et al. | |
| 7,810,729 B2 | 10/2010 | Morley, Jr. | |
| 7,869,591 B1 | 1/2011 | Nagel et al. | |
| 7,945,494 B2 | 5/2011 | Williams | |
| 8,011,587 B2 | 9/2011 | Johnson et al. | |
| 8,015,070 B2 | 9/2011 | Sinha et al. | |
| D646,264 S | 10/2011 | Dong | |
| D653,664 S | 2/2012 | Turnbull et al. | |
| 8,132,670 B1 | 3/2012 | Chen | |
| 8,231,055 B2 | 7/2012 | Wen | |
| 8,297,507 B2 | 10/2012 | Kayani | |
| 8,302,860 B2 | 11/2012 | McKelvey | |
| 8,336,771 B2 | 12/2012 | Tsai et al. | |
| D675,618 S | 2/2013 | Behar et al. | |
| 8,376,239 B1 | 2/2013 | Humphrey | |
| D677,667 S | 3/2013 | Smith et al. | |
| D679,714 S | 4/2013 | Smith et al. | |
| D680,537 S | 4/2013 | Miller et al. | |
| 8,413,901 B2 | 4/2013 | Wen | |
| 8,452,004 B2 | 5/2013 | Lee | |
| D686,208 S | 7/2013 | Miller et al. | |
| 8,500,010 B1 | 8/2013 | Marcus et al. | |
| 8,560,823 B1 | 10/2013 | Aytek et al. | |
| 8,571,989 B2 | 10/2013 | Dorsey et al. | |
| 8,573,487 B2 | 11/2013 | McKelvey | |
| 8,573,489 B2 | 11/2013 | Dorsey et al. | |
| 8,584,946 B2 | 11/2013 | Morley, Jr. | |
| 8,584,956 B2 | 11/2013 | Wilson et al. | |
| 8,602,305 B2 | 12/2013 | Dorsey et al. | |
| 8,612,352 B2 | 12/2013 | Dorsey et al. | |
| 8,615,445 B2 | 12/2013 | Dorsey et al. | |
| 8,640,953 B2 | 2/2014 | Dorsey et al. | |
| D700,606 S | 3/2014 | Lo | |
| 8,662,389 B2 | 3/2014 | Dorsey et al. | |
| 8,678,277 B2 | 3/2014 | Dorsey et al. | |
| D703,211 S | 4/2014 | Weller et al. | |
| 8,701,996 B2 | 4/2014 | Dorsey et al. | |
| 8,701,997 B2 | 4/2014 | Dorsey et al. | |
| D706,266 S | 6/2014 | Rotsaert | |
| 8,740,072 B1 * | 6/2014 | Dorogusker | G06K 7/06 235/380 |
| 8,763,900 B2 | 7/2014 | Marcus et al. | |
| D711,876 S | 8/2014 | McWilliam et al. | |
| 8,794,517 B1 | 8/2014 | Templeton et al. | |
| D712,892 S | 9/2014 | Hong et al. | |
| 8,820,650 B2 | 9/2014 | Wilson et al. | |
| 8,840,017 B2 | 9/2014 | Chan et al. | |
| 8,870,070 B2 | 10/2014 | McKelvey et al. | |
| 8,870,071 B2 | 10/2014 | McKelvey | |
| 8,876,003 B2 | 11/2014 | McKelvey | |
| 8,910,868 B1 | 12/2014 | Wade et al. | |
| 8,931,699 B1 | 1/2015 | Wade et al. | |
| D724,094 S | 3/2015 | Blochinger et al. | |
| D725,655 S | 3/2015 | Debaigue et al. | |
| 8,967,465 B1 | 3/2015 | Wade et al. | |
| D726,171 S | 4/2015 | Edwards | |
| 9,016,570 B1 * | 4/2015 | Gluck | G06Q 20/352 235/435 |
| 9,016,572 B2 | 4/2015 | Babu et al. | |
| D728,549 S | 5/2015 | Su et al. | |
| D728,568 S | 5/2015 | Debaigue et al. | |
| D731,493 S | 6/2015 | Mills | |
| 9,063,737 B2 * | 6/2015 | Babu | G06F 1/3287 |
| D740,820 S | 10/2015 | Templeton et al. | |
| 9,218,517 B2 | 12/2015 | Morley, Jr. | |
| 9,237,401 B2 | 1/2016 | Modi et al. | |
| 9,256,769 B1 | 2/2016 | Lamfalusi et al. | |
| 9,256,770 B1 | 2/2016 | Edwards | |
| 9,355,285 B1 | 5/2016 | Wade et al. | |
| D762,651 S | 8/2016 | Edwards et al. | |
| 2001/0001856 A1 | 5/2001 | Gould et al. | |
| 2002/0002507 A1 | 1/2002 | Hatakeyama | |
| 2002/0017568 A1 | 2/2002 | Grant et al. | |
| 2002/0030871 A1 | 3/2002 | Anderson et al. | |
| 2002/0073304 A1 | 6/2002 | Marsh et al. | |

(56) References Cited

U.S. PATENT DOCUMENTS

| | | |
|---|---|---|
| 2002/0077974 A1 | 6/2002 | Ortiz |
| 2002/0099648 A1 | 7/2002 | DeVoe et al. |
| 2002/0108062 A1 | 8/2002 | Nakajima et al. |
| 2002/0165462 A1 | 11/2002 | Westbrook et al. |
| 2002/0169541 A1 | 11/2002 | Bouve et al. |
| 2002/0188535 A1 | 12/2002 | Chao et al. |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2004/0011650 A1 | 1/2004 | Zenhausern et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0058705 A1 | 3/2004 | Morgan et al. |
| 2004/0087339 A1 | 5/2004 | Goldthwaite et al. |
| 2004/0093496 A1 | 5/2004 | Colnot |
| 2004/0104268 A1 | 6/2004 | Bailey |
| 2004/0127256 A1 | 7/2004 | Goldthwaite et al. |
| 2004/0128256 A1 | 7/2004 | Dhanjal et al. |
| 2004/0151026 A1 | 8/2004 | Naso et al. |
| 2004/0178326 A1 | 9/2004 | Hamilton et al. |
| 2004/0204074 A1 | 10/2004 | Desai |
| 2004/0204082 A1 | 10/2004 | Abeyta |
| 2004/0230489 A1 | 11/2004 | Goldthwaite et al. |
| 2004/0230526 A1 | 11/2004 | Praisner |
| 2005/0009004 A1 | 1/2005 | Xu et al. |
| 2005/0010702 A1 | 1/2005 | Saito et al. |
| 2005/0023348 A1 | 2/2005 | Lucas et al. |
| 2005/0077870 A1 | 4/2005 | Ha et al. |
| 2005/0156037 A1 | 7/2005 | Wurzburg |
| 2005/0156038 A1 | 7/2005 | Wurzburg |
| 2005/0164631 A1 | 7/2005 | Jin |
| 2005/0194452 A1 | 9/2005 | Nordentoft et al. |
| 2005/0209719 A1 | 9/2005 | Beckert et al. |
| 2005/0219728 A1 | 10/2005 | Durbin et al. |
| 2005/0236480 A1 | 10/2005 | Vrotsos et al. |
| 2005/0242173 A1 | 11/2005 | Suzuki |
| 2005/0247787 A1 | 11/2005 | Von Mueller et al. |
| 2006/0000917 A1 | 1/2006 | Kim et al. |
| 2006/0049255 A1 | 3/2006 | Von Mueller et al. |
| 2006/0094481 A1 | 5/2006 | Gullickson |
| 2006/0122902 A1 | 6/2006 | Petrov et al. |
| 2006/0152276 A1 | 7/2006 | Barksdale |
| 2006/0208066 A1 | 9/2006 | Finn et al. |
| 2006/0219776 A1* | 10/2006 | Finn ............................ 235/380 |
| 2006/0223580 A1 | 10/2006 | Antonio et al. |
| 2006/0234771 A1 | 10/2006 | Shavrov |
| 2006/0273158 A1 | 12/2006 | Suzuki |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0124211 A1 | 5/2007 | Smith |
| 2007/0155430 A1 | 7/2007 | Cheon et al. |
| 2007/0174080 A1 | 7/2007 | Outwater |
| 2007/0201492 A1 | 8/2007 | Kobayashi |
| 2007/0221728 A1 | 9/2007 | Ferro et al. |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255643 A1 | 11/2007 | Capuano et al. |
| 2007/0255653 A1 | 11/2007 | Tumminaro et al. |
| 2007/0287498 A1 | 12/2007 | Wang et al. |
| 2008/0011850 A1* | 1/2008 | Henry ................. G06K 7/0004 235/441 |
| 2008/0017712 A1 | 1/2008 | Hart et al. |
| 2008/0027815 A1 | 1/2008 | Johnson et al. |
| 2008/0040265 A1 | 2/2008 | Rackley, III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0103972 A1 | 5/2008 | Lanc |
| 2008/0147564 A1 | 6/2008 | Singhal |
| 2008/0172306 A1 | 7/2008 | Schorr et al. |
| 2008/0177662 A1 | 7/2008 | Smith et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2008/0294766 A1 | 11/2008 | Wang et al. |
| 2009/0048978 A1 | 2/2009 | Ginter et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0125429 A1 | 5/2009 | Takayama |
| 2009/0144161 A1 | 6/2009 | Fisher |
| 2009/0159681 A1 | 6/2009 | Mullen et al. |
| 2009/0166422 A1 | 7/2009 | Biskupski |
| 2009/0180354 A1 | 7/2009 | Sander et al. |
| 2009/0187492 A1 | 7/2009 | Hammad et al. |
| 2010/0063893 A1 | 3/2010 | Townsend |
| 2010/0108762 A1 | 5/2010 | Morley, Jr. |
| 2010/0127857 A1 | 5/2010 | Kilmurray et al. |
| 2010/0128900 A1 | 5/2010 | Johnson |
| 2010/0184479 A1 | 7/2010 | Griffin, Jr. |
| 2010/0222000 A1 | 9/2010 | Sauer et al. |
| 2010/0241838 A1 | 9/2010 | Cohen et al. |
| 2010/0243732 A1 | 9/2010 | Wallner |
| 2010/0260341 A1 | 10/2010 | Sander et al. |
| 2010/0289390 A1 | 11/2010 | Kenney |
| 2010/0314446 A1 | 12/2010 | Morley, Jr. |
| 2011/0033910 A1 | 2/2011 | Yamanaka et al. |
| 2011/0053560 A1 | 3/2011 | Jain et al. |
| 2011/0062235 A1 | 3/2011 | Morley, Jr. |
| 2011/0084131 A1 | 4/2011 | McKelvey |
| 2011/0084139 A1 | 4/2011 | McKelvey et al. |
| 2011/0084140 A1 | 4/2011 | Wen |
| 2011/0137803 A1 | 6/2011 | Willins |
| 2011/0161235 A1 | 6/2011 | Beenau et al. |
| 2011/0165896 A1 | 7/2011 | Stromberg et al. |
| 2011/0174879 A1 | 7/2011 | Morley, Jr. |
| 2011/0180601 A1 | 7/2011 | Morley, Jr. |
| 2011/0191196 A1 | 8/2011 | Orr et al. |
| 2011/0198395 A1 | 8/2011 | Chen |
| 2011/0202463 A1 | 8/2011 | Powell |
| 2011/0258120 A1 | 10/2011 | Weiss |
| 2011/0313880 A1 | 12/2011 | Paul et al. |
| 2012/0008851 A1 | 1/2012 | Pennock et al. |
| 2012/0011024 A1 | 1/2012 | Dorsey et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0026018 A1 | 2/2012 | Lin |
| 2012/0052910 A1 | 3/2012 | Mu et al. |
| 2012/0095869 A1 | 4/2012 | McKelvey |
| 2012/0095870 A1 | 4/2012 | McKelvey |
| 2012/0097739 A1 | 4/2012 | Babu et al. |
| 2012/0097740 A1 | 4/2012 | Lamba et al. |
| 2012/0118956 A1 | 5/2012 | Lamba |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0154561 A1 | 6/2012 | Chari |
| 2012/0168505 A1 | 7/2012 | Sather et al. |
| 2012/0234918 A1 | 9/2012 | Lindsay |
| 2012/0246074 A1 | 9/2012 | Annamalai et al. |
| 2012/0259651 A1 | 10/2012 | Mallon et al. |
| 2012/0270528 A1 | 10/2012 | Goodman |
| 2013/0021046 A1 | 1/2013 | Prentice et al. |
| 2013/0031003 A1 | 1/2013 | Dorsey et al. |
| 2013/0031004 A1 | 1/2013 | Dorsey et al. |

(56) References Cited

U.S. PATENT DOCUMENTS

| | | | |
|---|---|---|---|
| 2013/0087614 A1 | 4/2013 | Limtao et al. | |
| 2013/0137367 A1 | 5/2013 | Fisher | |
| 2013/0200147 A1 | 8/2013 | Dorsey et al. | |
| 2013/0200148 A1 | 8/2013 | Dorsey et al. | |
| 2013/0200149 A1 | 8/2013 | Dorsey et al. | |
| 2013/0200153 A1 | 8/2013 | Dorsey et al. | |
| 2013/0200154 A1 | 8/2013 | Dorsey et al. | |
| 2013/0204788 A1 | 8/2013 | Dorsey et al. | |
| 2013/0204791 A1 | 8/2013 | Dorsey et al. | |
| 2013/0204792 A1 | 8/2013 | Dorsey et al. | |
| 2013/0207481 A1 | 8/2013 | Gobburu et al. | |
| 2013/0254117 A1 | 9/2013 | von Mueller et al. | |
| 2013/0254118 A1 | 9/2013 | Dorsey et al. | |
| 2013/0290762 A1 | 10/2013 | Pawar | |
| 2013/0304244 A1 | 11/2013 | Ojanpera | |
| 2013/0320089 A1 | 12/2013 | Marcus et al. | |
| 2014/0001257 A1 | 1/2014 | Dorsey et al. | |
| 2014/0001263 A1 | 1/2014 | Babu et al. | |
| 2014/0017955 A1 | 1/2014 | Lo et al. | |
| 2014/0018016 A1 | 1/2014 | Chang et al. | |
| 2014/0061301 A1 | 3/2014 | Cho et al. | |
| 2014/0076964 A1 | 3/2014 | Morley, Jr. | |
| 2014/0089205 A1 | 3/2014 | Kapur et al. | |
| 2014/0097242 A1 | 4/2014 | McKelvey | |
| 2014/0124576 A1 | 5/2014 | Zhou | |
| 2014/0131442 A1 | 5/2014 | Morrow et al. | |
| 2014/0144983 A1 | 5/2014 | Dorsey et al. | |
| 2014/0203082 A1* | 7/2014 | Huh | 235/440 |
| 2014/0258132 A1 | 9/2014 | Swamy et al. | |
| 2014/0265642 A1 | 9/2014 | Utley et al. | |
| 2014/0295761 A1 | 10/2014 | Lo | |
| 2014/0297539 A1 | 10/2014 | Swamy et al. | |
| 2015/0078560 A1 | 3/2015 | Ilango et al. | |
| 2015/0149992 A1 | 5/2015 | Wade et al. | |
| 2015/0161419 A1 | 6/2015 | Wade et al. | |
| 2015/0199677 A1 | 7/2015 | Wade et al. | |
| 2016/0070940 A1 | 3/2016 | Lamba et al. | |
| 2016/0132703 A1 | 5/2016 | Lamfalusi et al. | |
| 2016/0188915 A1 | 6/2016 | Babu et al. | |
| 2016/0203466 A1 | 7/2016 | Lamba et al. | |
| 2016/0203667 A1 | 7/2016 | Lamba et al. | |
| 2016/0239691 A1 | 8/2016 | Wade et al. | |

FOREIGN PATENT DOCUMENTS

| | | |
|---|---|---|
| CN | 302341093 S | 3/2013 |
| CN | 302526592 S | 8/2013 |
| EP | 1 145 766 A2 | 10/2001 |
| EP | 2 693 298 A2 | 2/2014 |
| HK | 1211124 A1 | 5/2016 |
| JP | 2001-313714 A | 11/2001 |
| JP | 2003-108777 A | 4/2003 |
| JP | 2004-078662 A | 3/2004 |
| JP | 2005-063869 A | 3/2005 |
| JP | 2005-242550 A | 9/2005 |
| JP | 2005-269172 A | 9/2005 |
| JP | 2009-199649 A | 9/2009 |
| JP | 2013-518344 A | 5/2013 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 02/084548 A1 | 10/2002 |
| WO | 2007/070592 A2 | 6/2007 |
| WO | 2009/128483 A1 | 10/2009 |
| WO | 2010/097711 A2 | 9/2010 |
| WO | 2010/111130 | 9/2010 |
| WO | 2010/135174 A1 | 11/2010 |
| WO | 2013/009891 A1 | 1/2013 |

OTHER PUBLICATIONS

Final Office Action mailed May 6, 2015, for U.S. Appl. No. 13/298,510, of Lamba, K. et al., filed Nov. 17, 2011.
Final Office Action mailed Jul. 9, 2012 for U.S. Appl. No. 13/005,822, of McKelvey, J., et al., filed Jan. 13, 2011.
Non-Final Office Action mailed Jun. 18, 2013, for U.S. Appl. No. 13/005,822, of McKelvey, J., et al., filed Jan. 13, 2011.
Non-Final Office Action mailed Dec. 10, 2013, for U.S. Appl. No. 13/005,822 of McKelvey, J., et al., filed Jan. 13, 2011.
Non-Final Office Action mailed Oct. 7, 2011, for U.S. Appl. No. 13/043,258, of McKelvey, J., filed Mar. 8, 2011.
Final Office Action mailed Jul. 13, 2012 for U.S. Appl. No. 13/043,258, of McKelvey, J., filed Mar. 8, 2011.
Non-Final Office Action mailed Dec. 11, 2013, for U.S. Appl. No. 13/043,258, of McKelvey, J., filed Mar. 8, 2011.
Notice of Allowance mailed Jul. 1, 2014, for U.S. Appl. No. 13/043,258, of McKelvey, J., filed Mar. 8, 2011.
Advisory Action mailed Aug. 15, 2012 for U.S. Appl. No. 13/043,258, of McKelvey, J., filed Mar. 8, 2011.
Advisory Action mailed Aug. 17, 2012 for U.S. Appl. No. 13/005,822, of McKelvey, J.,et al., filed Jan. 13, 2011.
Notice of Allowance mailed Jun. 24, 2014, for U.S. Appl. No. 13/005,822, of McKelvey, J., et al., filed Jan. 13, 2011.
Non-Final Office Action mailed Oct. 7, 2014, for U.S. Appl. No. 13/298,534, of Lamba, K., et al., filed Nov. 17, 2011.
Final Office Action mailed Apr. 8, 2015, for U.S. Appl. No. 13/298,534, of Lamba, K., et al., filed Nov. 17, 2011.
Final Office Action mailed Sep. 6, 2013, for U.S. Appl. No. 13/298,560, of Lamba K. et al., filed Nov. 17, 2011.
Advisory Action mailed Oct. 21, 2013, for U.S. Appl. No. 13/298,560 of Lamba K. et al., filed Nov. 17, 2011.
Final Office Action mailed Aug. 15, 2013, for U.S. Appl. No. 13/043,263, of McKelvey, J., filed Mar. 8, 2011.
Advisory Action mailed Nov. 8, 2013, for U.S. Appl. No. 13/043,263, of McKelvey, J., filed Mar. 8, 2011.
Non-Final Office Action mailed Feb. 24, 2014, for U.S. Appl. No. 13/043,263, of McKelvey, J., filed Mar. 8, 2011.
Notice of Allowance mailed Jul. 15, 2014, for U.S. Appl. No. 13/043,263, of McKelvey, J., filed Mar. 8, 2011.
Non-Final Office Action mailed Jul. 22, 2014, for U.S. Appl. No. 13/298,560, of Lamba K. et al., filed Nov. 17, 2011.
Final Office Action mailed Jan. 28, 2015, for U.S. Appl. No. 13/298,560, of Lamba K. et al., filed Nov. 17, 2011.
Non-Final Office Action mailed Oct. 11, 2011, for U.S. Appl. No. 13/043,203, of McKelvey. J., et al., filed Mar. 8, 2011.
Final Office Action mailed Jul. 6, 2012 for U.S. Appl. No. 13/043,203, of McKelvey. J., et al., filed Mar. 8, 2011.
Non-Final office Action mailed Oct. 11, 2011, for U.S. Appl. No. 13/043,263, of McKelvey, J., filed Mar. 8, 2011.
Advisory Action mailed Aug. 1, 2012, for U.S. Appl. No. 13/043,203, of McKelvey, J., filed Mar. 8, 2011.
Advisory Action mailed Aug. 16, 2012, for U.S. Appl. No. 13/043,263, of McKelvey, J., filed Mar. 8, 2011.
Non-Final Office Action mailed Apr. 29, 2013, for U.S. Appl. No. 13/043,263, of McKelvey, J., filed Mar. 8, 2011.
Non-Final office Action mailed Apr. 30, 2013, for U.S. Appl. No. 13/043,203, of McKelvey, J., filed Mar. 8, 2011.
Non-Final Office Action mailed May 28, 2013, for U.S. Appl. No. 13/298,560, of Lamba K. et al., filed Nov. 17, 2011.
Notice of Allowance mailed Jul. 9, 2013, for U.S. Appl. No. 13/043,203, of McKelvey, J., filed Mar. 8, 2011.
Non-Final Office Action mailed Jul. 6, 2015, for U.S. Appl. No. 13/298,534, of Lamba K. et al., filed Nov. 17, 2011.
Advisory Action mailed Apr. 9, 2015, for U.S. Appl. No. 13/298,560, of Lamba K. et al., filed Nov. 17, 2011.
Final office Action mailed Jul. 9, 2012 for U.S. Appl. No. 13/043,263, of McKelvey, J., filed Mar. 8, 2011.
Non-Final Office Action mailed Jul. 16, 2015, for U.S. Appl. No. 13/298,560, of Lamba K. et al., filed Nov. 17, 2011.
Application for Registration of an Industrial Design Examiner's Report for Canadian Design Application No. 159528, mailed Jun. 11, 2015.
English-language translation of Notice of Reasons for Rejection for Japanese Application No. 2014-0255525, mailed Mar. 31, 2015.
Certificate of Registration of Design for Indian Design Application No. 267386 mailed Nov. 14, 2014 (Registration No. 39149).

(56) References Cited

OTHER PUBLICATIONS

Non-Final Office Action mailed Jul. 27, 2015, for U.S. Appl. No. 29/493,212, of Edwards, T., et al., filed Jun. 6, 2014.
English-language translation of Decision of Final Rejection for Japanese Patent Application No. 2013-533897, mailed Feb. 23, 2015.
English-language translation of Office Action for Japanese Patent Application No. 2013-533897, mailed Jun. 5, 2014.
English-language translation of Search Report for Japanese Patent Application No. 2013-533897, mailed Apr. 14, 2014.
Certificate of Design Registration for European Patent Application No. 002578674, mailed Nov. 14, 2014 (Registration No. 002578674-0001).
Notice of Allowance mailed Sep. 2, 2015, for U.S. Appl. No. 14/578,107, of Wade, J. et al., filed Dec. 19, 2014.
Non-Final Office Action mailed Nov. 21, 2013, for U.S. Appl. No. 14/052,009, of Wilson, M., et al., filed Oct. 11, 2013.
Non-Final Office Action mailed Jul. 19, 2012 for U.S. Appl. No. 12/903,758, of Wilson, M., et al., filed Oct. 13, 2010.
"Reading magnetic cards (almost) for free," Lekernel's Scrapbook, ("Lekernel"), Jan. 26, 2009, Retrieved from the Internet URL: http://lekernel.net/blog/?p=12, on May 5, 2011, pp. 1-2.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
Padilla, L, "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Padilla, L., "Magnetic stripe reader circuit," Jan. 28, 1997, Retrieved from the Internet URL: http://www.gae.ucm.es/~padilla/extraworkImagamp.html, on May 5, 2011, pp. 1-7.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
Semtek to target healthcare with HandEra PDAs and PDA swipe card reader, Aug. 29, 2001, Retrieved from the Internet URL: http://www.pdacortex.com/semtek.htm, on Apr. 19, 2011, pp. 1-2.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
"Mophie Marketplace Magnetic Strip Reader/Case for iPhone 3G & 3GS-Grey," J&R (JR.com), Retrieved from the Internet URL: http://www.jr.com/mophie/pe/MPE_MPIP3GBLK/, on Feb. 8, 2011, pp. 1-1.

"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
"Arduino magnetic stripe decoder," Instructables, Retrieved from the Internet URL: http://www.instructables.com/id/Arduino-magneticstripe-decorder/, on Feb. 8, 2011, pp. 1-5.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Pay@PC," Retrieved from the Internet URL: http://www.merchantanywhere.com/PAY_AT_PCT@PC.htm, on Feb. 11, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
"TOUCH-PAY Wireless Credit Card Processing," MerchantSeek, Retrieved from the Internet URL: http://www.merchantseek.com/wireless-credit-card-processing.htm, on Feb. 11, 2011, pp. 1-5.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
"Headphone Jack (3.5mm)," Retrieved from the Internet URL: http://www.phonescoop.com/glossary/term.php?gid=440, on May 5, 2011, pp. 1-1.
"2.5mm Headset Jack," Retrieved from the Internet URL: http://www.phonescoop.com/glossary/term.php?gid=360, on May 5, 2011, pp. 1-1.
"Reference Designations for Electrical and Electronics Parts and Equipment," Engineering Drawing and Related Documentation Practices, ASME Y14.44-2008, The American Society of Mechanical Engineers, Nov. 21, 2008, pp. 1-31.
ACIDUS, "Mag-stripe Interfacing—A Lost Art," Retrieved from the Internet URL: http://www.scribd.com/doc/18236182/Magstripe-Interfacing#open_. . . , on Feb. 7, 2011, pp. 1-4.
"Mag-stripe readers The hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Website: www.alexwinston.com, Aug. 31, 2009, pp. 1-5.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic stripe reader/writer," Retrieved from the Internet URL: http://www.gae.ucm.es/-padilla/extrawork/stripe.html, on Dec. 21, 2009, pp. 1-2.

(56) References Cited

OTHER PUBLICATIONS

Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
European Search Report and Opinion for European Patent Application No. 11 786 731.7, mailed Mar. 28, 2014.
Office Action for European Patent Application No. 11 786 731.7, mailed Jul. 16, 2015.
Non-Final Office Action mailed Sep. 30, 2011, for U.S. Appl. No. 12/903,753, of McKelvey, J., et al., filed Oct. 13, 2010.
Final Office Action mailed Jul. 6, 2012 for U.S. Appl. No. 12/903,753, of McKelvey, J., et al., filed Oct. 13, 2010.
Non-Final Office Action mailed Jul. 8, 2013, for U.S. Appl. No. 12/903,753, of McKelvey, J., et al., filed Oct. 13, 2010.
Notice of Allowance mailed Oct. 10, 2013, for U.S. Appl. No. 12/903,753, of McKelvey, J., filed Oct. 13, 2010.
Final Office Action mailed Apr. 24, 2013, for U.S. Appl. No. 12/903,758, of Wilson, M., et al., filed Oct. 13, 2010.
Notice of Allowance mailed Aug. 6, 2013, for U.S. Appl. No. 12/903,758, of Wilson, M., et al., filed Oct. 13, 2010.
Notice of Allowance mailed Apr. 4, 2014, for U.S. Appl. No. 14/052,009, of Wilson, M., et al., filed Oct. 11, 2013.
Notice of Allowance mailed Jul. 30, 2014, for U.S. Appl. No. 14/052,009, of Wilson, M., et al., filed Oct. 11, 2013.
Non-Final Office Action mailed Sep. 30, 2011, for U.S. Appl. No. 13/010,976, of Babu, A. R., et al., filed Jan. 21, 2011.
Final Office Action mailed Jun. 12, 2012 for U.S. Appl. No. 13/010,976, of Babu, A. R., et al., filed Jan. 21, 2011.
Advisory Action mailed Aug. 24, 2012 for U.S. Appl. No. 13/010,976, of Babu, A. R., et al., filed Jan. 21, 2011.
Non-Final Office Action mailed Aug. 15, 2014, for U.S. Appl. No. 13/010,976, of Babu, A. R., et al., filed Jan. 21, 2011.
Notice of Allowance mailed Dec. 24, 2014, for U.S. Appl. No. 13/010,976, of Babu, A. R., et al., filed Jan. 21, 2011.
Non-Final Office Action mailed Apr. 2, 2014, for U.S. Appl. No. 14/012,655, of McKelvey, J., filed Aug. 28, 2013.
Final Office Action mailed Aug. 15, 2014, for U.S. Appl. No. 14/012,655, of McKelvey, J., filed Aug. 28, 2013.
Non-Final Office Action mailed Jan. 20, 2015, for U.S. Appl. No. 14/012,655, of McKelvey, J., filed Aug. 28, 2013.
Notice of Allowance mailed Sep. 1, 2015, for U.S. Appl. No. 13/298,487, of Babu, A., et al., filed Nov. 17, 2011.
Non-Final Office Action mailed Apr. 29, 2013, for U.S. Appl. No. 13/298,487, of Babu, A., et al., filed Nov. 17, 2011.
Final Office Action mailed Aug. 22, 2013, for U.S. Appl. No. 13/298,487, of Babu, A., et al., filed Nov. 17, 2011.
Advisory Action mailed Oct. 22, 2013, for U.S. Appl. No. 13/298,487, of Babu, A., et al., filed Nov. 17, 2011.
Non-Final Office Action mailed Aug. 21, 2014, for U.S. Appl. No. 13/298,487, of Babu, A., et al., filed Nov. 17, 2011.
Final Office Action mailed Mar. 18, 2015, for U.S. Appl. No. 13/298,487, of Babu, A., et al., filed Nov. 17, 2011.
International Search Report and Written Opinion, for PCT Application No. PCT/US2010/052483, mailed Jun. 10, 2011.
International Search Report and Written Opinion, for PCT Application No. PCT/US2011/055386, mailed Feb. 22, 2012.
European Search Report and Opinion, for European Application No. 11833172.7, mailed Apr. 22, 2014.
International Search Report and Written Opinion, for PCT Application No. PCT/US2014/069788, mailed May 14, 2015.
International Search Report and Written Opinion, for PCT Application No. PCT/US2012/064782, mailed Feb. 26, 2013.
International Search Report and Written Opinion, for PCT Application No. PCT/US2010/052481, mailed Jun. 23, 2011.
International Search Report and Written Opinion, for PCT Application No. PCT/US2014/067074, mailed Mar. 15, 2015.
Examination Report for Canadian Application No. 2,812,594, mailed on Feb. 24, 2015.
Examination Report No. 1 for Australian Application No. 201415781, mailed on Feb. 23, 2015 (Registration No. 359005).
"Review: Square, Inc. Square Credit Card Reader (2013)," iLounge, Retrieved from the Internet URL: http://www.ilounge.com/index.php/reviews/entry/square-inc.-square-credit-card-reader-2013/, on Jan. 16, 2014, pp. 3.
"TUAW The Unofficial Apple Weblog, Square credit card reader loses weight, gains accuracy", Retrieved from the Internet URL: http://www.tuaw.com/2013/12/09/square-credit-card--reader-loses-weight-gains-accuracy/, on Dec. 9, 2013, p. 1.
Examination Report No. 2 for Australian Application No. 201415781, mailed Aug. 13, 2015 (Registration No. 359005).
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Notification of Registration of a Design for Australian Application No. 201415781, mailed on Nov. 27, 2014 (Registration No. 359005).
First Examination Report for Indian Design Application No. 267386, mailed Feb. 5, 2015.
Non-Final Office Action mailed Apr. 25, 2013, for U.S. Appl. No. 13/298,491, of Lamba, K., et al., filed Nov. 17, 2011.
Final Office Action mailed Sep. 17, 2013, for U.S. Appl. No. 13/298,491, of Lamba, K, et al., filed Nov. 17, 2011.
Advisory Action mailed Oct. 22, 2013, for U.S. Appl. No. 13/298,491, of Lamba, K., et al., filed Nov. 17, 2011.
Non-Final Office Action mailed Jul. 17, 2014, for U.S. Appl. No. 13/298,491, of Lamba, K., et al., filed Nov. 17, 2011.
Final Office Action mailed Feb. 4, 2015, for U.S. Appl. No. 13/298,491, of Lamba, K., et al., filed Nov. 17, 2011.
Notice of Allowance mailed Jun. 22, 2015, for U.S. Appl. No. 13/298,491, of Lamba, K., et al., filed Nov. 17, 2011.
Non-Final Office Action mailed Jun. 6, 2014, for U.S. Appl. No. 14/231,598, of Wade, J., et al., filed Mar. 31, 2014.
Non-Final Office Action mailed Apr. 10, 2015, for U.S. Appl. No. 14/189,997, of Lamfalusi, M., et al., filed Feb. 25, 2014.
Notice of Allowance mailed Nov. 25, 2014, for U.S. Appl. No. 14/231,598, of Claude, J.B., et al., filed Mar. 31, 2014.
Non-Final Office Action mailed Jun. 22, 2015, for U.S. Appl. No. 14/322,815, of Edwards, T., filed Jul. 2, 2014.
Notice of Allowance mailed Aug. 1, 2014, for U.S. Appl. No. 14/203,463, of Wade, J., et al., filed Mar. 10, 2014.
Notice of Allowance mailed Aug. 27, 2015, for U.S. Appl. No. 13/298,501, of Babu, A., et al., filed Nov. 17, 2011.
Non-Final Office Action mailed Sep. 11, 2014, for U.S. Appl. No. 13/298,501, of Babu, A., et al., filed Nov. 17, 2011.
Final Office Action mailed May 6, 2015, for U.S. Appl. No. 13/298,501, of Babu, A., et al., filed Nov. 17, 2011.
Notice of Allowance mailed Oct. 17, 2014, for U.S. Appl. No. 14/220,967, of Wade, J., et al., filed Mar. 20, 2014.
Notice of Allowance mailed Dec. 18, 2014, for U.S. Appl. No. 14/220,967, of Wade, J., et al., filed Mar. 20, 2014.
Notice of Allowance mailed May 19, 2015, for U.S. Appl. No. 14/620,765, of Wade, J., et al., filed Feb. 12, 2015.
Non-Final Office Action mailed May 26, 2015, for U.S. Appl. No. 14/551,681, of Wade, J., et al., filed Nov. 24, 2014.
Notice of Allowance mailed Jun. 10, 2014, for U.S. Appl. No. 29/491,147, of Templeton T., et al., filed May 16, 2014.
Non-Final Office Action mailed Sep. 11, 2014, for U.S. Appl. No. 13/298,506, of Lamba, K., et al., filed Nov. 17, 2011.
Final Office Action mailed May 6, 2015, for U.S. Appl. No. 13/298,506, of Lamba, K., et al., filed Nov. 17, 2011.
Non-Final Office Action mailed Sep. 30, 2011, for U.S. Appl. No. 13/005,822, of McKelvey, J., et al., filed Jan. 13, 2011.
Notice of Allowance mailed Aug. 28, 2015, for U.S. Appl. No. 13/298,510, of Lamba, K. et al., filed Nov. 17, 2011.
Advisory Action mailed Sep. 11, 2015 for U.S. Appl. No. 13/298,506, of Lamba, K., et al., filed Nov. 17, 2011.

(56) References Cited

OTHER PUBLICATIONS

Notice of Allowance mailed Sep. 16, 2015 for U.S. Appl. No. 14/551,681, of Wade, J., et al., filed Nov. 24, 2014.
Notice of Allowance mailed Oct. 5, 2015 for U.S. Appl. No. 14/322,815, of Edwards, T., filed Jul. 2, 2014.
Notice of Allowance mailed Oct. 6, 2015 for U.S. Appl. No. 13/298,491, of Lamba, K., et al., filed Nov. 17, 2011.
Notice of Allowance mailed Oct. 7, 2015 for U.S. Appl. No. 13/298,510, of Lamba, K. et al., filed Nov. 17, 2011.
Notice of Allowance mailed Oct. 8, 2015 for U.S. Appl. No. 13/298,487, of Lamba, K., et al., filed Nov. 17, 2011.
Notice of Allowance mailed Oct. 13, 2015 for U.S. Appl. No. 14/578,107, of Wade, J. et al., filed Dec. 19, 2014.
English-language translation of Final Rejection for Japanese Application No. 2014-025525, mailed Oct. 20, 2015.
Notice of Allowance mailed Nov. 13, 2015, for U.S. Appl. No. 13/298,487, of Lamba, K., et al., filed Nov. 17, 2011.
Corrected Notice of Allowance mailed Nov. 18, 2015, for U.S. Appl. No. 14/578,107, of Wade, J., et al., filed Dec. 19, 2014.
Notice of Allowance mailed Nov. 19, 2015, for U.S. Appl. No. 13/298,491, of Lamba, K., et al., filed Nov. 17, 2011.
Corrected Notice of Allowance mailed Nov. 19, 2015 for U.S. Appl. No. 13/298,510, of Lamba, K., et al., filed Nov. 17, 2011.
Notice of Allowance mailed Nov. 20, 2015, for U.S. Appl. No. 13/298,501, of Babu, A., et al., filed Nov. 17, 2011.
Ex parte Quayle Action mailed Nov. 20, 2015, for U.S. Appl. No. 14/620,699, of Wade, J., et al., filed Feb. 12, 2015.
Notice of Allowance mailed Nov. 23, 2015, for U.S. Appl. No. 14/189,997, of Lamfalusi, M., et al., filed Feb. 25, 2014.
Non-Final Office Action mailed Dec. 14, 2015, for U.S. Appl. No. 13/298,506, of Lamba, K, et al., filed Nov. 17, 2011.
Notice of Allowance mailed Jan. 12, 2016, for U.S. Appl. No. 13/298,534, of Lamba, K, et al., filed Nov. 17, 2011.
Final Office Action mailed Jan. 15, 2016, for U.S. Appl. No. 29/493,212, of Edwards, T., et al., filed Jun. 6, 2014.
"What is a Coupling Capacitor," Retrieved from the Internet URL: http://www.learningaboutelectronics.com/Articles/What-is-a-coupling-capacitor, on Mar. 21, 2016, pp. 1-4.
Notice of Allowance mailed Jan. 29, 2016, for U.S. Appl. No. 13/298,501, of Babu, A., et al., filed Nov. 17, 2011.
Notice of Allowance mailed Jan. 29, 2016, for U.S. Appl. No. 13/298,534, of Lamba, K., et al., filed Nov. 17, 2011.
Final Office Action mailed Feb. 1, 2016, for U.S. Appl. No. 13/298,560, of Lamba, K., et al., filed Nov. 17, 2011.
Notice of Allowance mailed Feb. 5, 2016, for U.S. Appl. No. 14/620,699, of Wade, J., et al., filed Feb. 12, 2015.
Non-Final Office Action mailed Feb. 25, 2016, for U.S. Appl. No. 14/979,407, of Lamfalusi, M., et al., filed Dec. 27, 2015.
Non-Final Office Action mailed Mar. 1, 2016, for U.S. Appl. No. 14/942,515, of Lamba, K., et al., filed Nov. 16, 2015.
Notice of Allowance mailed Mar. 28, 2016, for Design U.S. Appl. No. 29/493,212, of Edwards, T., et al., filed Jun. 6, 2014.
Examiner's Report for Canadian Industrial Design Application No. 159528, mailed on Dec. 1, 2015.
Examiner Requisition for Canadian Application No. 2,812,594, mailed on Feb. 26, 2016.
Non-Final Office Action mailed Apr. 7, 2016, for U.S. Appl. No. 13/298,506, of Lamba, K., et al., filed Nov. 17, 2011.
Advisory Action mailed Apr. 14, 2016, for U.S. Appl. No. 13/298,560, of Lamba, K., et al., filed Nov. 17, 2011.
Non-Final Office Action mailed May 5, 2016, for U.S. Appl. No. 14/306,041, of Wade, J., et al., filed Jun. 16, 2014.
Notice of Allowance mailed May 10, 2016, for U.S. Appl. No. 14/942,515, of Lamba, K., et al., filed Nov. 16, 2015.
Non-Final Office Action mailed May 19, 2016, for U.S. Appl. No. 13/298,560, of Lamba, K., et al., filed Nov. 17, 2011.
Office Action for Canadian Patent Application No. 2,920,589, mailed Mar. 11, 2016.
Office Action for European Patent Application No. 11 833 172.7, mailed May 17, 2016.
Non-Final Office Action mailed Jun. 30, 2016 for U.S. Appl. No. 15/066,496, of Babu, A., et al., filed Mar. 10, 2016.
Non-Final Office Action mailed Jul. 1, 2016, for U.S. Appl. No. 15/013,937, of Lamba, K., et al., filed Feb. 2, 2016.
Notice of Allowance mailed Jul. 14, 2016, for U.S. Appl. No. 14/942,515, of Lamba, K., et al., filed Nov. 16, 2015.
Non-Final Office Action mailed Aug. 16, 2016, for U.S. Appl. No. 14/312,524, of Edwards, T., filed Jun. 23, 2014.
Non-Final Office Action mailed Aug. 17, 2016, for U.S. Appl. No. 14/985,624, of Wade, J., et al., filed Dec. 31, 2015.
Notice of Allowance mailed Aug. 26, 2016, for U.S. Appl. No. 13/298,506, of Lamba, K., et al., filed Nov. 17, 2011.
Certificate of Design Registration for Japanese Design Application No. 2014-255525, mailed on Jun. 24, 2016 (Registration No. 1554745).
Notice of Acceptance for Australian Patent Application No. 2014362287, mailed on Jun. 30, 2016.
Office Action for Canadian Patent Application No. 2,932,849, mailed on Jul. 13, 2016.
Office Action for Brazilian Design Application No. 3020140057308, mailed on Jul. 26, 2016.
Notice of Allowance mailed Jun. 3, 2016, for U.S. Appl. No. 14/942,515, of Lamba, K., et al., filed Nov. 16, 2015.
Notice of Allowance mailed Jun. 13, 2016, for U.S. Appl. No. 14/979,407, of Lamfalusi, M., et al., filed Dec. 27, 2015.
Notice of Allowance mailed Jun. 14, 2016, for U.S. Appl. No. 14/942,515, of Lamba, K., et al., filed Nov. 16, 2015.
Notice of Allowance mailed Sep. 22, 2016, for U.S. Appl. No. 13/298,506, of Lamba, K., et al., filed Nov. 17, 2011.
Notice of Allowance mailed Sep. 27, 2016, for U.S. Appl. No. 14/306,041, of Wade, J., et al., filed Jun. 16, 2014.
Extended European Search Report for European Patent Application No. 16155374.8, mailed Oct. 11, 2016.

* cited by examiner

Track 1 forward

Track 1 reverse

MULTIPLE PAYMENT CARD READER SYSTEM

CROSS-REFERENCE TO RELATED APPLICATIONS

This application is a continuation-in-part of U.S. patent application Ser. No. 14/012,655, entitled "INTEGRATED CARD READER SYSTEM," filed Aug. 28, 2013, which is a continuation of U.S. patent application Ser. No. 13/043,203, entitled "INTEGRATED READ HEAD DEVICE," filed Mar. 8, 2011, which issued as U.S. Pat. No. 8,573,487 and is a continuation-in-part of U.S. patent application Ser. No. 13/012,495, entitled "SYSTEMS AND METHODS FOR FINANCIAL TRANSACTION THROUGH MINIATURIZED CARD READER WITH DECODING ON A SELLER'S MOBILE DEVICE," filed Jan. 24, 2011, which issued as U.S. Pat. No. 8,500,018; and this application claims the benefit of U.S. Provisional Patent Application Ser. No. 62/000,479, entitled "METHODS, SERVICES, SYSTEMS, AND ARCHITECTURES FOR MOBILE PAYMENT SYSTEMS," filed May 19, 2014, all of which are incorporated in their entirety herein by reference.

BACKGROUND

Existing payment card readers/swipers can be classified as either platform card readers or plunge card readers. Platform card readers are traditional card swipers with single rails, which allow a card to be held against the base of the reader by the user and moved across the read head of the reader. Plunge swipers guide a card by two sets of rails and a backstop. Once the user has inserted the card against the backstop, the card is read as it is removed from the plunge swipers. Plunge swipers are common on ATMs and other self-pay devices because they are less prone to hacking. Magnetic stripe cards having standard specifications can typically be read by point-of sale devices at a merchant's location. When the card is swiped through an electronic card reader, such as a platform card reader, at the checkout counter at a merchant's store, the reader will usually use its built-in modem to dial the number of a company that handles credit authentication requests. Once the account is verified and an approval signal will be sent back to the merchant to complete a transaction. However, existing readers/swipers can only read credit or debit card information from the magnetic stripe of the card. As purchases are made using other technologies, such as through chip-based cards, it is desirable to develop approaches for reading credit or debit card information to facilitate the receipt and processing of payments in these situations.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
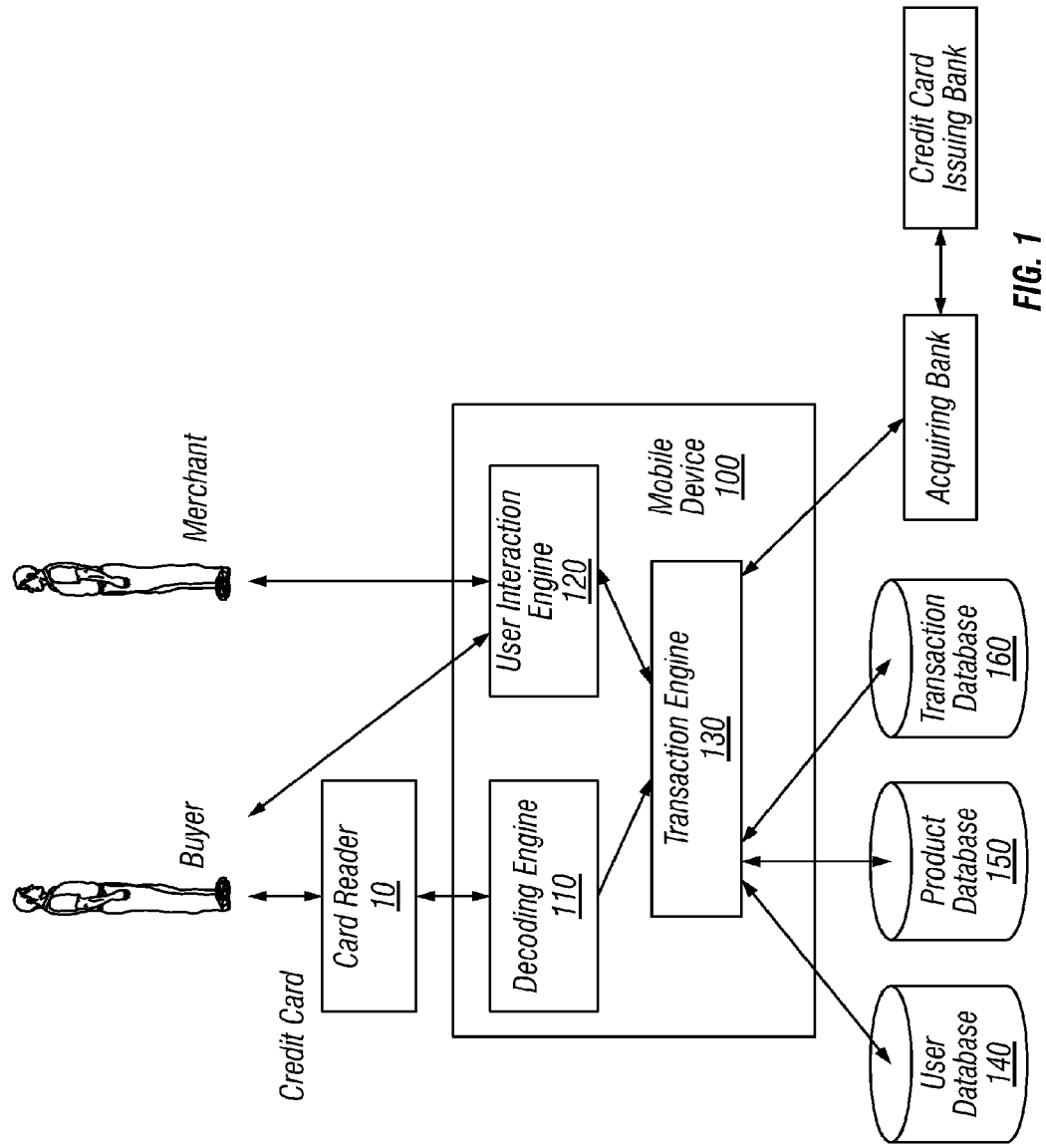
FIG. 1. depicts an example of a system diagram to support financial transaction between a payer and a payee through a miniaturized card reader connected to a mobile device in accordance with an embodiment.

Systems and methods in accordance with the embodiments described herein overcome various deficiencies in existing approaches to conducting financial transactions. In particular, in accordance with various embodiments, approaches provide for a mobile point-of-sale system configured to facilitate the transfer of funds between entities (e.g., customers and merchants). For example, a card reader can include two different types of slots configured for conducting a financial transaction between entities. A first slot can allow for a magnetic stripe element of a card to be swiped. A second slot can include contact elements which allow the card to be "dipped-in". Accordingly, in accordance with various embodiments, the device can receive a swipe and/or a "dipping" of a card into a respective slot for conducting a financial transaction.

In various embodiments, the card reader can include an output jack configured to couple to a microphone input associated with a computing device (e.g., a mobile phone, tablet computer, etc.) for providing a signal indicative of financial information stored on a financial transaction card. A read head of the card reader can include a first slot configured to receive a magnetic stripe of the financial transaction card and a second slot configured receive at least a portion of a plurality of financial transaction card contacts. The second slot can include, for example, a plurality of card reader contacts positioned to be contacted by the portion of the plurality of financial transaction card contacts and an open side that allows the financial transaction card to move laterally when the financial transaction card is inserted into the second slot. Circuitry included in the card reader can be configured to, for example, communicate with an integrated circuit embedded in the financial transaction card through the portion of the plurality of financial transaction card contacts, read financial information stored on the financial transaction card, and produce a signal indicative of the financial information. In this way, the card reader is configured to enable a financial transaction between a first entity and a second entity using one of the first slot or the second slot.

In accordance with various embodiments, an object of the present invention is to provide improved decoding systems, and their methods of use, for financial transactions. Another object of the present invention is to provide decoding systems with transaction engines, and their methods of use, configured to be coupled and decoupled to card readers. A further object of the present invention is to provide decoding systems with transaction engines coupled to a payment system, and their methods of use, where the payment system includes at least one of, a user database, a product database, and transaction database. Yet another object of the present invention is to provide decoding systems with transaction engines coupled to a payment system, and their methods of use, where at least one of, a user database, a product database and transaction database of the is accessible by at least one of a first party and a second party. Another object of the present invention is to provide decoding systems with transaction engines coupled to a payment system, and their methods of use, wherein a user database the payment system is configured to provide a confirmation of an identity of a first party during a card present transaction to prevent credit fraud. Yet another object of the present invention is to provide methods of transmitting information using a first party's mobile device, communicating between the transaction engine of the first party's mobile and a payment system, where the payment system includes at least one of, a user database, a product database, and transaction database. A further object of the present invention is to provide methods of transmitting information using a first party's mobile device, communicating between the transaction engine of the first party's mobile and a payment system, where the payment system includes at least one of, a user database, a product database, and transaction database, and decoding signals at a decoding engine produced from a read of a first party's financial transaction card.

Yet another object of the present invention is to provide methods of transmitting information using a first party's mobile device, communicating between the transaction engine of the first party's mobile and a payment system, where the payment system includes at least one of, a user database, a product database, and transaction database, and accessing by at least one of the first party and a second party the at least one of, a user database, a product database and transaction database.

A further object of the present invention is to provide methods of transmitting information using a first party's mobile device, communicating between the transaction engine of the first party's mobile and a payment system, where the payment system includes at least one of, a user database, a product database, and transaction database, wherein the first party is a buyer, and the second party is a seller. Another object of the present invention is to provide methods of transmitting information using a first party's mobile device, communicating between the transaction engine of the first party's mobile and a payment system, where the payment system includes at least one of, a user database, a product database, and transaction database, and the user database is accessible by a seller.

Yet another object of the present invention is to provide methods of transmitting information using a first party's mobile device, communicating between the transaction engine of the first party's mobile and a payment system, where the payment system includes at least one of, a user database, a product database, and transaction database, and providing a confirmation of an identity of the first party during a card present transaction to prevent credit fraud.

These and other objects of the present invention are achieved in a decoding system running on a mobile device and coupled to a payment system. The decoding engine decodes signals produced from a read of a first party's financial transaction card, accepts and initializes incoming signals from the read of the first party's financial transaction card until the signals reach a steady state, detects the read of the first party's financial transaction card once the incoming signals are in a steady state, identifies peaks in the incoming signals and digitizes the identified peaks in the incoming signals into bits. A transaction engine runs on the mobile device and is coupled to the decoding engine. The transaction engine receives as its input decoded first party's financial transaction card information from the decoding engine. A payment system, in communication with the transaction engine, includes at least one of, a user database, a product database, and transaction database.

In another embodiment of the present invention, a method of transmitting information from a mobile device runs a decoding engine and a transaction action on a mobile device. The transaction engine receives as an input a first party's financial transaction card information from the decoding engine. The transaction engine communicates with a payment system, where the payment system includes at least one of, a user database, a product database, and transaction database.

In another embodiment of the present invention, a method of transmitting information to a mobile device runs, on a mobile device, a decoding engine coupled to a transaction engine. A first party's mobile device is coupled and de-coupled to a card reader via a microphone port of the mobile device. An input is received at the transaction engine that is a first party's financial transaction card information received from the decoding engine. The transaction engine communicates with a payment system where the payment system includes at least one of, a user database, a product database, and transaction database.

FIG. 1 depicts an example of a system diagram to support financial transaction between a payer and a payee through a miniaturized card reader connected to a mobile device. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 1, the system includes a mobile device 100, a miniaturized card reader 10 connected to mobile device 100, a decoding engine 110, a user interaction engine 120, and a transaction engine 130, all running on mobile device 100. Additionally, the system may also include one or more of user database 140, product or service database 150, and transaction database 160, all coupled to the transaction engine 130.

As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers mayor may not be considered part of the engine, but the distinction is not critical.

As used herein, the term database is used broadly to include any known or convenient means for storing data, whether centralized or distributed, relational or otherwise.

In the example of FIG. 1, mobile device 100 to which the portable card reader 10 is connected to can be but is not limited to, a cell phone, such as Apple's iPhone, other portable electronic devices, such as Apple's iPod Touches, Apple's iPads, and mobile devices based on Google's Android operating system, and any other portable electronic device that includes software, firmware, hardware, or a combination thereof that is capable of at least receiving the signal, decoding if needed, exchanging information with a transaction server to verify the buyer and/or seller's account information, conducting the transaction, and generating a receipt. Typical components of mobile device 100 may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

In one embodiment of the present invention a system is provided with transaction engine 130 running on mobile device 100. In response to a financial transaction between a buyer and a seller, the mobile device 100 accepts information selected including but not limited to information from financial transaction or information pertaining to financial transaction card used by the buyer in the transaction. Additionally, a financial transaction device can be utilized. Non-limiting examples of financial transaction devices include but are not limited to a, wristband, RFID chip, cell phone, biometric marker and the like. At least a portion of this information is communicated with a third party financial institution or payment network to authorize the transaction. The buyer receives confirmation of the payment. Payment confirmation can be in real time by a payment service.

Payment confirmation can be made with a communication channel of the buyer's choice. As non-limiting examples, confirmation of payment can be an electronic notification in the form selected from at least one of, email, SMS message, tweet (message delivered via TWITTER®), instant message, communication within a social network and the like.

In response to the transaction, a confirmation is made that the buyer is authorized to use the financial transaction card in order to prevent fraud. There can also be a confirmation that there are sufficient funds for the purchase made by the buyer.

In one embodiment, it is determined that that the buyer, authorized to use the financial transaction card, is present with the seller at the time of the financial transaction.

Miniaturized Card Reader

In the example of FIG. 1, miniaturized card reader 10 is configured to read data encoded in a magnetic strip of a card being swiped by a buyer and send a signal that corresponds to the data read to mobile device 100 via a signal plug 18. This signal is at least partially if not fully decoded in the mobile device 100.

Figure 13:
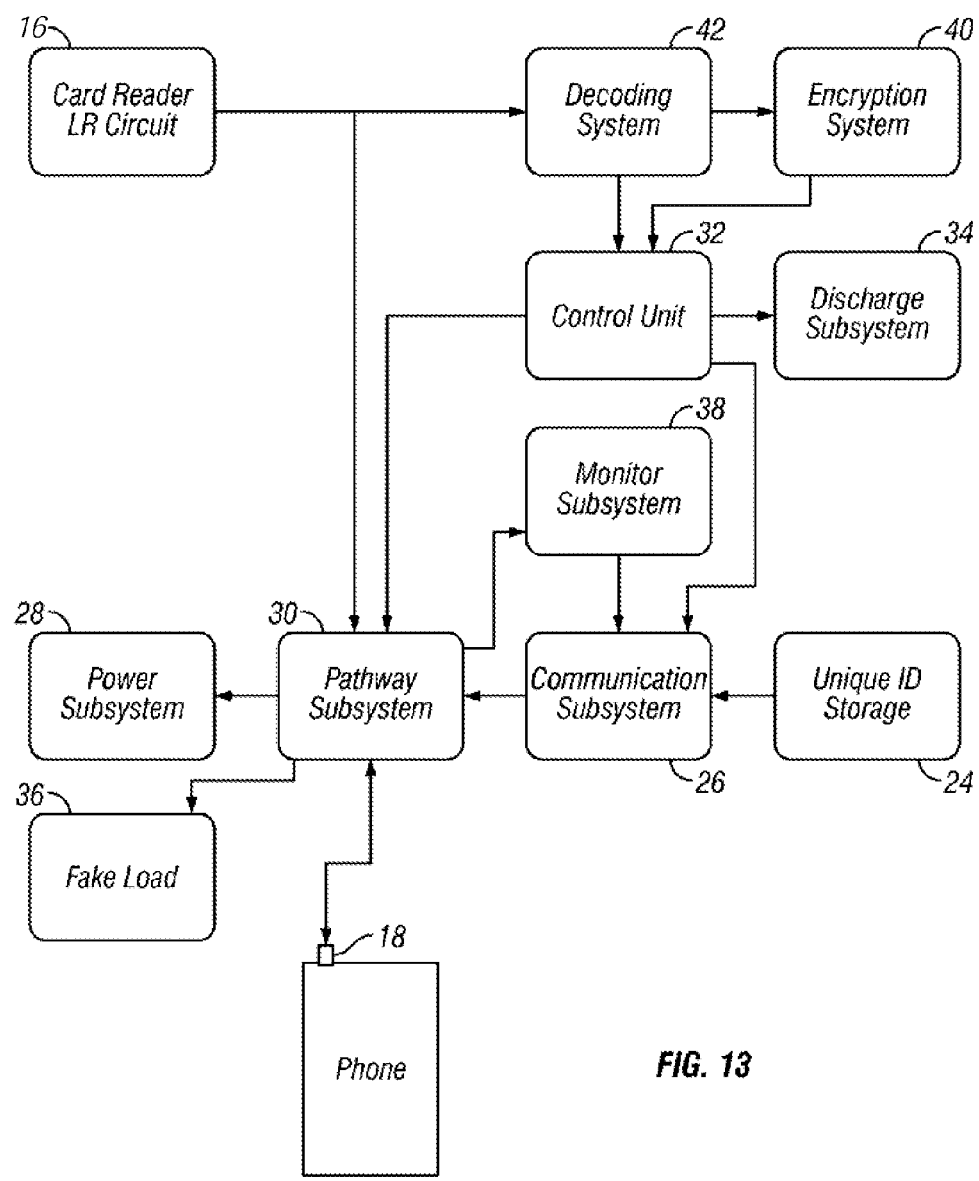
FIG. 13 depicts an example of additional encryption and/or decryption systems included in the passive 10 circuitry for encrypting and decrypting of unique 10 of card reader in accordance with an embodiment.

The size of card reader 10 is miniaturized to be portable for connection with mobile device 100. For a non-limiting example, the size of card reader 10 can be miniaturized to an overall length of less than 1.5". In addition, the miniaturized card reader 10 is also designed to reliably read the card with minimum error via a single swipe by counteracting vendor specific filtering done by mobile device 100. Note that this broad overview is meant to be non-limiting as components to this process are represented in different embodiments. For instance the decoding engine 110 can be embedded in the card reader 10 as shown in FIG. 13 as the decoding system 42.

Figure 2:
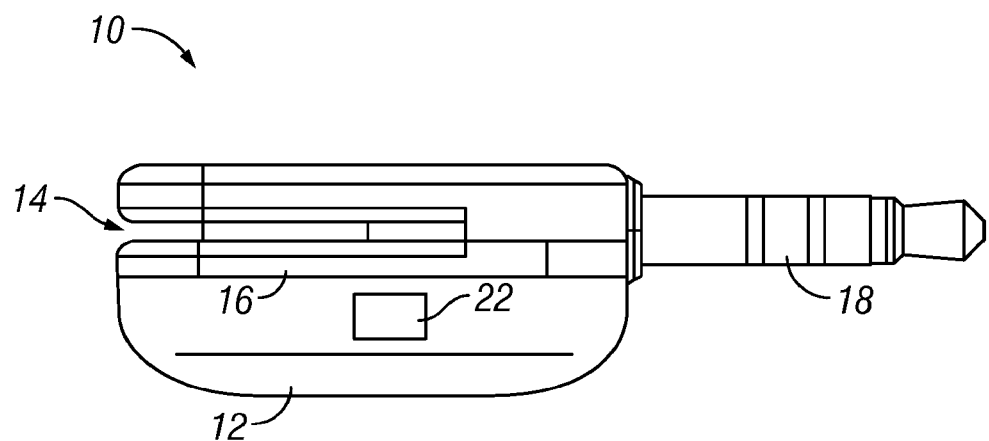
FIG. 2 depicts an example of an external structural diagram of a miniaturized card reader in accordance with an embodiment.

FIG. 2 depicts an example of an external structural diagram of miniaturized card reader 10. Although the diagrams depict components as functionally separate, such depiction is merely for illustrative purposes. It will be apparent that the components portrayed in this figure can be arbitrarily combined or divided into separate software, firmware and/or hardware components. In the example of FIG. 2, miniaturized card reader 10 is shown to comprise at least a housing 12 having a slot 14, a read head 16 embedded on a wall of slot 14, a signal plug 18 extending out from the housing 12, and an optional passive 10 circuit 22.

Figure 3A:
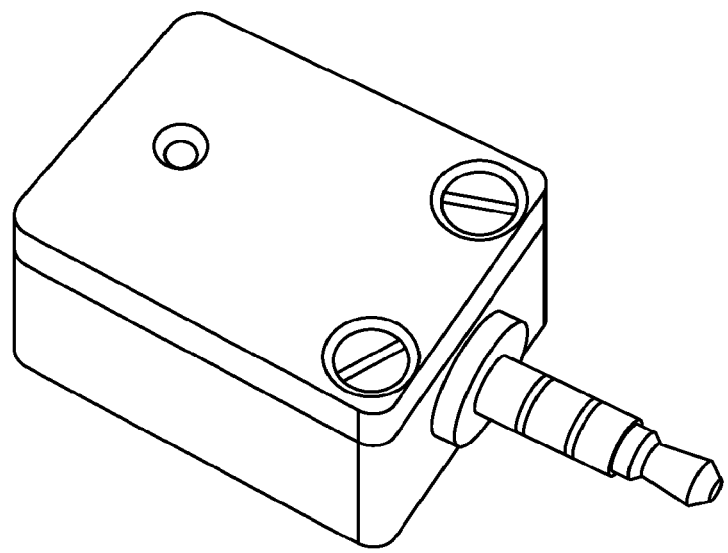
FIGS. 3A and 3B depict examples of actual card reader with miniaturized design in accordance with various embodiments.
Figure 3B:
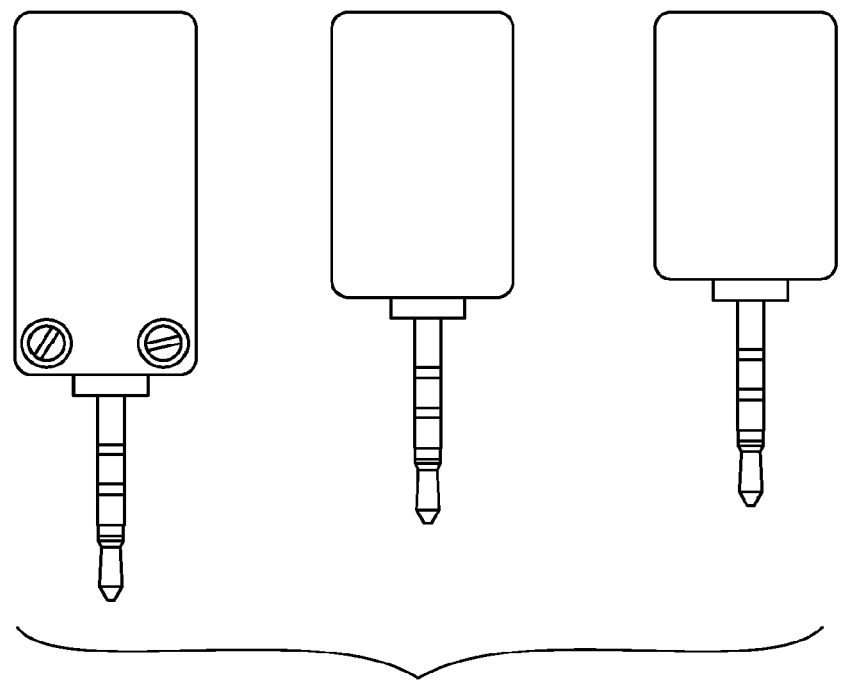

FIG. 3(a) depicts an example of an actual card reader with miniaturized design and FIG. 3(b) depicts other examples of miniaturized card reader with width around 0.5". The card reader 10 includes the slot 14 and is miniaturized relative to the size of the mobile device 100. In some embodiments, the housing 12 is not included. In one embodiment, the slot 14 is configured to maintain contact between the read head 16, and the magnetic stripe of the financial transaction card during a swipe. The signal is decoded in the mobile device 100. The decoding includes determining pulses in the signal and converting at least some of the pulses to characters. In one embodiment, the slot 14 has a width of no greater than 1 mm. The width of the slot 14 is sufficient to enable a successful swiping of the financial transaction card, while producing the signal. It is sized to enable the successful swipe without creating sufficient torque between the signal plug 18 or output jack and the read head 16 or at the mobile device 100 to cause damage due to excessive torque. If the slot 14 is too wide, then it is more difficult to achieve a successful swipe that produces the signal. If there is a miss, or insufficient data is generated, then the resulting signal is not competent. If the slot 14 is too narrow, then the financial transaction card cannot be swiped. The size of the slot 14 is selected to reduce torque as discussed above. Additionally, in one embodiment, the output jack 18 is at least partially if not fully rotatable relative to the port it is coupled to in the mobile device 100. The decoding includes error checking. In one embodiment, the decoding includes detecting that data in the signal is from the financial transaction card, seeing the beginning and ending sentinels and reconstructing data in the signal from a pattern of pulses.

In one embodiment of the present invention, the mobile device 100 has an audio input port, a line input port a USB port and others. In one embodiment, a sampling rate of the signal at the audio input port or a line input port of the mobile device is at least 15 kHz. In various other embodiments, the sample rate of the signal at the audio input port or line import port can be, least 20 kHz; at least 25 kHz, at least 30 kHz, at least 35 kHz or at least 40 kHz.

In one embodiment, the slot 14 is oriented and sized to reduce torque applied on the read head 10 when the financial transaction card is swiped through the slot 14 in order to maintain accuracy and reliability of the data read by the read head 10.

In the example of FIG. 2, housing 12 of card reader 10 is designed to be asymmetrical with respect to slot 14, with texture such as logo on one side of the housing that can be felt and recognized by a user with a touch of a finger. For correct swiping of the card, the texture side of housing 12 should match with the texture (front) side of the card, so that a user can easily identify the right side of the reader to swipe the card through slot 14 without actually looking at the reader or card. Even a blind person is able to swipe the card correctly by matching the texture side of the reader with the texture side of the card.

In the example of FIG. 2, the slot 14 is wide enough and deep enough to accept a card having a magnetic stripe so that the stripe will fit within the slot 14. More importantly, the slot 14 is configured to reduce the torque applied on the reader 10 when the card is swiped through slot 14 in order to maintain accuracy and reliability of the data read by read head 16. Since the size of card reader 10 is miniaturized, slot 14 also has a length that is significantly less than the length of the card to be inserted into the slot 14.

Figure 4A:
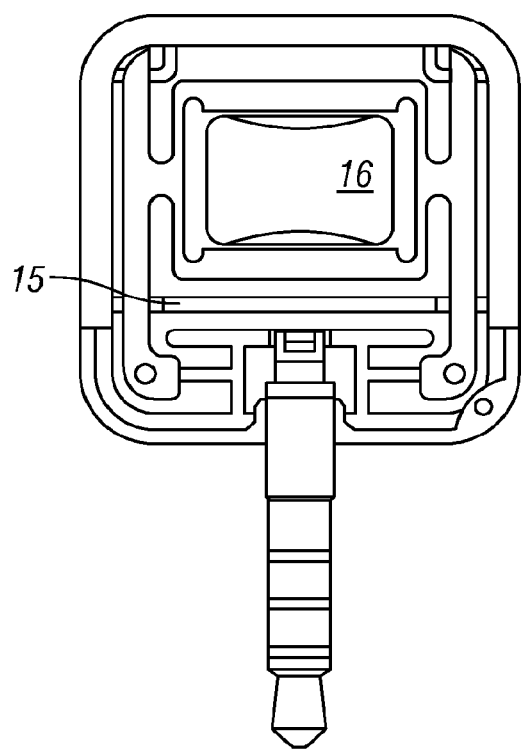
FIGS. 4A and 4B depict examples of alignment between read head of the card reader and magnetic stripe of card being swiped in accordance with various embodiments.

To correctly read the data on the magnetic stripe of the card, the read head 16 must maintain contact with the stripe as the card moves past slot 14. If the card rocks during the swipe, the alignment of the head 12 with the stripe may be compromised. As the length of the slot 14, i.e., the card path through which the card swiped though slot 14, is shortened, rocking and head alignment may become significant issues. As shown in FIG. 4(a), if the magnetic stripe card is swiped through without the base of the card resting against the flat bottom piece, the magnetic stripe will not align with the read head 16 when the card is swiped through slot 14 having a flat base 15.

Figure 4B:
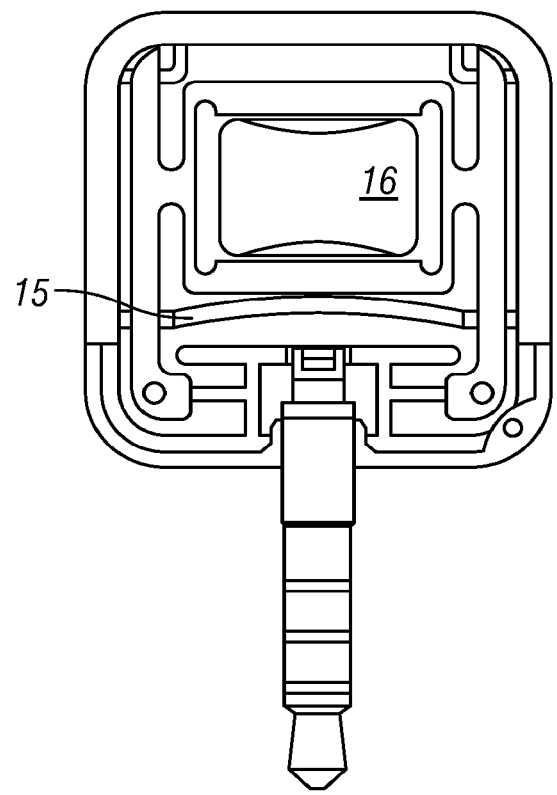

In some embodiments, the base 15 of slot 14 can be changed from flat to a curved base with a radius in order to increase contact between the read head 16 and the magnetic stripe to address the rocking problem. As shown in FIG. 4(b), the read head 16 can maintain contact with the magnetic stripe, even with some additional error due to the gradation of contact introduced by the curved base 15.

Figure 5:
FIG. 5 depicts an example of a TRS connector as a part of card reader in accordance with an embodiment.

FIG. 5 depicts an example of signal plug 18 as part of card reader 10. Here, signal plug 18 can be but is not limited to a TRS (tip, ring, sleeve) connector also known as an audio plug, phone plug, plug, stereo plug, mini-plug, or a mini-stereo audio connector. The signal plug 18 may be formed of different sizes such as miniaturized versions that are 3.5 mm or 2.5 mm.

In some embodiments, signal plug 18 may be retractable within the housing 12. In some embodiments, signal plug 18 is configured to extend beyond housing 12 of the reader in order to accommodate connection with mobile devices 100 having cases or having a recessed plug-in socket, wherein the socket can be but is not limited to a microphone input socket or a line in audio input of the mobile device.

In some embodiments, housing 12 of card reader 10 is made of nonconductive material such as plastic so that the reader will not interfere with the function of mobile device 100 it is connected with. Such choice of material is important since the outer case of certain mobile devices, such as iPhone 4, is conductive and serves as an antenna for the device, which function could potentially be interfered with if the metal case of the device gets in touch with the housing of a card reader made of conductive material.

Figure 6A:
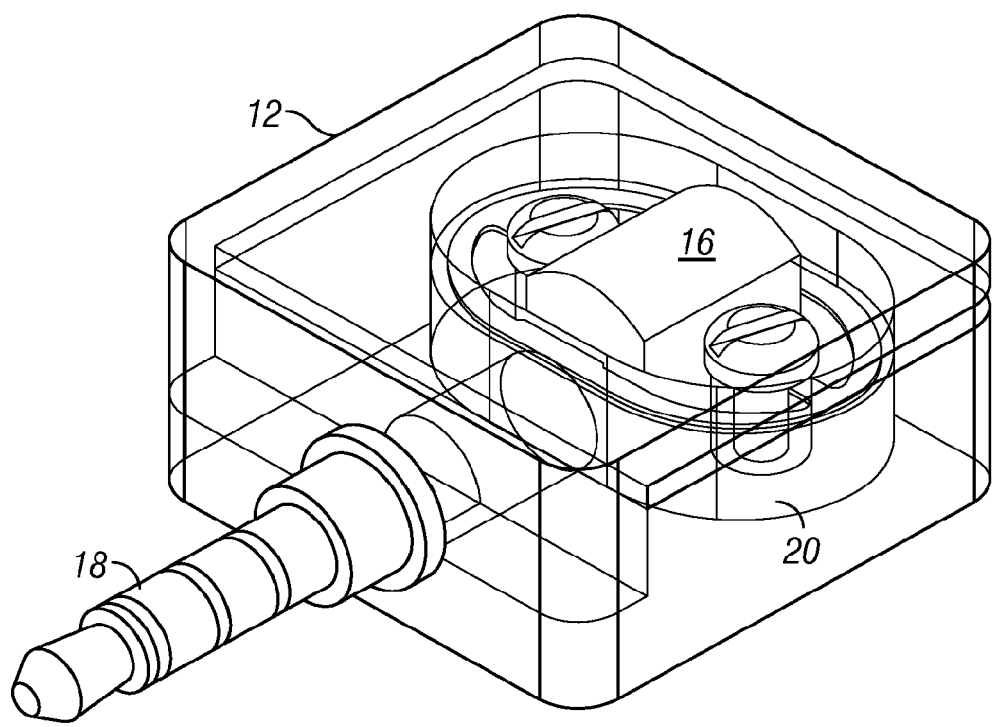
FIGS. 6A, 6B, and 6C depict examples of internal structures of a miniaturized card reader.

FIG. 6(a) depicts an example of an internal structural diagram of a miniaturized card reader. Although the diagrams depict components as functionally separate, such depiction is merely for illustrative purposes. It will be apparent that the components portrayed in this figure can be arbitrarily combined or divided into separate software, firmware and/or hardware components.

Figure 6B:
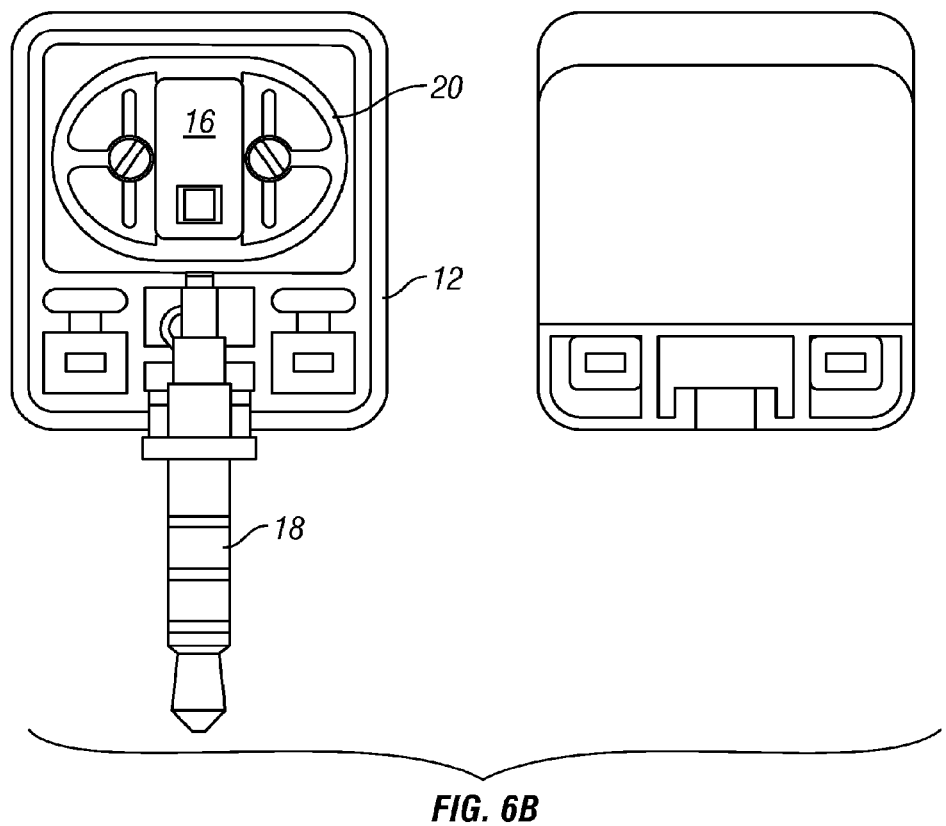
Figure 6C:
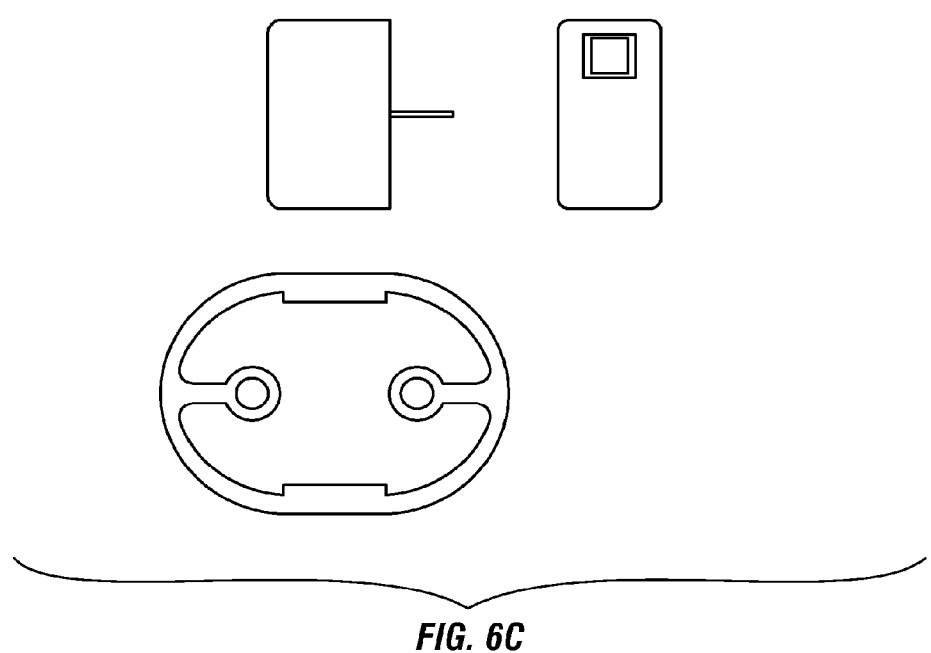

In the example of FIG. 6(a), the internal structure inside housing 12 of card reader 10 is shown to comprise at least a read head 16 with embedded circuitry, and a spring structure 20 to support read head 16. FIG. 6(b) depicts an example of an internal structure an actual miniaturized card reader. FIG. 6(c) depicts an example of separated components of read head 16 and spring structure 20 used in the actual miniaturized card reader.

In the example of FIGS. 6(a)-(c), read head 16, which for a non-limiting example, can be an inductive pickup head, detects and provides data stored in the magnetic stripe of a card to a connected mobile device 100. More specifically, as the magnetic stripe of a card is swiped through slot 14 and in contact with read head 16, the card reader device 10 reads one or more tracks of data or information stored in the magnetic stripe of the card via the detection circuitry embedded inside the read head. Here, data stored in the magnetic stripe may be in the form of magnetic transitions as described in the ISO 7811 standards. As the card moves past the read head 16, magnetic transitions representing data induce a voltage or waveform in a coil (not shown) of read head 16 due to such relative movement between read head 16 and the stripe (called the Hall Effect), wherein a resistor (not shown) inside read head 16 sets the amplitude of the waveform. This waveform is sent via the signal plug 18 into the socket which is registered by the microphone of the mobile device 100 connected with card reader 10.

Figure 7A:
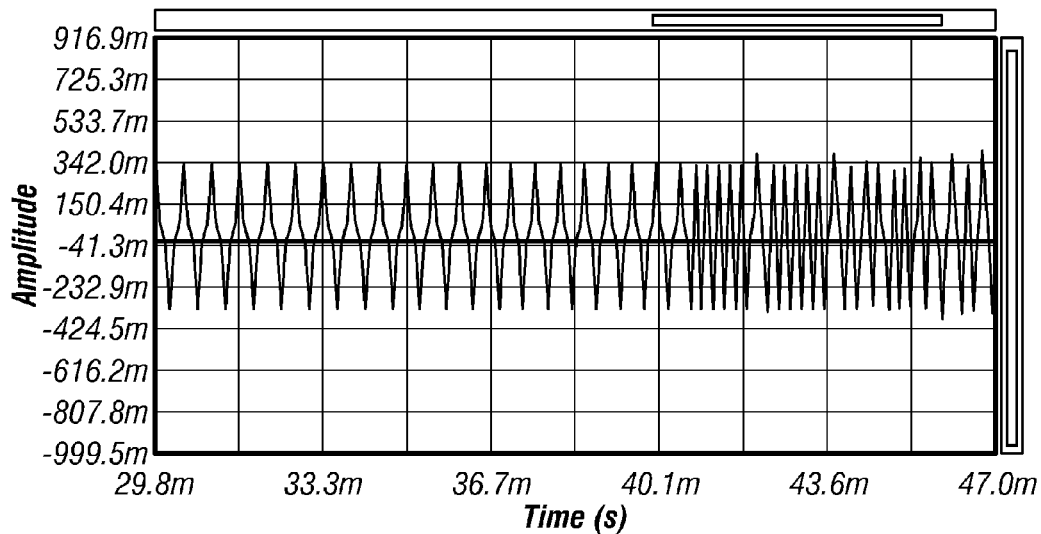
FIGS. 7A and 7B depict examples of waveforms of data read from one track of the magnetic stripe by read head when the card is swiped through the slot of the card reader in the forward and reverse directions, respectively in accordance with various embodiments.
Figure 7B:
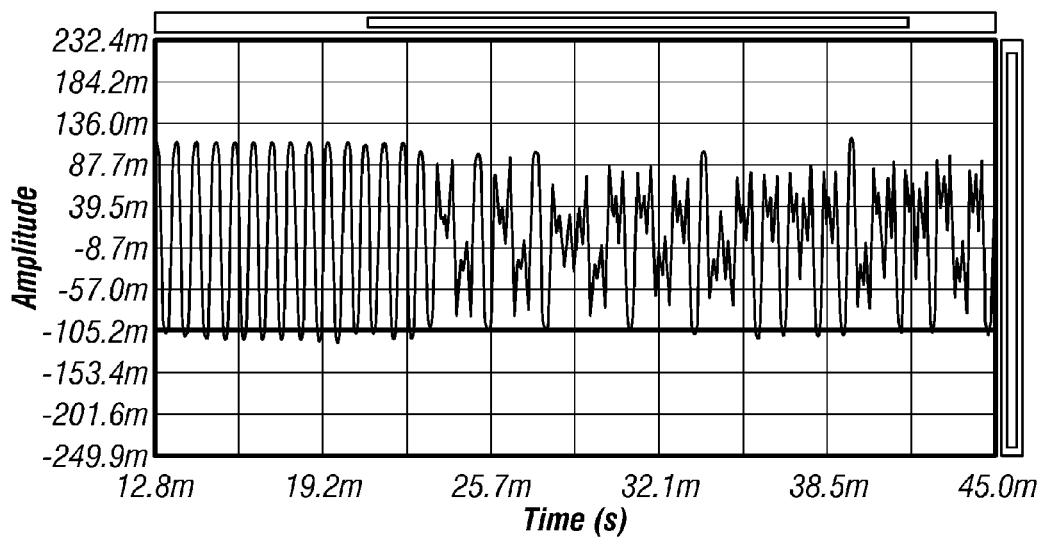

In some embodiments, read head 16 in card reader is capable of reading only one track of data (either track 1 or 2, but not both) from the magnetic stripe in order to reduce the size and structural complexity of compact read head 16 as only one pin needs to be included in the read head. FIGS. 7(a)-(b) depict examples of waveforms of data read from track 1 (instead of both tracks 1 and 2 as by a traditional read head) of the magnetic stripe by read head 16 when the card is swiped through slot 14 in the forward and reverse directions, respectively.

In some embodiments, the size or thickness of the housing 12 of card reader 10 is configured to be narrow enough to accommodate only a single read head 16. Such design is intended to be tampering-proof so that even if the housing 12 is tampered with, no additional circuitry can be added to the card reader 10 and such tampering will render the card reader non-functional.

In the example of FIGS. 6(a)-(c), spring structure 20 is a flexible spring mounting to read head 16 without a screw, causing the read head to be suspended to housing 12 of card reader 10. Here, spring 20 can either be connected to housing 12 via screws or welded to plastic housing 12 without using any screws. As the card moves past the read-head 16 on the miniaturized card reader, any card bending or misalignment may cause the read head to lose contact with the magnetic stripe. Spring 20 allows suspended read head 16 to swivel while maintaining contact pressure to track the stripe of the card being swiped. Spring 20 is designed to be sufficiently small to fit within the miniaturized card reader 10, yet powerful enough to maintain good contact during the stripe. Unlike traditional spring structures, spring 20 positions the supports for read head 20 inside the overall form of the spring, which allows the spring to flex without having to make one support moveable.

Figure 8:
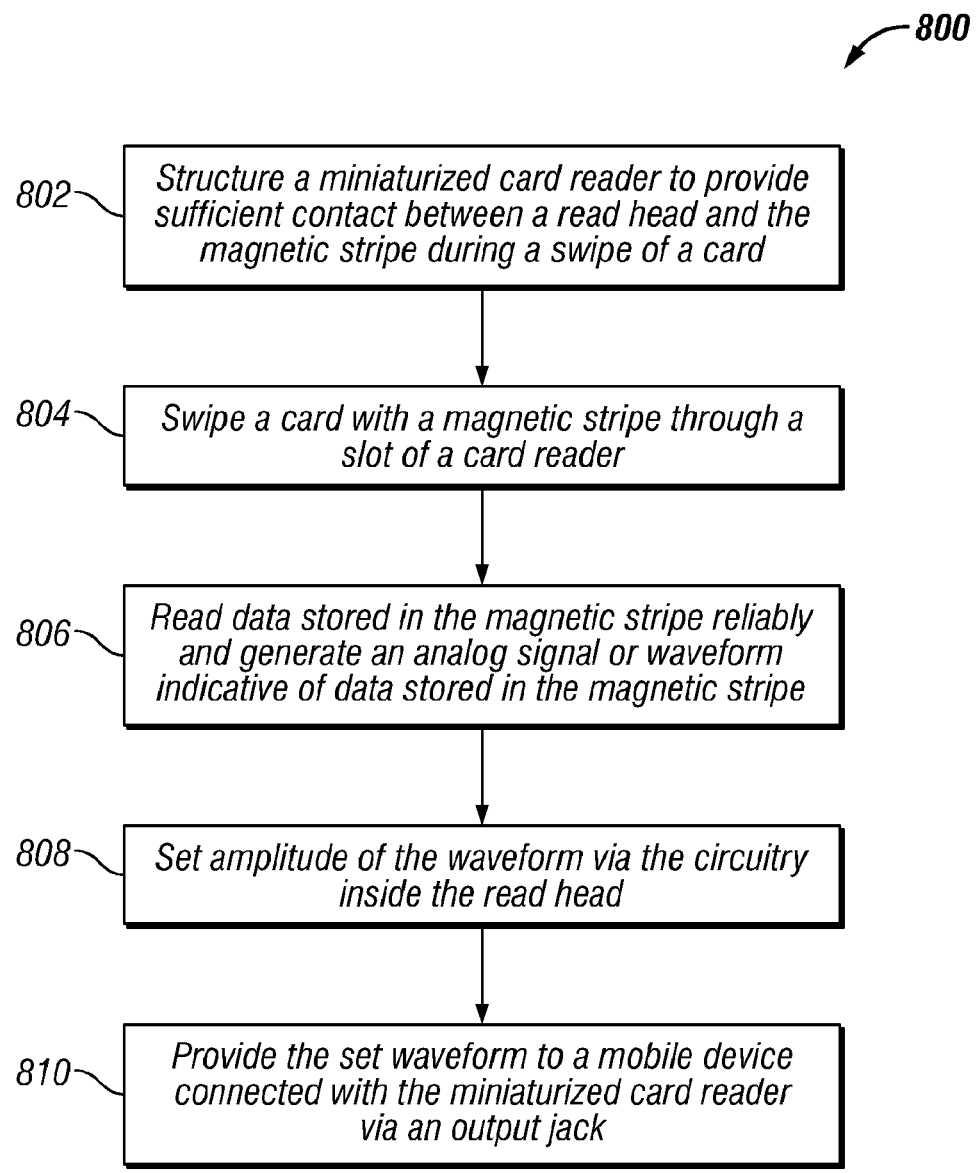
FIG. 8 depicts a flowchart of an example of a process to support swiping of a card with a magnetic stripe through a miniaturized portable card reader in accordance with an embodiment.

FIG. 8 depicts a flowchart of an example of a process to support swiping of a card with a magnetic stripe through a miniaturized portable card reader. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 8, the flowchart 800 starts at block 802 where a miniaturized card reader is structured to provide sufficient contact between a read head and the magnetic stripe during a swipe of a card. The flowchart 800 continues to block 804 where a card with a magnetic stripe is swiped through a slot of the miniaturized card reader. The flowchart 800 continues to block 806 where the read head reliably reads data stored in the magnetic stripe and generates an analog signal or waveform indicative of data stored in the magnetic stripe. The flowchart 800 continues to block 808 where amplitude of the waveform is set by the circuitry inside the read head. The flowchart 800 ends at block 810 where the set waveform is provided to a mobile device 100 connected with the miniaturized card reader via the signal plug 18.

In some embodiments, housing 12 of card reader 10 may further encapsulate a passive 10 circuitry 22 powered by the mobile device 100 through signal plug 18, wherein passive 10 circuitry 22 delivers an unique 10 of the card reader to mobile device 100 only once upon the card reader being connected to (and powered up by) the mobile device. Although both are integrated in the same housing 12, passive 10 circuitry 22 functions independently and separately from read head 18 without interfering with the read head's card swiping functions described above.

Figure 9:
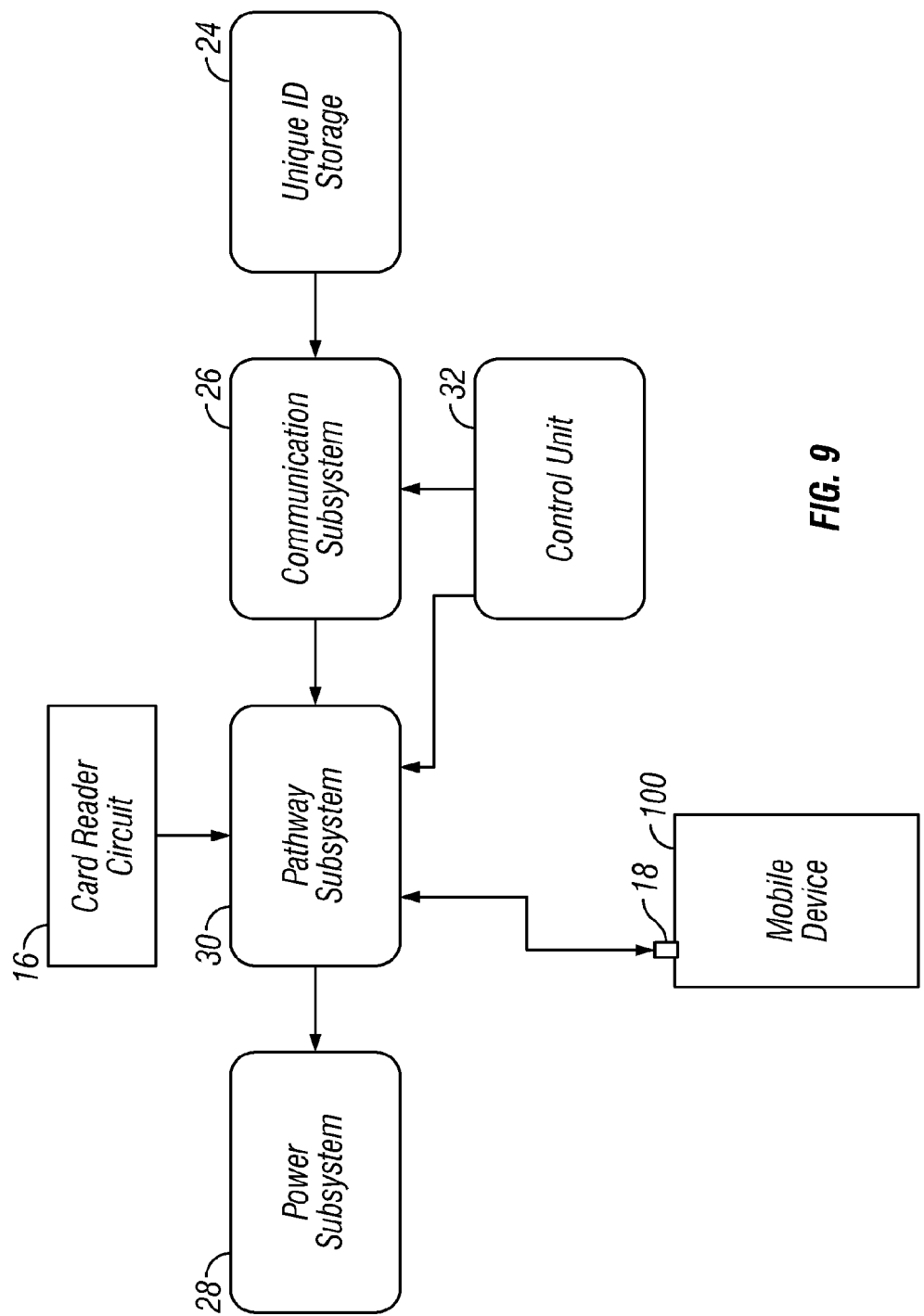
FIG. 9 depicts an example of schematic diagram of passive 10 circuitry embedded in the card reader in accordance with an embodiment.

FIG. 9 depicts an example of schematic diagram of passive 10 circuitry embedded in the card reader. In the example of FIG. 9, passive 10 circuitry 22 may comprise at least five main subsystem/components: unique 10 storage 24, communication subsystem 26, which reads and transmits the unique 10 from unique 10 storage 24, power subsystem 28, which provides power to enable communication with mobile device 100, a pathway subsystem 30 to route signals to signal plug 18 through the circuitry, and a control unit 32, to orchestrate the communication between different systems. All of these subsystems can be implemented in hardware, software or a combination thereof. Communication subsystem 26, power subsystem 28, and read head 16 share the same signal plug 18 for connection with the mobile device. The components portrayed in this figure can be arbitrarily combined or divided into separate software, firmware and/or hardware components.

Figure 10:
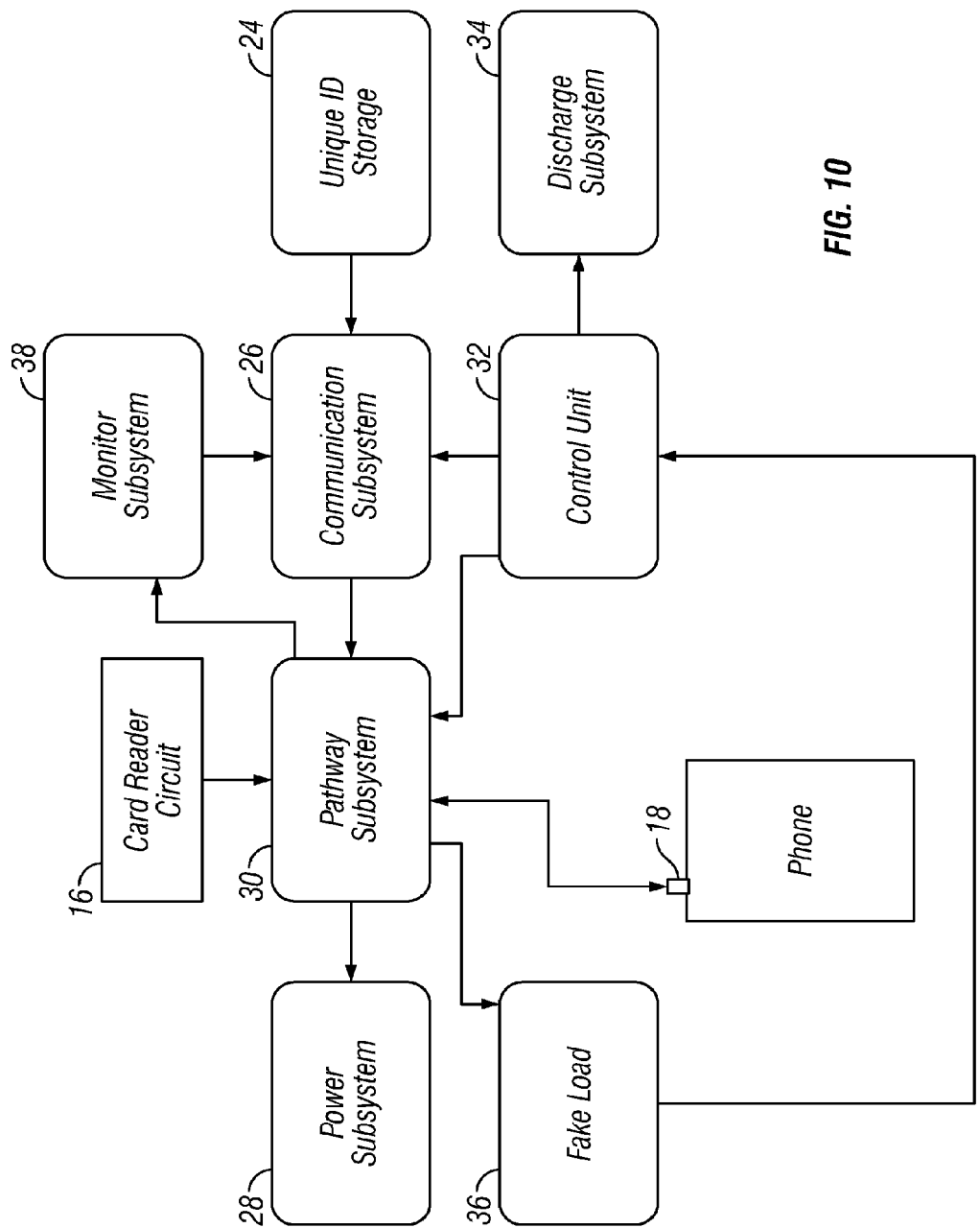
FIG. 10 depicts an example of schematic diagram that contains additional components of passive 10 circuitry 22 that contribute to the user experience in accordance with an embodiment.

In the example of FIG. 9, unique 10 storage 24 is memory containing the Unique 10 of the card reader. The unique 10 storage 24 can be any persistent memory containing bytes that can be accessed by the communication subsystem 26. In the example of FIG. 9, the power subsystem 28 comprises of a modified charge pump, which utilizes a digital circuit to artificially raise the voltage of a power source to a higher level. Normal charge pump operation requires large current which is then fed into several capacitors, and switching logic switches the capacitors between series and parallel configurations. In the example of FIG. 10, the power source is a bias voltage provided by the mobile device meant for detection of a connected component. It is nominally 1.5V and is supplied through a 2kO resistor, resulting in a maximum current of 7501JA. Details of how the power subsystem 28 function is described in FIG. 11.

In standard operation the pathway subsystem 30 is configured to direct the mobile device's 100 bias voltage to the power subsystem 28. After the power subsystem converts the bias voltage to a system voltage, the control unit 32 is able to operate. Control unit 32 configures the pathway subsystem 30 to allow the communication subsystem 26 access to the mobile device 100. The communication subsystem 26 relays the unique 10 from the unique 10 storage 24. The control unit 32 then configures the pathway subsystem 30 to allow the card reader circuit 16 access to the mobile device 100.

FIG. 10 depicts an example of schematic diagram that contains additional components of passive 10 circuitry 22 that contribute to the user experience. These additional systems prevent the mobile device 100 from perceiving that the card reader 10 has been disconnected during power cycles. These additional systems also ensure that the unique 10 sent from unique 10 storage 24 is sent as specified by the designer. This extra feature set comprises of a discharge subsystem 34 to force the device to power cycle, a fake load 36 so the mobile device 100 does not perceive a disconnect, and a monitor system 38 to manage card reader 10 behavior between power cycles.

Figure 12:
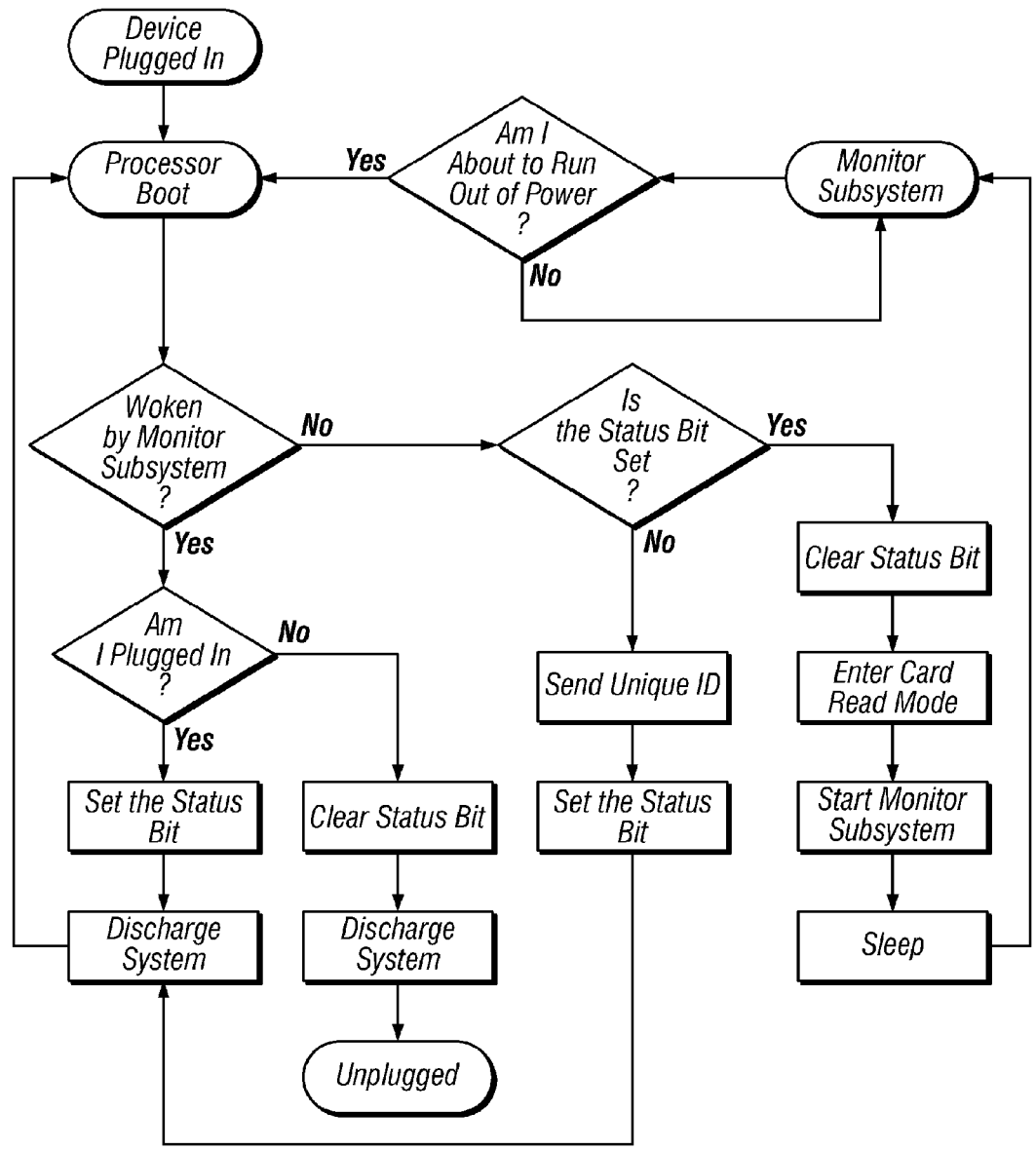
FIG. 12 depicts a flowchart of an example of a process to deliver the unique 10 to mobile device via the passive 10 circuitry in accordance with various embodiments.

In the example of FIG. 10, communication subsystem 26 comprises a signal driver connected with control unit 32 and unique 10 storage 24. In a non-limiting embodiment of a system which sends an 10 only once to a mobile device 100, after the control unit 32 boots up, communication subsystem 26 will check a status bit in the monitor subsystem 38. The first time this process occurs, the status bit will be not set. When the status bit is not set the 10 is sent immediately. FIG. 12 contains a detailed flowchart of a non-limiting example of this process. In one embodiment the control unit 32 will write to the status bit in monitor subsystem 38. It will then use the discharge system 34 to reset itself. During this time the pathway subsystem 30 will be configured to direct the signal path to the fake load preventing the mobile device 100 from detecting a disconnect with the card reader 10. Once the power subsystem 28 has completed its power cycle, the control unit 32 will read the status bit. Upon seeing that the status bit is cleared it will configure the pathway subsystem 30 to direct the signal path to the card reader circuit 16. The control unit 32 will then put the system into an extremely low power state (from here referred to as a sleep state). Only the monitoring subsystem 38 will remain active. The monitor subsystem 38 will wake the system from the sleep state at some time (time depending on implementation) before a power cycle. The control unit 32 will notified of the system awakening by the monitoring subsystem 38. The control unit 32 will then set the status bit on the monitor subsystem 38 only if there is a voltage detected on the fake load indicating the reader is still connected. The control unit 32 will then force a power cycle.

Figure 11:
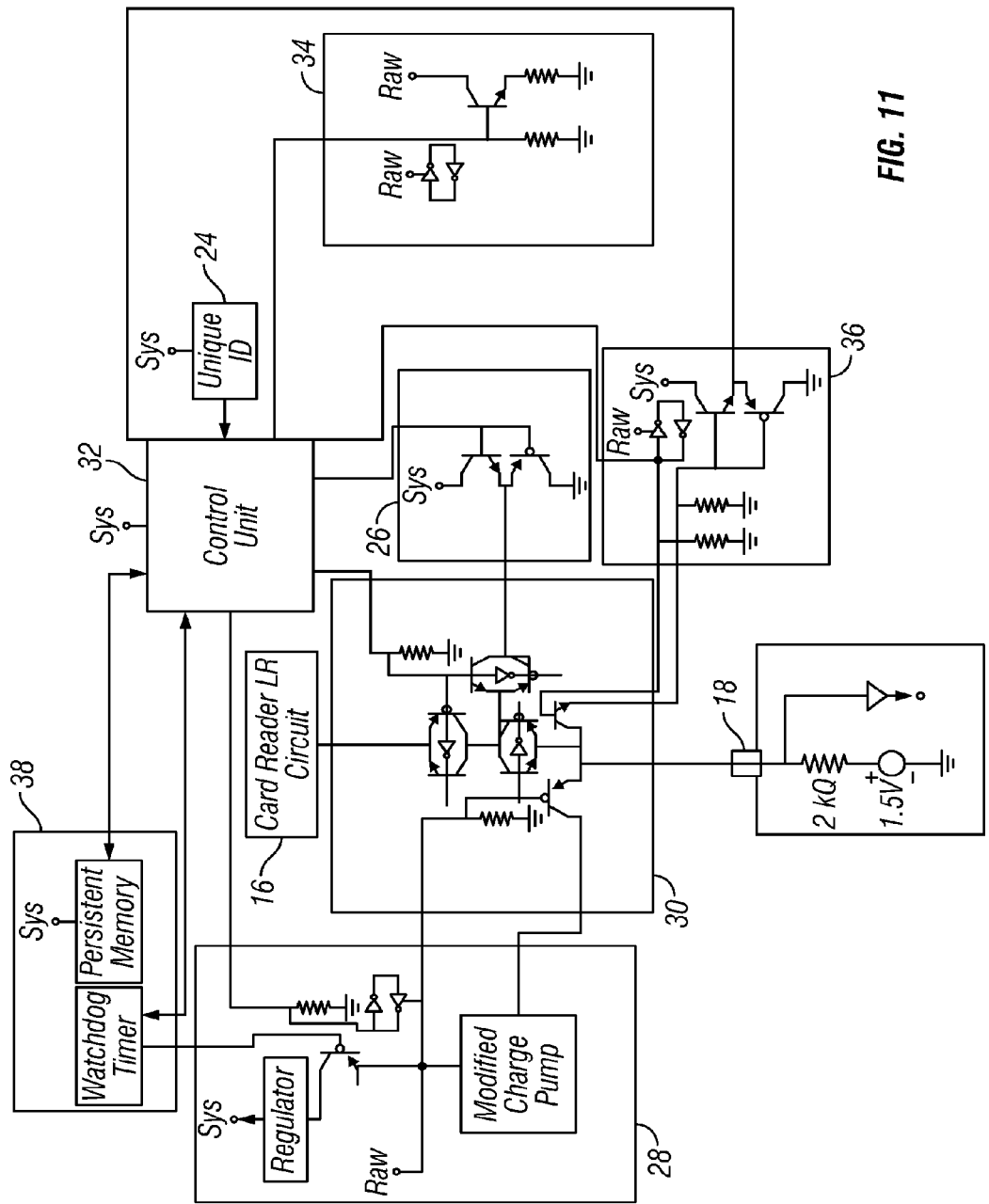
FIG. 11 depicts an example of an implementation for passive 10 circuitry 22 depicted in FIG. 10 in accordance with various embodiments.

FIG. 11 depicts an example of an implementation for passive 10 circuitry 22 depicted in FIG. 10. In some embodiments, power subsystem 28 has multiple capacitors in parallel. A voltage breaker (e.g., zener diode etc.) and a latch are used to trigger the transition between parallel and series configurations. Once the latch is flipped, power subsystem 28 will remain in series configuration until the combined voltage drops below the CMOS trigger gate voltage at about AV. At this time the passive 10 circuitry 22 will reset and the unique 10 delivery process will begin again.

In the example of FIG. 11, pathway subsystem 30 comprises a plurality of latches controlled by control unit 32 for switching among various subsystems of passive 10 circuitry 22. When passive 10 circuitry 22 is in operation, the default configuration allocates the output signal through signal plug 18 to modified charge pump of power subsystem 28. After the latch to turn off modified charge pump 28 is triggered, control unit 32 will route signal plug 18 from read head 16 to communication subsystem 26 and transmit the unique 10 through signal plug 18 after checking the status bit in unique 10 storage 24. Pathway subsystem 30 will then write to the status bit in unique 10 storage 24 and discharge the power subsystem 28. FIG. 12 depicts a flowchart of an example of a process to deliver the unique 10 to mobile device 100 via the passive 10 circuitry 22.

In some embodiments, passive 10 circuitry 22 may further include additional encryption and/or decryption systems as shown in FIG. 13 for encrypting and decrypting of unique 10 of card reader 10. In the example of FIG. 13, the decoding system 42 and encryption system 40 can both use the control unit 32 from the passive 10 circuitry 22 to communicate with the mobile device 100 over the communication subsystem 26.

Signal Decoding

Figure 14:
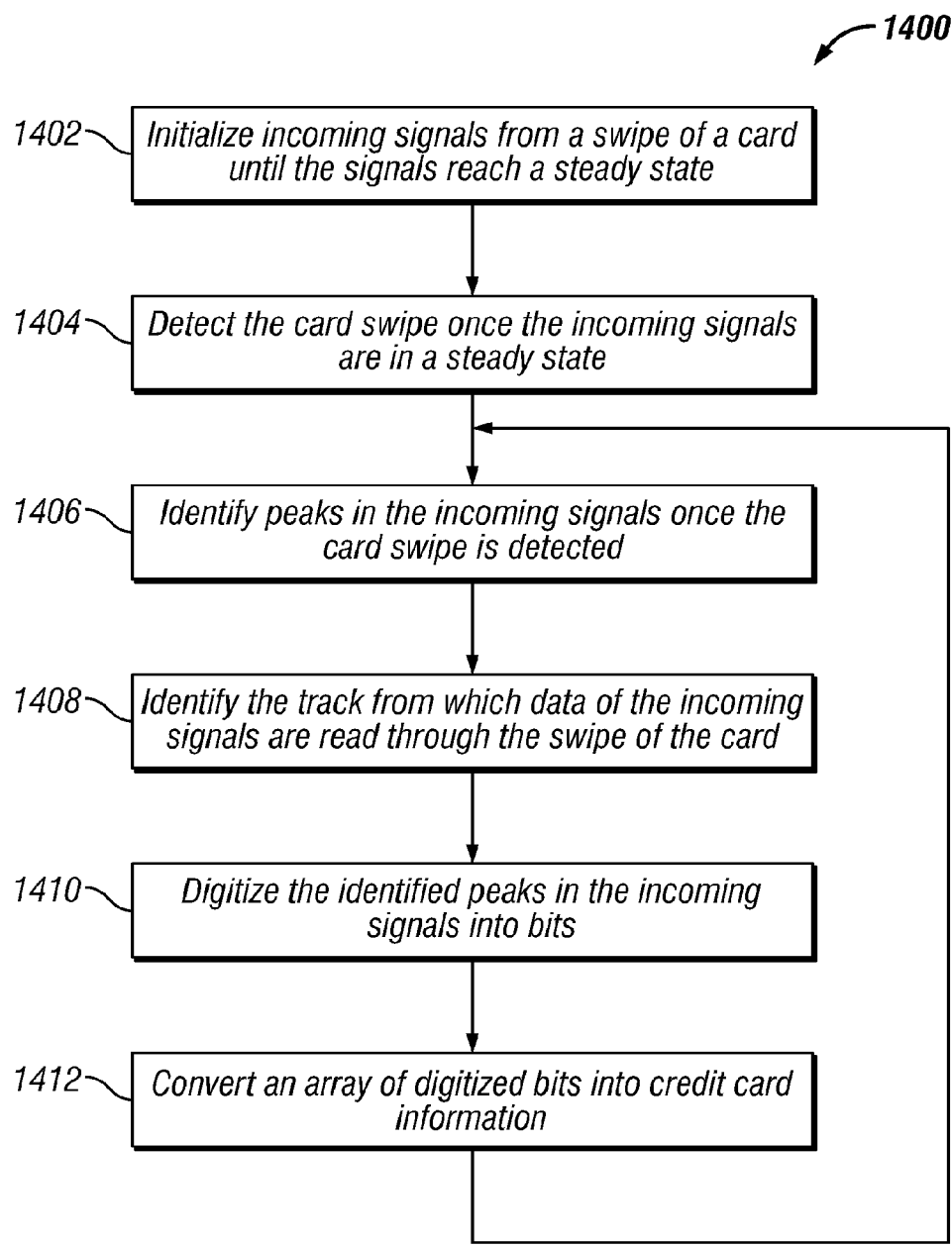
FIG. 14 depicts a flowchart of an example of a process to support decoding of incoming signals from swiping of a card with a magnetic stripe through a miniaturized portable card reader in accordance with an embodiment.

Once card reader 10 provides the set waveform to the attached mobile device 100, the incoming signals (waveform) may be amplified, sampled, and converted to a stream of digital values or samples by decoding engine 110 running via a microprocessor inside the mobile device. Here, decoding engine 110 may comprise a pipeline of software decoding processes (decoders) to decode and process the incoming signals as described below, where each software process in this pipeline can be swapped out and replaced to accommodate various densities of track data read in order to reduce card swipe error rate. The incoming signals may be of low quality due to one or more of: low quality of data read from a single and/or low density track of a magnetic stripe of the card, sampling speed limitations of the microphone input socket of the mobile device, and noise introduced into the mobile device 100 from card reader 10. FIG. 14 depicts a flowchart of an example of a process to support decoding of incoming signals from swiping of a card with a magnetic stripe through a miniaturized portable card reader.

In the example of FIG. 14, the flowchart 1400 starts at block 1402 where decoding engine 110 initializes its internal state by waiting for the system voltage to reach a steady state. Upon initial connection of a card reader, there is usually a burst of signal due to feedback caused by slight impedance mismatches and the presence of non-linear elements like the read head. After at least 3 time constants, the signal is determined to be in a steady state. During such initialization phase, the DC offset of the incoming signals are computed when the mobile device is first connected to the card reader over signal plug 18. In some embodiments, initialization goes through at least the following steps:

Take one system buffer of audio signal and compute the DC offset of this buffer.

Save the computed DC offset.

Compute the average of the last three DC offsets.

Compute the variance of the current DC offset from the average computed in step 3.

The following values presented were found to be optimum for performance in the decoding system. In the spirit of full disclosure they have been provided here to allow someone trained in the arts to be able to replicate this process. It is fully realized that many other values can be used here and depending on hardware implementation. The values here are meant to be non-limiting. If the variance computed in step 4 is less than the variance threshold, 0.06% of full scale or less than the offset percentage, 10% of the offset average computed in step 3, and the DC offset computed in step 1 is less than the noise ceiling, 3% of full scale, of the mobile device 100. After initialization is complete, decoding engine 110 can proceed to process the incoming signals to detect the swipe of the card. Otherwise, Steps 1-4 need to be repeated.

The flowchart 1400 continues to block 1404 where decoding engine 110 detects the card swipe once the incoming signals are in a steady state. This signal detection phase processes the incoming signals in steady state in order to detect the presence of a swipe of a card through the card reader. The signal detection phase is a light-weight procedure that operates at near real time. It parses the incoming signals quickly and stitches multiple system buffers of signals together to form a signal of interest. In some embodiments, the signal detection process goes through at least the following steps:

Apply software upscale of system buffers of the incoming signals.

Begin taking buffers of incoming signals and look for points that exceed a minimum signal amplitude threshold, which is a hardware-based parameterization found empirically.

Set a flag that triggers the detection of a swipe once a single point that exceeds the threshold is detected.

Once the flag triggered, the incoming signal is appended to a larger buffer until the signal drops below a minimum signal amplitude threshold for a certain period of time, e.g., 10 ms.

Trim the last 1 Oms of data to reduce the amount of signal data to be processed later.

Check to see if at least a certain number of samples have been collected in the buffer to make sure that there is enough information for later decoding. This number is parameterized based on the hardware of the mobile device used.

Alternatively, a hardware independent swipe detection process can be utilized to capture the signal of interest via Fast Fourier Transform (FFT), while trimming the front and back of the signal. Such process would include at least the following steps:

Retrieve system buffers of incoming signals and keep a certain number of buffers of history of the signals.

Compute the frequency distribution of the signal history kept via FFT.

Locate two maxima in the histogram and check if one maximum is located at 2× the frequency of the other maximum. If this condition is satisfied, continue to add on buffers of history that exhibit such behavior.

Once such behavior has stopped, begin removing signals from the beginning and ending of the signals in the buffers until SNR is maximized, wherein SNR is defined to be the two maxima's amplitudes that are greatest from the next maximum.

The flowchart 1400 continues to block 1406 once a card swipe is detected to be present where decoding engine 110 identifies peaks in the incoming signals. Peak detection is the most complex portion of decoding of incoming signals from credit card swipes, and credit card swipe decodes have traditionally not been done on heavily filtered signals like the signal that enters through the TRS plug, since most mobile device manufacturers assume the incoming signal is audio based. This results in a wide variety of signal filtering that peak detection must account for. Different peak detection approaches discussed below can be utilized by the microprocessor to perform peak detection in the incoming signals in different ways, all applying a basic, moving average low-pass filter to smooth out some of the high frequency noise in order to overcome the low quality data read, sampling speed limitations of the mobile device, and the noise introduced into the mobile device.

Reactive Peak Detection

Reactive peak detection is a heuristics based approach for peak detection, which is well suited for situations where the incoming signals from the card swipe is not excessively distorted by the mobile device's filter circuitry. This approach utilizes at least the following steps to detect signal peaks:

Seed an adaptive positive and adaptive negative threshold with an ambient noise value that is dependent on the hardware of the mobile device. These thresholds will be used for initial peak detection.

Begin processing through the sample buffer, and for each sample in the buffer:

Wait for the threshold to be crossed again when either the negative or positive threshold is crossed, except with a hysteresis factor applied to the threshold for the second crossing. The hysteresis factor is key in making this approach resistant to ringing in the incoming signals, which is associated with the active filter(s) of the platform hardware.

Begin looking for slope changes within this time frame once the two samples where the threshold is crossed have been established.

If more than one slope change is found, compute the midpoint of the two samples.

If only a single slope change is detected, then, pick the maximum point for the slope change.

Compare the peak's amplitude to the previously found peak's amplitude (if this has been established).

Skip the current peak and move on if its amplitude is greater than (([full scale]-[current peak amplitude])/([full scale]*100)+100) % of the previous peak's amplitude.

If the prior step did not result in skipping of the peak, check the peak's polarity against the previous peak's polarity.

If the peak's polarity is the same as the previous peak's polarity, then remove the previous peak and put the current peak in its place.

If the polarity of the current peak has changed, then simply add the current peak to the list of peaks. This step is another key component for making this approach resistant to ringing.

Upon the finding of a peak, update the adaptive threshold of the corresponding polarity as the polarity of the peak just found and the amplitude to be a percentage of this peak's amplitude. Here, the percentage is a parameter varied by the detection approach being used, since higher values more accurately detects peaks, but are not as resistant to noise, while lower values are more resistant to noise, but may pick up errant peaks associated with ringing.

Predictive Peak Detection

Predictive peak detection defers the heavy processing to the digitizing stage of decoding. Predictive peak detection is highly resistant to scratches in the card that could cause low quality or false peak information to manifest in the incoming signals. This approach is more memory intensive than the reactive peak detection approach since more peaks are stored. The approach utilizes at least the following steps to detect signal peaks:

Seed a positive and adaptive negative threshold with an ambient noise value that is dependent on the hardware of the mobile device.

Begin going through the sample buffer. For each sample in the buffer:

Begin waiting for the slope to change when either the positive of negative threshold is crossed.

When the slope changes, store the current sample as a peak.

Maxima Peak Detection

Maxima peak detection detects peaks by looking for local maxima and minima within a window of digital samples. If either of these is at the edges of the window of samples, then the approach skips the window and moves to the next window to look for local maxima and minima. These local maxima and minima are then stored into a list of peaks.

The flowchart 1400 continues to block 1408 where decoding engine 110 identifies the track from which data of the incoming signals are read through the swipe of the card via the card reader. Traditionally, track 1 and track 2 came off of different pins on the read head of a card reader, and so there was no need to guess which track is being read. Since read head 16 in card reader is capable of reading only one track of data from the magnetic stripe, track identification becomes an important issue. This track identification process is run by detection engine 110 after peaks are detected to guess and recognize the track (track 1 or track 2) from which the data is read by card reader by inferring a range of peaks to be expected for signals coming from each track. Since track 1 is known to be much denser in data than track 2, it is thus reasonable to expect more peaks to be identified in data coming from track 1. Although this process is not a definitive guess, it yields the correct track value 99.9% when coupled with the peak detection algorithms described herein in testing. Alternatively, track guessing can be based on the number of bits found in the digital signals after the digitizing stage of decoding. When a decoder fails due to guessing the wrong track (since track identification affects how the bits from the digital signals are framed and matched against character sets), the decoder may simply choose another track type, though this makes the card processing more processor intensive.

The flowchart 1400 continues to block 1410 where decoding engine 110 digitizes the identified peaks in the incoming signals into bits. The digitizing process takes the given peak information turns them into binary data and appends them to an array of digital bits. There are two types of digitizers: reactive digitizing and predictive digitizing.

Reactive Digitizing

Reactive digitizing takes the given peak information as fact, and attempts to convert them into 1s and 0s in the following steps:

Go through all peak information. For each peak:

Identify the distance between each pair of adjacent peaks.

If these distances are similar (e.g., based on a parameter for finding a series of peaks that are equidistant from each other), begin looking for 1s and 0s. The initial peaks always represent zeros, since the credit card is padded with zeros at the front and back of the signal.

Once equidistant peaks are found, identify the number of samples between peaks, which is the number of samples that roughly equate to a bit.

Examine the number of samples between the current peak and the next peak.

Examine the number of samples between the current peak and the peak after the next.

Compare the results from Steps 5 and 6 against the value from Step 4:

If the result from Step 5 is closer to the value from Step 4, then identify the bit found as a 0.

If the result from Step 6 is closer, then identify the bit found as a 1.

Tie breaking: if the distances are equal and the next two peak amplitudes are smaller than the current peak amplitude, then identify the bit found as a 1. Otherwise, identify the bit found as a 0.

Once the peak is determined, update the bit length based on the peak found: if the peak found was a 0, update with the value of Step 5; otherwise, use the value of step 6.

Predictive Digitizing

Predictive digitizing of detected peaks in the incoming signals does not treat the list of peaks as facts. It first finds bit length, and then seeks to a point in the peak list where the next relevant peak should be. Once it reaches this location, it then searches before and after the location for the nearest peak. The process then checks the polarity of this peak compared to the previous peak examined. If the polarities are the same, the bit found is identified as a 1. Otherwise, it is identified as a 0. This method of digitizing a peak list is effective in that it simply ignores any information that is likely irrelevant.

The flowchart 1400 ends at block 1412 where decoding engine 110 converts the array of digitized bits into words of card information. This converting process locates the bit sequence that is the start sentinel in the array. At that point, it takes frames of bits (e.g., 5 bits for track 2, 7 bits for track 1) and decodes them based on a symbol table. Along the way, the process constantly checks for parity and the LRC at the end to ensure the data is correct. If there are any errors in parity, LRC, or track length, blocks 1406-1412 may be repeated with a different set of parameters to get the correct signal data.

When a card swipe begins, decoding engine 110 can combine various peak detectors and digitizers discussed above in order to cover various ranges of degradation in quality of the analog input signal generated by card reader 10. In some embodiments, different process combinations and parameters can be chosen and optimized depending on the hardware platform of the mobile device. These combinations and parameter values can be pre-determined based on experimentation and testing and initialized upon starting of the decoding process. The decoding then runs through all processes specified and runs certain specific processes multiple times in order to get the correct signal. Such decoding process allows automatic scaling and adjustment during each run to account for different amounts of noise, sampling speed variations, signal ringing, and swipe direction.

Card Present Transaction without Information Sharing

In the example of FIG. 1, user interaction engine 120 is a software application running on mobile device 100 associated with a payee (merchant) that enables the payer (buyer) and the merchant to interact with transaction engine 130 to complete a financial transaction. More specifically, it may take input of information related to the financial transaction from the buyer and/or the merchant, provide such input to transaction engine to initiate and complete the transaction, and present the result of the transaction to the buyer and the merchant. Here, the input of information accepted by user interaction engine 120 may include but is not limited to one or more of: amount of the transaction, including list price and optionally tips, additional notes related to the transaction such as written description and/or pictures of the item to be purchased, authorization and/or signature of the buyer.

In some embodiments, other than the conventional keyboard, user interaction engine 120 may utilize a touch screen of mobile device 100 to enable the buyer and the merchant to input numbers, characters, and signatures by touching the screen via a stylus or a finger.

In some embodiments, in addition to the result of the transaction, user interaction engine 120 may also present products or services provided by the merchant to the buyer in combination of one or more of text, pictures, audio, and videos, and enable the buyer to browse through the products and services on the mobile device to choose the one he/she intended to purchase. Such product information can be stored and managed in product database 150.

In the example of FIG. 1, transaction engine 130 takes as its input the decoded credit card information from decoding engine 110 and transaction amount from user interaction engine 120. Transaction engine 130 then contacts third party financial institutions such as an acquiring bank that handles such authorization request, directly or through a payment system, which may then communicate with the card issuing bank to either authorize or deny the transaction. If the third party authorizes the transaction, then transaction engine 130 will transfer the amount of money deducted from the account of the card holder (e.g., the buyer) to an account of the merchant and provide the transaction results to user interaction engine 120 for presentation to the buyer and the merchant. In this manner, the merchant may accept a payment from the buyer via card reader 10 and mobile device 100.

In the example of FIG. 1, although mobile device 100 is associated with the merchant, transaction engine 130 running on mobile device 100 protects the privacy of the buyer/payer during the card-present transaction by taking card information from the buyer directly from decoding engine 110 and do not share such information with the merchant via user interaction engine 120. Here, the card information that are not shared with the merchant includes but is not limited to, card number, card holder's name, expiration date, security code, etc. In essence, transaction engine 130 serves as an intermediary between the buyer and the merchant, so that the buyer does not have to share his/her card information with the merchant as in a typical card-present transaction or an online transaction. Still, the buyer is able obtain an itemized receipt for the transaction completed as discussed later.

In some embodiments, although transaction engine 130 does not share card information of the buyer to the merchant, it may present identity information of the buyer, such as a picture of the buyer on record in user database 140, with the merchant via user interaction engine 120 so that merchant can reliably confirm the identity of the buyer during the card-present transaction to prevent credit fraud.

In the example of FIG. 1, user database 140, product database 150, and transaction database 160 can be used to store information of buyer and the merchant, products and services provided by the merchant, and transactions performed, respectively. This information can also be stored by the payment system. Here, user information (e.g., name, telephone number, e-mail, etc.) can be obtained through online user registration and product information can be provided by the merchant, while transaction database 160 is updated every time a transaction is processed by the transaction engine 130. Information stored can be selectively accessed and provided to the buyer and/or merchant as necessary.

In the example of FIG. 1, transaction engine 130 communicates and interacts with the third party financial institution directly or through the payment system, user database 140, product database 150, and transaction database 160 over a network through the payment system (not shown). Here, the network can be a communication network based on certain communication protocols, such as TCP/IP protocol. Such network can be but is not limited to, internet, intranet, wide area network (WAN), local area network (LAN), wireless network, BLUETOOTH®, WiFi, and mobile communication network. The physical connections of the network and the communication protocols are well known to those of skill in the art.

Dynamic Receipt

In various embodiments, upon the completion of a financial transaction through, for a non-limiting example, card reader 10 connected to mobile device 100 associated with a merchant, transaction engine 130 running on the mobile device 100 can be configured to capture additional data associated with the transaction and incorporate the additional data into a dynamic receipt for the transaction, wherein in addition to transaction information typically included in a conventional receipt, the dynamic receipt may also include additional environmental information of the transaction. For non-limiting examples, the financial transaction can be an electronic transaction conducted over the Internet or a card present point-of-sale transaction where the buyer/payer makes the purchase at a store front, other "brick-and-mortar" location, or simply in presence of a merchant/payee.

In some embodiments, the additional environmental information included in the dynamic receipt may include information pertaining to the transaction environment. In one non-limiting example, a mobile device equipped with a Global Positioning System (GPS) receiver can be used to capture the coordinates/location of the transaction, and record it as a part of the information on the dynamic receipt. This way, the physical location of the point of sale (which may be different from the merchant/payee's registered address) can be recorded and used by transaction engine 120 to verify the transaction. In another non-limiting example, a mobile device equipped with a camera and/or audio and/or video recorder can be used to capture a photo and/or a video and/or an audio recording of the product or service involved in the transaction and incorporates such data or link/reference to such data into the dynamic receipt. In another non-limiting example, a mobile device with a biometric scanner can be used to scan the fingerprint or palm print of the buyer/payer and/or merchant/payee and includes at least a portion of such information in the dynamic receipt. In another nonlimiting example, the mobile device can record certain information associated with the transaction in the dynamic receipt, wherein such information includes but is not limited to, how quickly the buyer swipes the card, the angle at which the card is swiped. In another non-limiting example, special characteristics of the card being swiped, also referred to as the magnetic fingerprint of the card, can be recorded and included in the dynamic receipt.

In some embodiments, the dynamic receipt can be in electronic form that can be accessed electronically or online and may also include link or reference pointing to multimedia information such as image, video or audio that are relevant to the transaction.

In some embodiments, transaction engine 130 can use the environmental information included in the dynamic receipt to assess risk associated with a transaction. For a non-limiting example, if the GPS information indicates that the transaction is taking place in a high crime/high risk area, the risk associated with the transaction is adjusted accordingly, and the buyer's bank may be notified accordingly. Alternatively, biometric information scanned and included in the dynamic receipt can be used for identity verification purposes to prevent identity theft and credit fraud.

In some embodiments, transaction engine 130 can use the dynamic receipt can be used as a non-intrusive way to communicate with the buyer and/or the merchant. For a non-limiting example, the additional information included in the dynamic receipt can be used to make offers to the buyer. If a dynamic receipt includes the GPS location of the point of sale of the transaction, coupons or other promotional offers made by vendors at nearby locations can be presented to the buyer when the buyer chooses to view the receipt electronically online. Alternatively, if a specific product involved the transaction can be identified by the transaction engine either directly through product description or indirectly by analyzing pictures or videos taken, offers of similar or complementary products can be made by a vendor to the merchant of the product.

In some embodiments, transaction engine 130 may notify buyer and/or the merchant of the receipt via an electronic message, which can be but is not limited to, an email message, a Short Message Service (SMS) message, TWITTER®, or other forms of electronic communication. The recipient of the electronic message may then retrieve a complete itemized dynamic receipt online at his/her convenience via a telephone number on his/her record in user database 140 to retrieve his/her electronic receipts stored in transaction database 160. In some embodiments, the electronic message may include an indication such as a code that the recipient can use to retrieve the electronic receipt online as an alternative or in combination with the telephone number.

Figure 15:
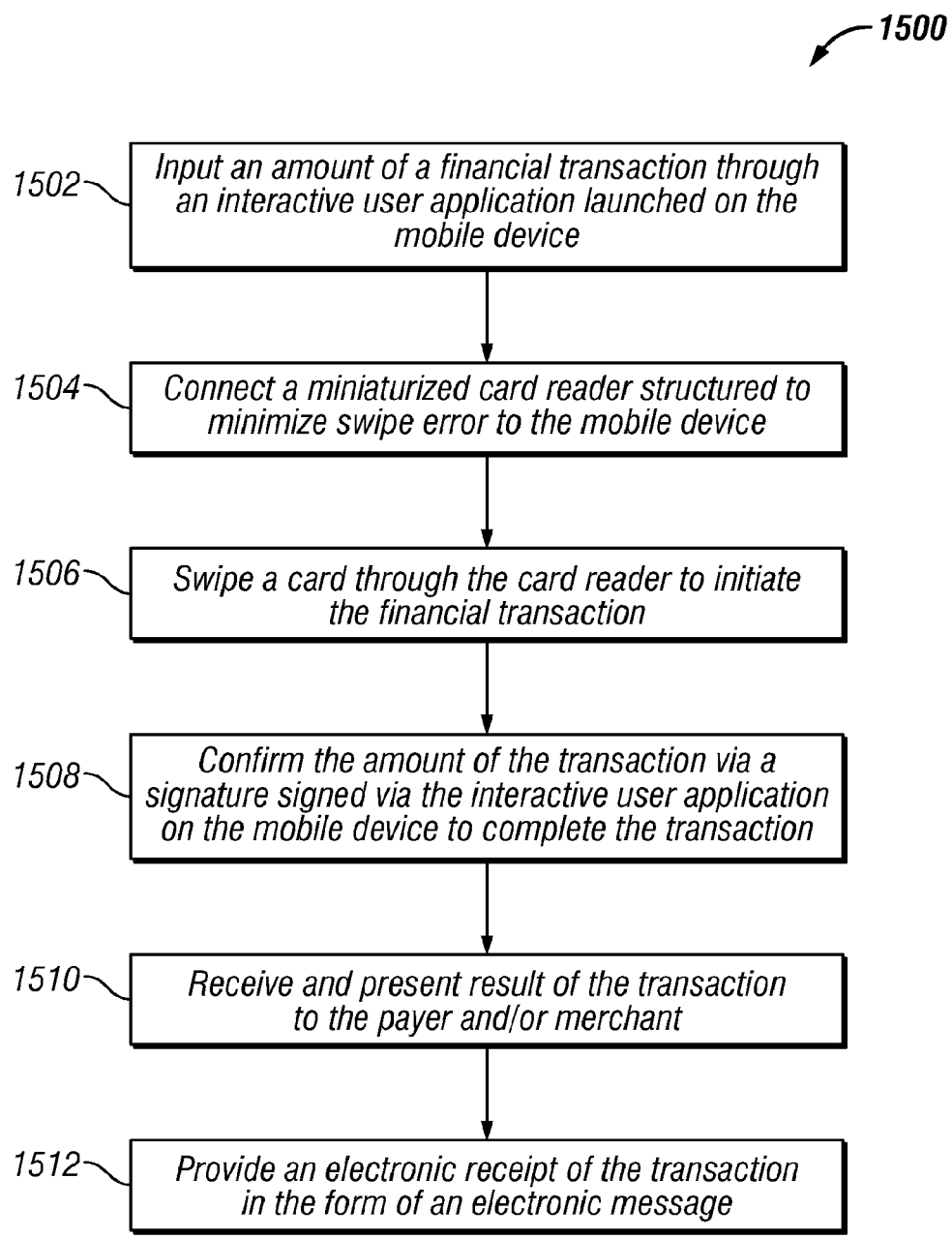
FIG. 15 depicts a flowchart of an example of a process to support financial transaction between a payer and a payee through a miniaturized card reader connected to a mobile device in accordance with an embodiment.
Figure 16A:
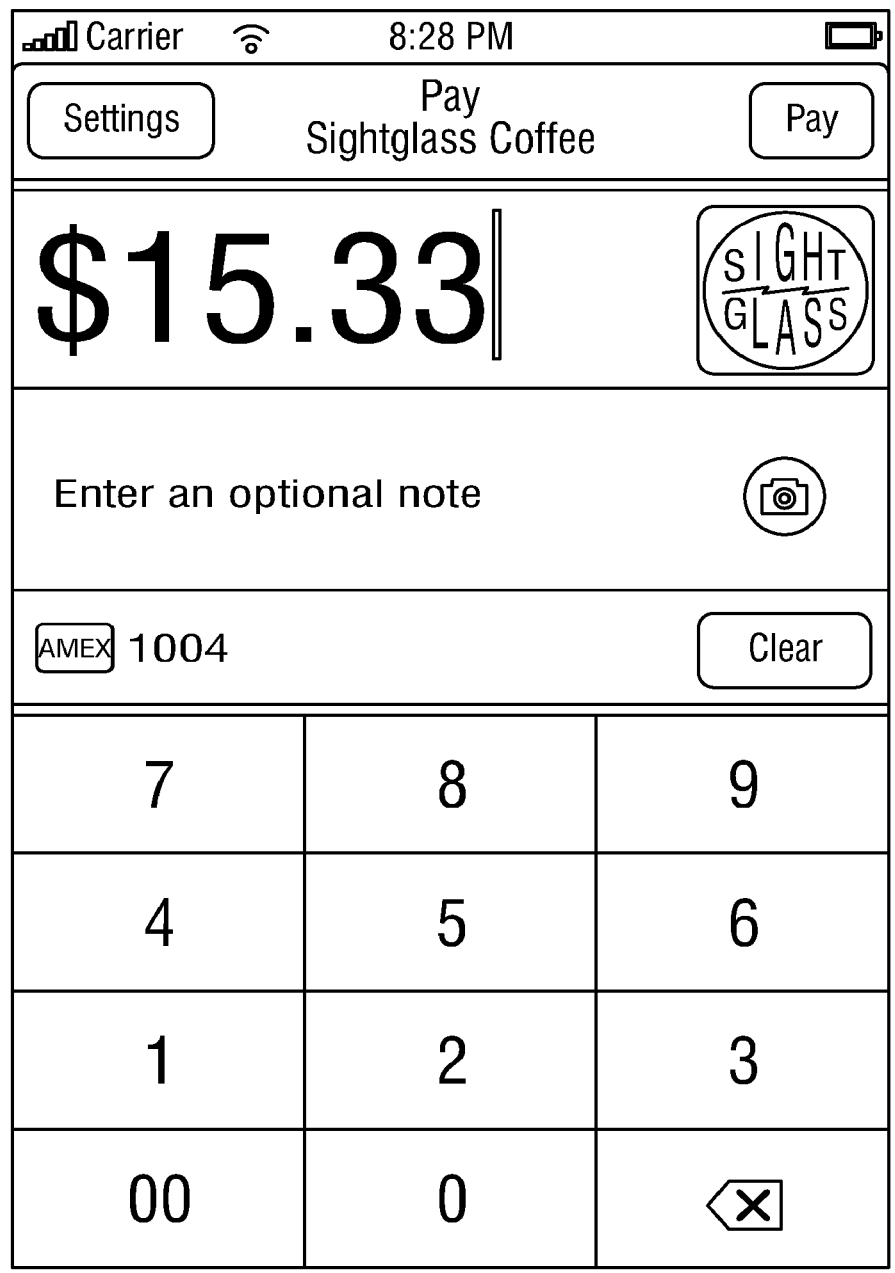
FIGS. 16A-16F depict screenshots of an example of a financial transaction between a purchaser and a merchant through a miniaturized card reader connected to a mobile device in accordance with various embodiments.
Figure 16B:
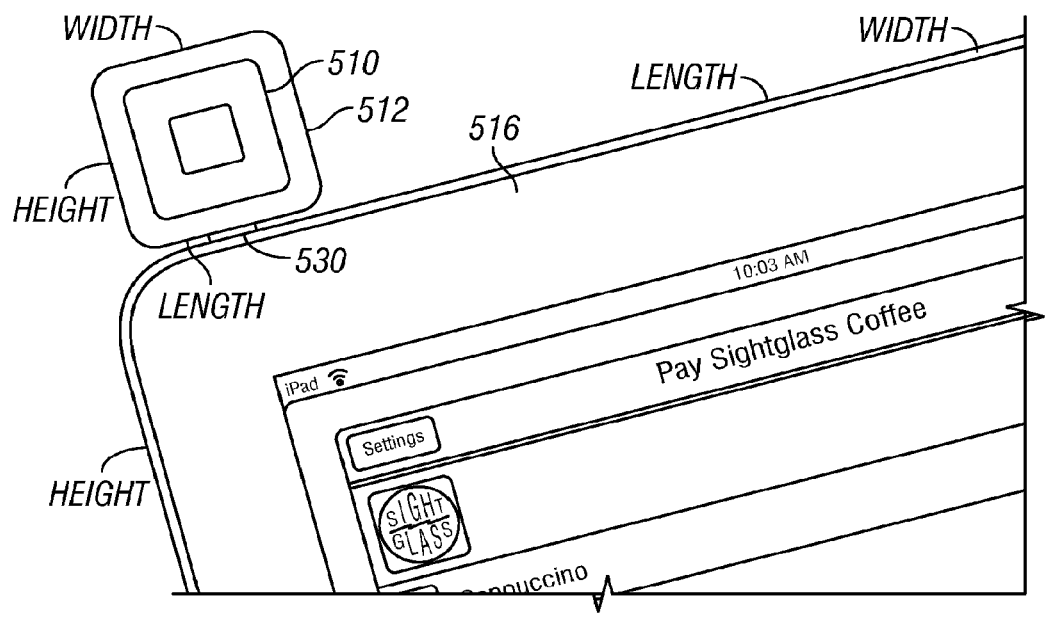
Figure 16C:
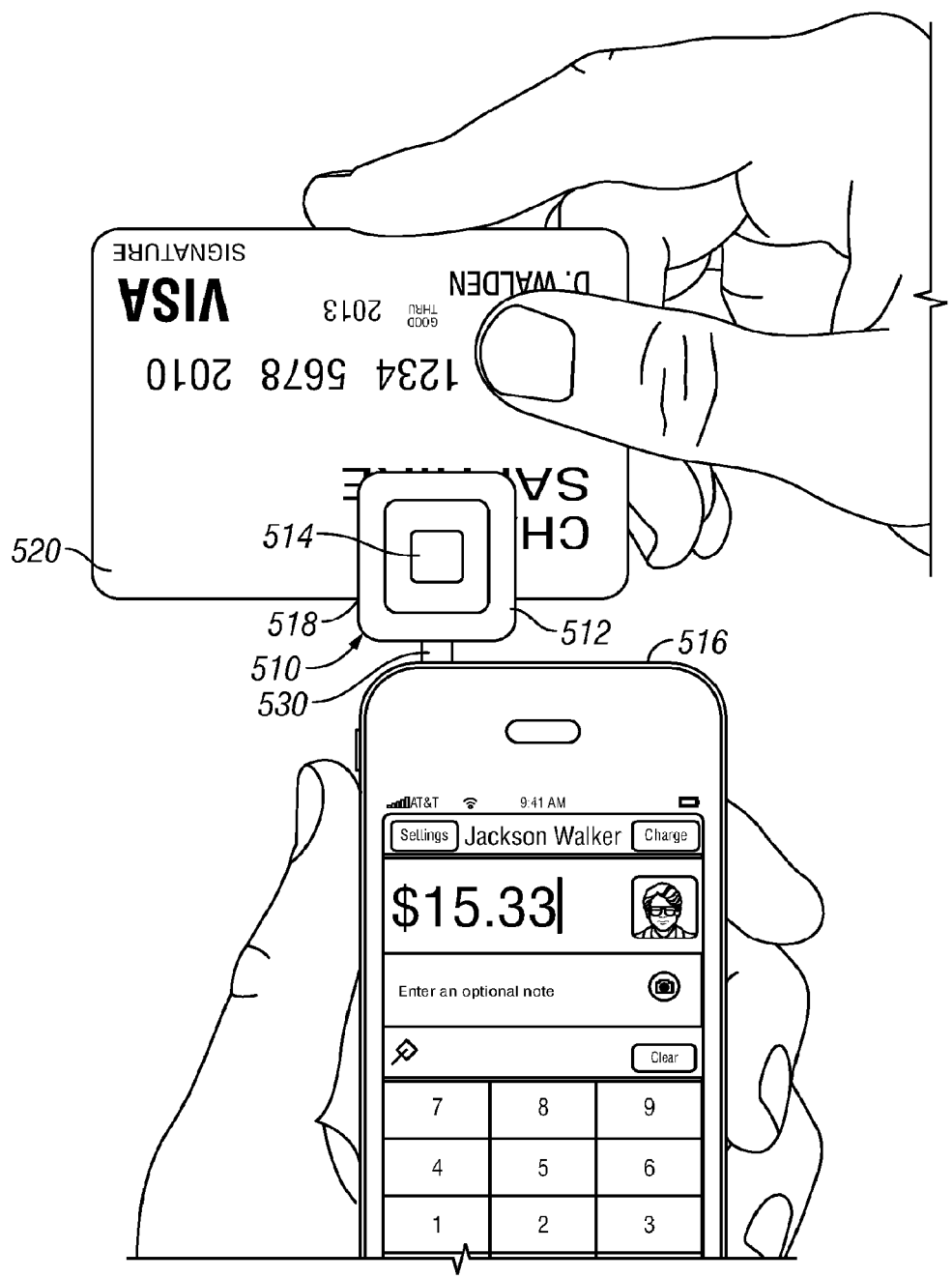
Figure 16D:
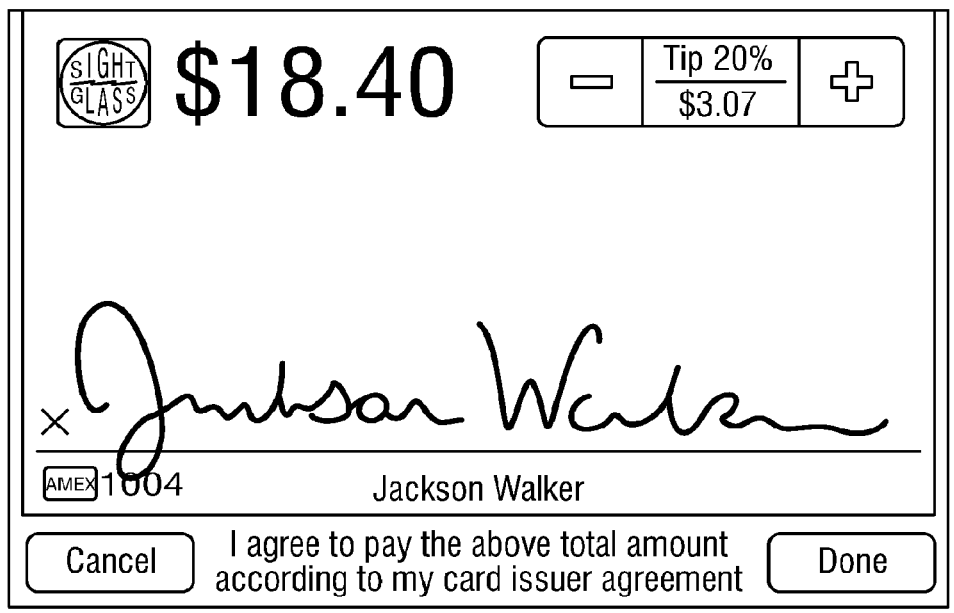
Figure 16F:
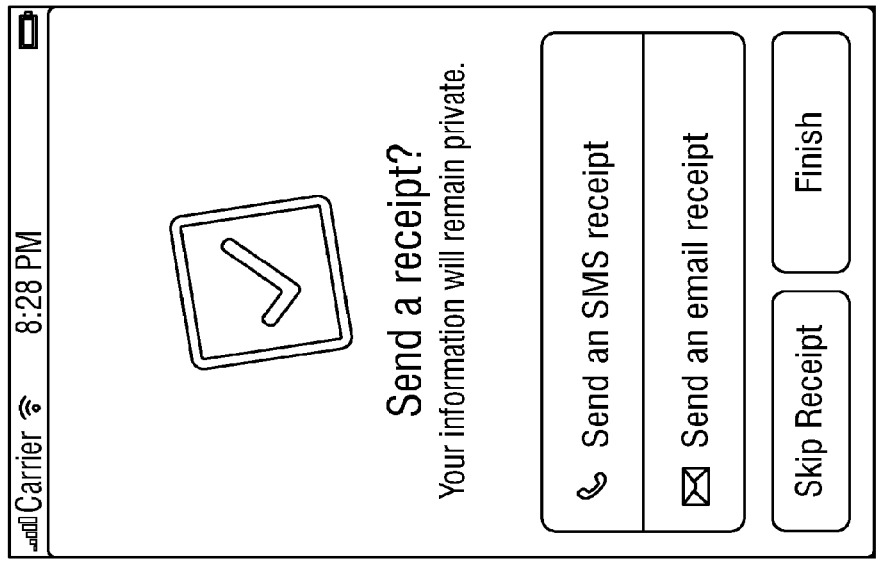
Figure 16E:
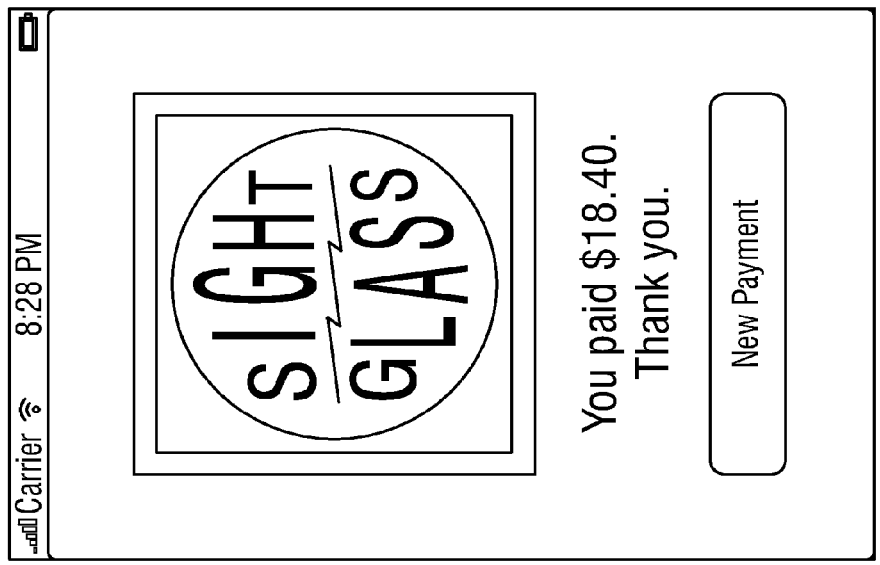

FIG. 15 depicts a flowchart of an example of a process to support financial transaction between a payer and a payee through a miniaturized card reader, which has length and height dimensions smaller than length of height dimensions of the associated mobile device, connected to a mobile device. In the example of FIG. 15, the flowchart 1500 starts at block 1502 where an amount of a financial transaction is provided through an interactive user application launched on the mobile device as shown in FIG. 16(*a*). The flowchart 1500 continues to block 1504 where a miniaturized card reader structured to minimize swipe error is connected to the mobile device as shown in FIG. 16(*b*). The flowchart 1500 continues to block 1506 where a card is swiped through the card reader to initiate the financial transaction as shown in FIG. 16(*c*). The flowchart 1500 continues to block 1508 where the payer confirms the amount of the card-present transaction via a signature signed via the interactive user application on the mobile device to complete the transaction as shown in FIG. 16(*d*). Payments are made with the use of the payment system which is coupled to the mobile device 100 Note that the signature is required as an additional layer of confirmation for the protection for the payer even when such signature may not be technically required to authorize the transaction. The flowchart 1500 continues to block 1510 where result of the transaction is received and presented to the payer and/or merchant as shown in FIG. 16(*e*) through the use of the payment system. The flowchart 1500 ends at block 1512 where an electronic receipt of the transaction is provided to the payer in the form of an electronic message as shown in FIG. 16(*f*).

In one embodiment, a longitudinal plane of the of the output jack 18 lies within the plane that the card travels in the slot 14 within 5 mm, and in another embodiment within 3 mm.

Figure 17:
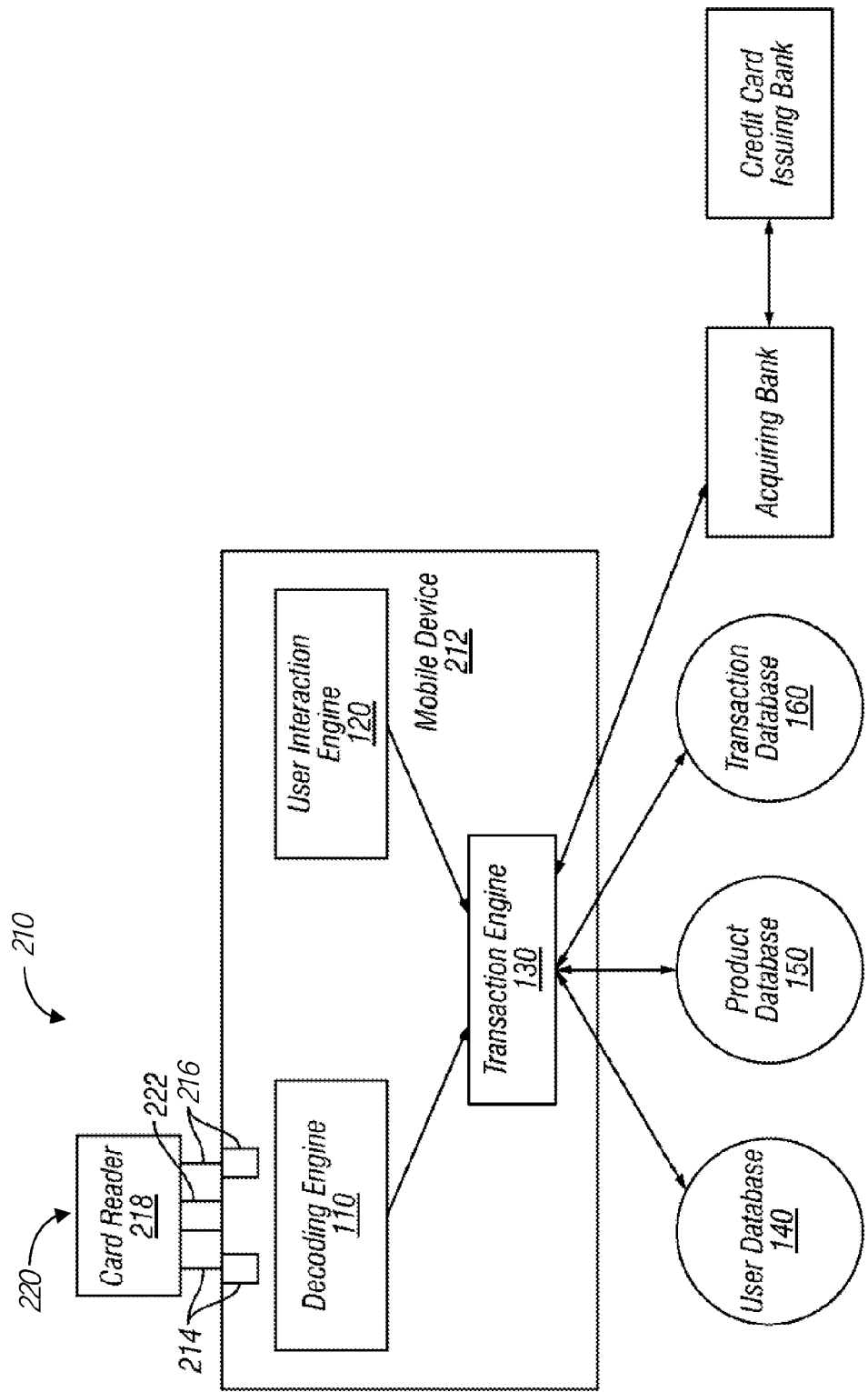
FIG. 17 illustrates an integrated read head/mobile device in accordance with an embodiment.

Referring now to FIG. 17, in one embodiment of the present invention an integrated read head system includes mobile device 212 with an audio jack 214 at least one microphone input port 216 and other ports, including but not limited to a USB port. A read head 218 is physically coupled to the mobile device 212. The read head 218 has a slot 220 for swiping a magnetic stripe of a financial transaction card to enable a financial transaction between a buyer and seller with the payment system. The read head 218 reads data on the magnetic stripe and produces a signal indicative of data stored on the magnetic stripe. The read head 218 has an output jack 222 that physically connects the read head 218 to at least one of the audio jack 214 or microphone port 216 of the mobile device 212, the USB port and the like. The read head 218 provides the signal to the mobile device 212. The signal is decoded at the mobile device 212. The decoding includes determining pulses in the signal and converts at least some of the pulses to characters.

In another embodiment of the present invention, a method is provided for conducting a financial transaction with a financial transaction card using the integrated read head system 210.

Figure 18:
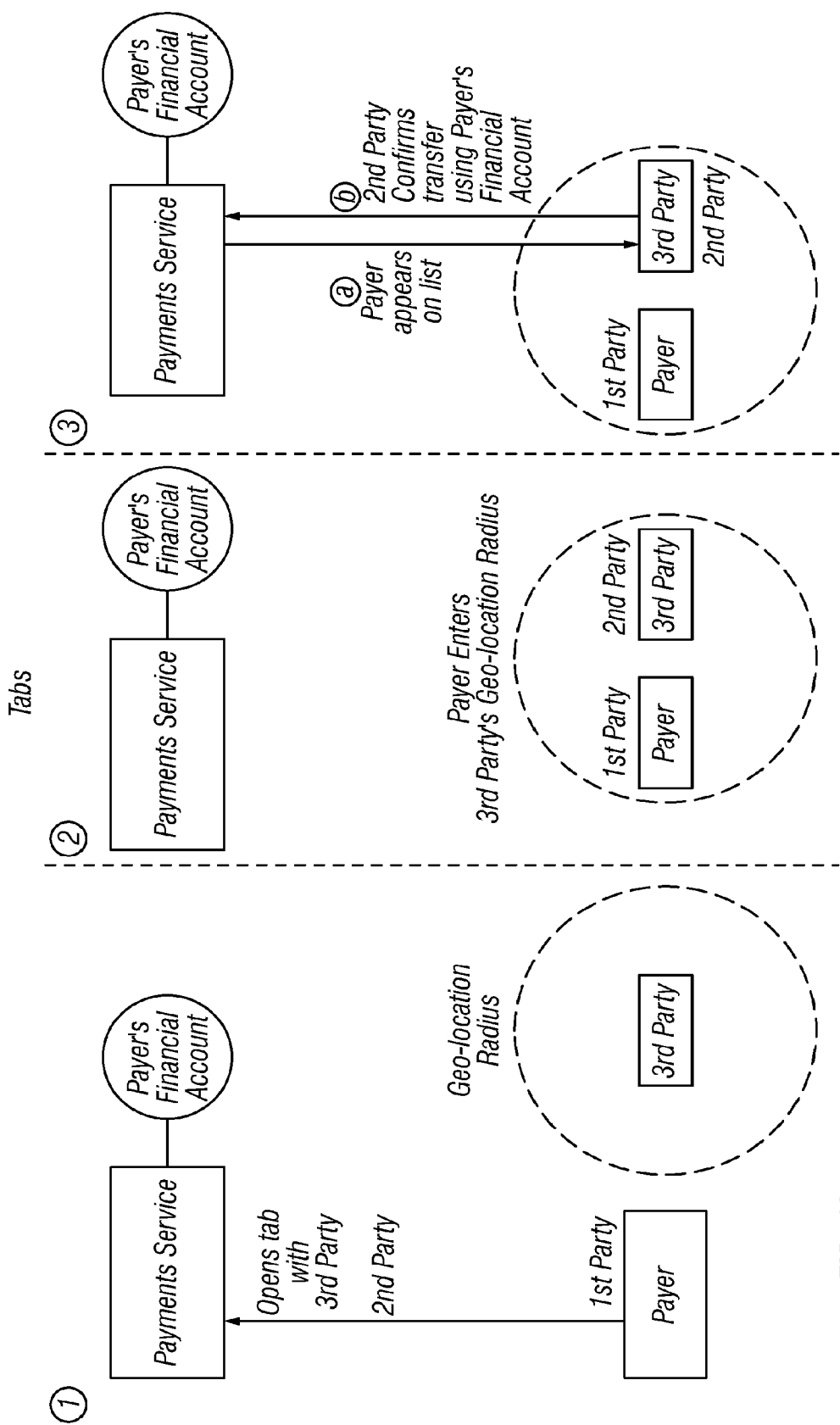
FIG. 18 illustrates one embodiment of a method of making payments using a mobile device where a tab is opened by a first party and is selected by a qualified second party at any geographic location of the first party's mobile device in accordance with an embodiment.
Figure 19:
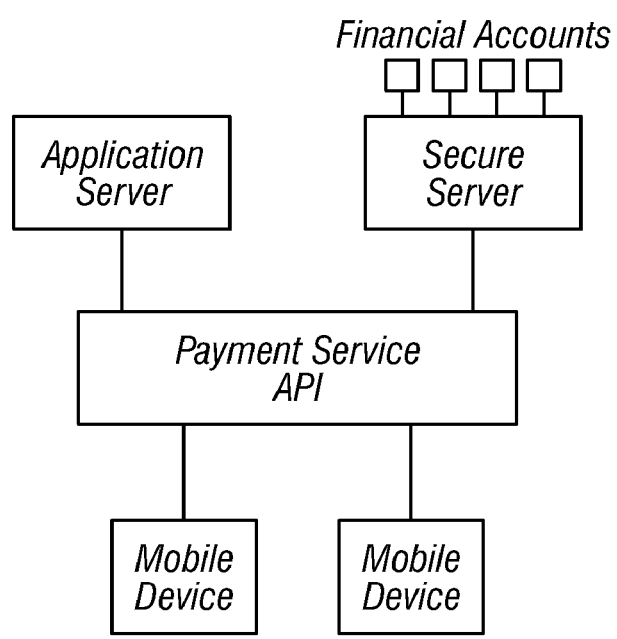
FIG. 19 illustrates an overall system architecture of a payment service that can be used in various embodiments of the present invention.

In one embodiment of the present invention, as illustrated in FIG. 18, a method of paying a second party (payee) is provided. In this embodiment, a first party (payer) views the names of one or more qualified second parties. The qualified second parties are second parties that, (i) have an association with the payment service, and (ii) second parties that if they do not have an established association with the payment service then they have established one prior to payment. The first party has an association with the payment service. A tab is opened by the first party that can be selected by the qualified second party at any geographic location of a first party's mobile device 100. The qualified second party is only able to charge a first party's financial account when the first party's mobile device 100 is within a defined geographic area. The tab is a relationship between the first party, the payment service and the qualified second party. The qualified second party can engage in a financial transaction with the first party is within the defined geographic area. The overall architecture of the payment system is illustrated in FIG. 19.

The first party's mobile device 100 is configured to communicate with the payment service. The first party views the names of the one or more qualified second parties with the first party's mobile device 100. The first party establishes the first party's financial account. The first party enters financial account information with a single initial entry to the payment service and additional entries of the financial account information to the payment service are not required for future financial transactions between the first party and any qualified second party when the same payment service is used.

The financial account is selected from at least one of, a bank account, credit card, debit card, pre-paid card, a second party financial account and the like. The financial account is selected by the first party by at least one of, use of a mobile device 100, from a bank terminal, done on-line and the like. The first party's financial account can be a financial transaction card, and the entering of the first party's financial card information is with a mobile device 100. Entering of the financial card information can be done by, swiping the financial transaction card through a slot of a card reader coupled to the mobile device 100, through a slot of the mobile device 100, by touch of the financial transaction card to the mobile device 100, by typing in information at the mobile device 100, with photos, by selecting a card from an application on a mobile device 100, from an on-line entity and the like. The mobile device 100 is a device as described above.

The qualified second party can see a list of first parties that have an association with the payment service. The qualified second party can view a list of first parties with open tabs. The list of first parties seen by the qualified second party has first party identifying information. The identifying information is anything that reliably identifies the first party and can include, but is not limited to, names, photos, cell number, social security number, e-mail address, other personal identifying information for a first party and the like.

In another embodiment, a method of paying a second party a first party views the names of one or more qualified second parties with a mobile device 100. Preferably, the mobile device 100 is the first party's mobile device 100. A tab is then opened by the first party as recited above that can be selected by the qualified second party at any geographic location of the first party's mobile device 100, but the qualified second party is only able to charge a first party's financial transaction card when the first party's mobile device 100 is within a defined geographic area In one embodiment, the mobile device 100 is coupled to a card reader that includes an output jack adapted to be inserted at least one of the audio input port or microphone input port, USB port and the like of the mobile device 100 and delivers a signal to the mobile device 100. In various embodiments, the sampling rate of the signal at the audio input port or a line input port of the mobile device 100 is at least 15 kHz, 20 kHz. 30 kHz, 40 kHz and the like.

Entering of the financial card information can be achieved by a variety of methods including but not limited to, swiping the financial transaction card through a slot of a card reader coupled to the mobile device 100, through a slot of the mobile device 100, with a touch of the financial transaction card to the mobile device 100, typing in information at the mobile device 100, with photos, selecting a card from an application on a mobile device 100 and from an on-line entity and the like.

A confirmation of payment can be made to the first party in response to a transfer of funds from the financial transaction card. In various embodiments, the financial transaction card is selected from at least one of, credit financial transaction card, debit financial transaction card, gift financial transaction card, fund transfer financial transaction card, other types of payment authenticating piece capable of carrying out a transfer of funds and the like, as set forth above.

Figure 20:
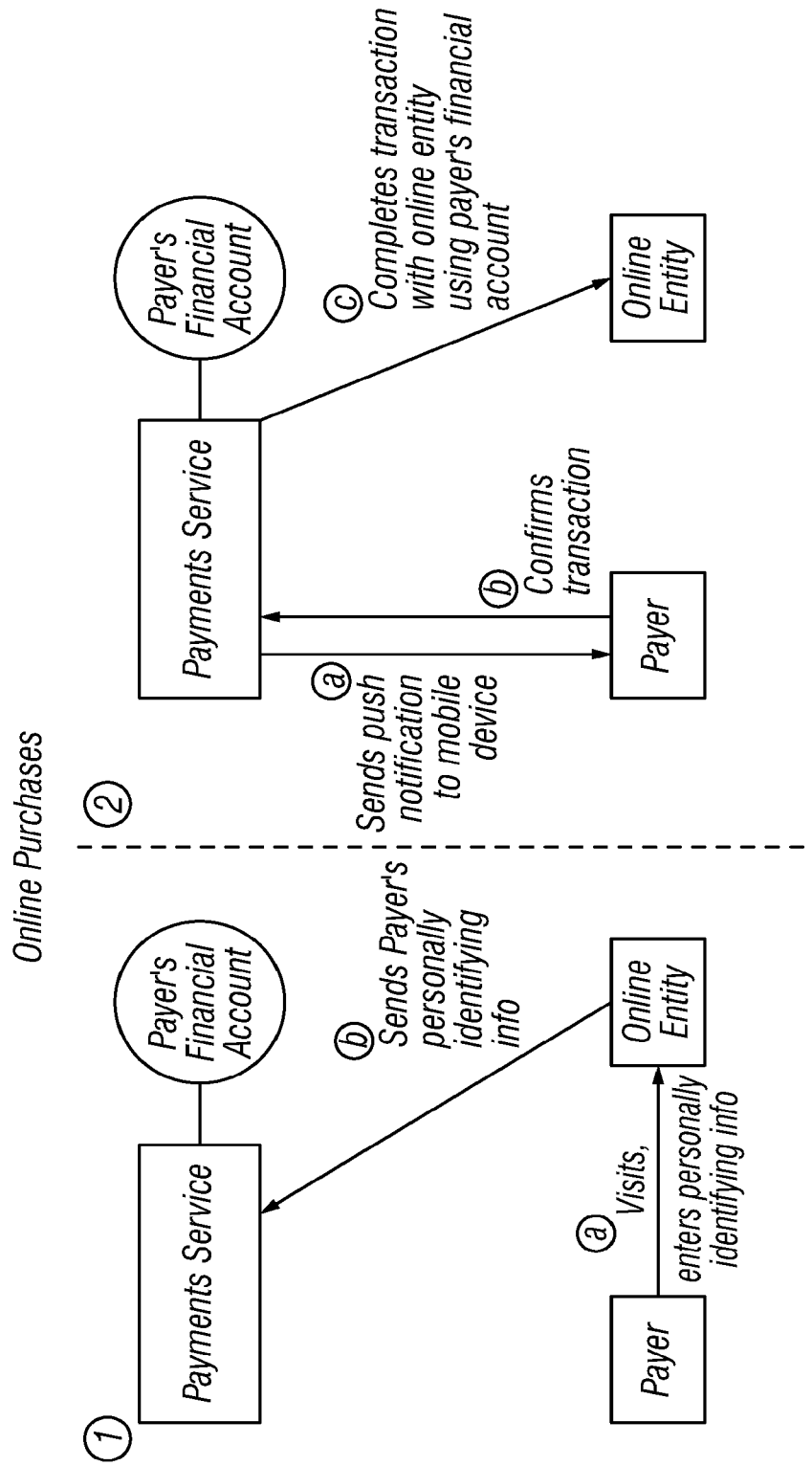
FIG. 20 illustrates an embodiment of the present invention for a method of conducting on-line purchases using a mobile device.

In another embodiment of the present invention, illustrated in FIG. 20, a method is provided of conducing on-line purchases using a mobile device 100. A first party visits a second party on-line entity. The first party accesses a second party on¬line entity. The first party is already registered with the payment service or becomes registered prior to the conclusion of completing a transaction. The mobile device 100 is configured to communicate with the payment service. The first party considers conducting a transaction with the second party on-line entity. The second party on-line entity is registered with the payment service, or in response to the first party's desire to transact with the second party on-line entity, the second party on-line entity becomes registered with the payment service. The first party enters personal identifying information that is sent to the payment service. In response, the first party receives a push notification to the first party's mobile device 100 that enables the first party to complete the transaction with the second party on-line entity.

In various embodiments, the first party's personal identifying information is entered by at least one of, use of a mobile device 100, from a bank terminal, done online and the like. For the transaction, the first party uses the first party's financial account. The first party enters financial account as recited above, which does not require re-entry with the payment service for future transactions with second parties that are also registered with the payment service.

In one embodiment, the first party uses the first party's financial transaction card for the transaction where the card information is entered to the payment service as recited above. Additionally, the first party enters its personal identifying information with the payment service only once as recited above and need not re-enter for second party transactions.

In various embodiments, the on-line entity is any second party that can transact business with the payment service including but not limited to, merchants, peers and the like.

In one specific embodiment, the first party enters its personal identifying information that is sent to the payment service using the first party's mobile device 100. In this embodiment, the first party can use a first party financial card to complete the transaction. The first party's mobile device 100 is coupled to a card reader that includes an output jack adapted to be inserted at least one of the audio input port or microphone input port, USB port and the like, of the mobile device 100 and delivers a signal to the mobile device 100.

Figure 21:
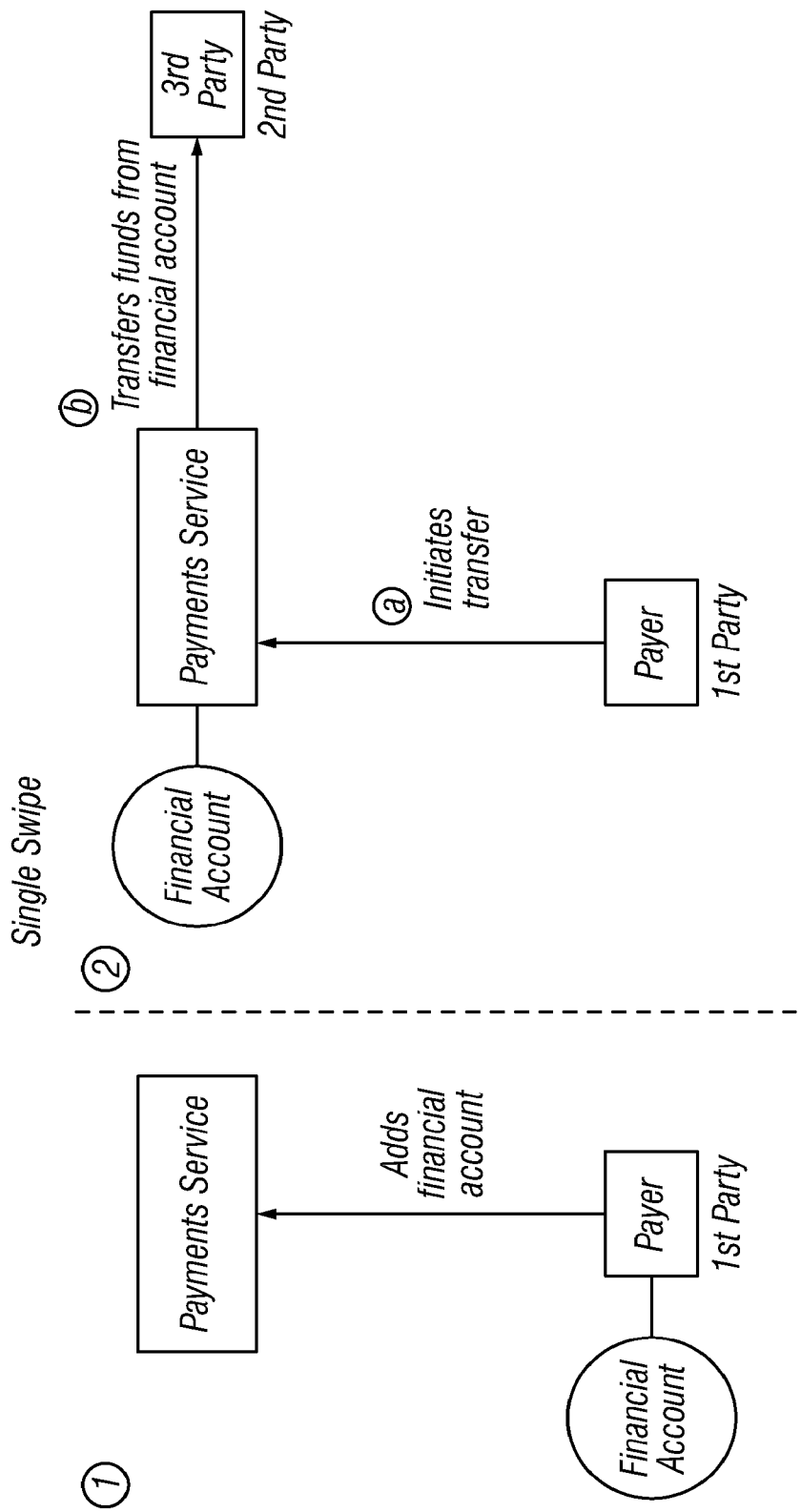
FIG. 21 illustrates an embodiment of the present invention where a method is provided for transferring funds to and/or from a first party's financial account, and the first party's financial account information is entered with a single initial entry to the payment service and for future payments the information need not be re-entered in accordance with an embodiment.

In another embodiment of the present invention, illustrated in FIG. 21, a method is provided for transferring funds to and/or from the first party's financial account. The first party's financial account information is entered with a single initial entry to the payment service. Funds are transferred to and/or from the first party's financial account using the payment service. The funds can be transferred to the first party, or to second parties. The first party's financial account, including but not limited to a financial transaction card can be the destination of the funds. A simple swipe of the first party's financial transaction card can make the financial transaction card a funding source. The first party is either registered with the payment service, or becomes registered prior to the transfer of funds to and/or from the financial account using the payment service. For future uses of the first party's financial account, to transfer funds to and/or from the first party's financial account, the first party's financial account information need not be re-entered again with the payment service.

In another embodiment, funds are transferred from the first party's financial account to a second party using the payment service.

In one embodiment, the second party is already registered with the payment service or becomes registered with the payment service prior to the transfer of funds from the first party. In another embodiment, the second party is not registered with the payment service.

In one specific embodiment, funds are transferred to and/or from the first party's financial account using the payment service, e.g., to the first party or to a second party, where the financial account is a bank account, credit card, debit card, pre-paid card, a third party funding source and the like.

In another embodiment, the first party's financial card is entered with a single initial entry to the payment service using a mobile device 100. Again, for future uses of the first party's financial transaction card to transfer funds using the payment service to a second party, the first party's financial transaction card information need not be entered again.

Again, the entering of the financial card information to the payment service can be achieved by, swiping the financial transaction card through a slot of a card reader coupled to the mobile device 100, through a slot of the mobile device 100, with a touch of the financial transaction card to the mobile device 100, typing in information at the mobile device 100, with photos, selecting a card from an application on a mobile device 100, from an on-line entity and the like.

In another embodiment of the present invention, a method of conducting a financial transaction includes the first party's financial account information being entered once, e.g., with a single initial entry to the payment service. For future uses of the first party's financial account to transfer funds using the payment service to a second party, the first party's financial account information need not be entered again with the payment service. The second party's personal identifying information is entered. Funds are transferred from the first party's financial account to an account of the second party with the use of the payment service.

In another embodiment, the first party's financial transaction card information is entered with a single initial entry to the payment service. Again, for future uses of the first party's financial transaction card to transfer funds using the payment service to a second party, the first party's financial account information need not be entered again with the payment service. The second party's personal identifying information is entered and funds are transferred from the first party's financial account to an account of the second party with the use of the payment service.

In various embodiments, (i) the second party has an association with the payment system, (ii) the first party and the second party each have an association with the payment system, (iii) the first party has an association with the payment system but the second party does not.

In one embodiment, the first party uses a send money mode of the first party's mobile device 100. In various embodiments, the second party is (i) anybody on the first party's phone list, (ii) not on the first party's phone list but is added to the first party's phone list in response to a transaction, (iii) the second party has an association with a payment system or is a database of the payment system, (iv) the second party does not have an association but then has one in response to a text message or equivalent sent to the second party, and the like. In response to the text message, the second party either accepts or rejects.

In another embodiment, the first party's financial transaction card information is entered with a single initial entry to the payment service. Again, for future uses of the first party's financial transaction card information to transfer funds using the payment service to a second party, the first party's financial account information need not be entered again with the payment service. The second party's mobile device 100 number is entered in the first party's mobile device 100. In response, funds are transferred from the first party to an account of the second party.

In one embodiment of the present invention, the read head 310 reads track 1 of the financial transaction card. Track 1 is 210 bytes per inch and is more difficult to decode than track 2. In one embodiment of reading track 1, the signal is interpreted and transferred at a constant rate 2400 baud.

In another embodiment, the read head 310 is configured to be positioned to provide for rotation of up to 10 degrees while still registering on a track to be read. The location of the read head 310 relative to the mobile device 312, and the microphone port of the mobile device 312 are off set from a center of track 1 in order to bias it to a bottom of track 1. As a non-limiting example, the offset can be 0.05 inches in the direction x and 0.040 inches in the y direction.

Figure 22:
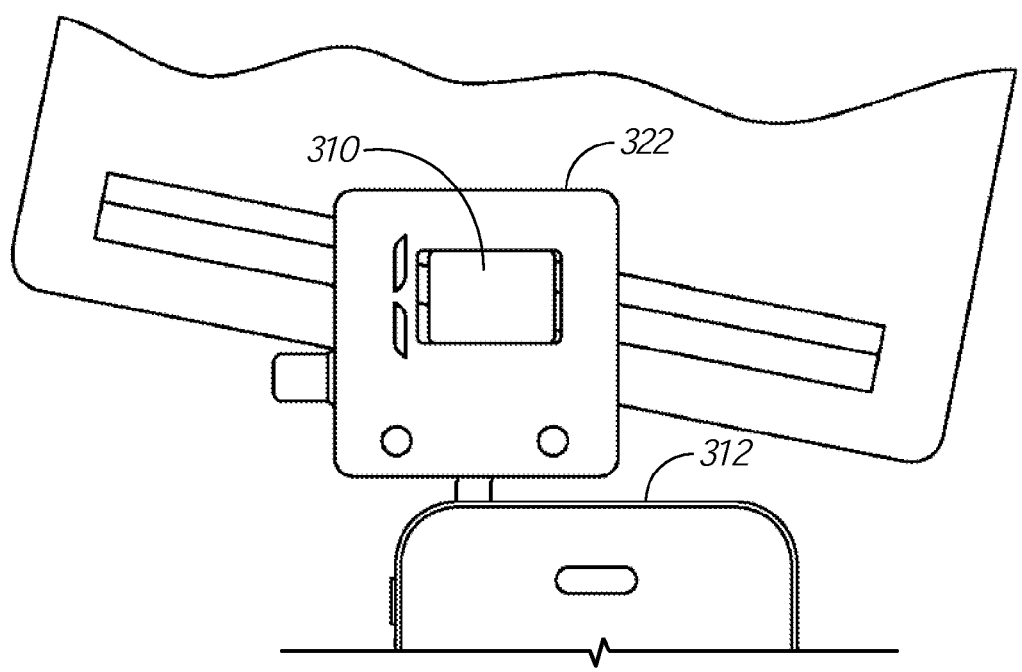
FIG. 22 illustrates an embodiment of the present invention with a spring member attached to the read head to provide for increased accuracy and read head adjustment.

In another embodiment, illustrated in FIG. 22, a spring member 314 is attached to the read head 310 that provides for increased accuracy and read head 310 adjustment by creating less friction on the financial transaction card. The spring member 314 can be softer and be a one leaf design retained on only one side. The spring member 314 can be a cantilever spring member 314 with a pre-load onto an opposing wall on a back bone at an angle of about 3-7 degrees to ensure that the read head 310 is substantially perpendicular to the magnetic strip when the financial transaction card is read. The spring member 314 can be part of a sub-assembly 316 that is coupled to a PCB 318 at one end and coupled to the back bone 320.

In one embodiment, the mobile device 312 provides encryption and authentication. In this embodiment, each card reader 322 can have a unique key that can be included in the microprocessor 324 of the PCB 318. The financial transaction card is swiped and the signal interpreted. The microprocessor 324 than encrypts the data using a HWIO and counter. The signal is encrypted when received at the mobile device 312 with an 10 and counter. The signal sent to the back end 326 of the payment system where the identification of the read head 310 is determined and the signal is decrypted.

Figure 23:
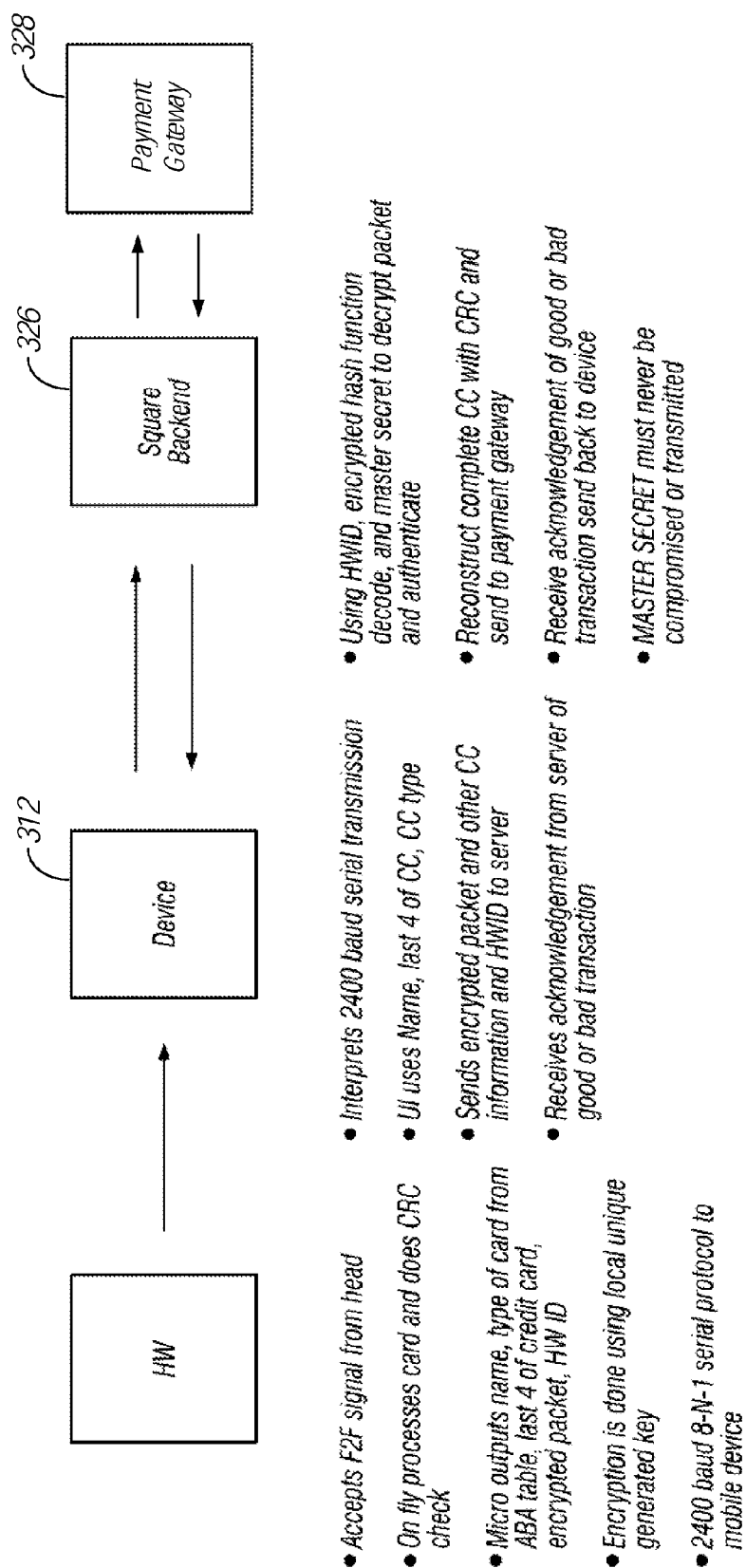
FIG. 23 illustrates one embodiment of the present invention with a card reader, mobile device and payment system.

At the back end 326, the payment system can use HWIO and decode the encrypted signal from the mobile device 312 using a hard function decodes. Using HWIO, encrypted hash function decode, the complete CC with CRC is reconstructed which is then sent to a payment gateway 328 as illustrated in FIG. 23. An acknowledgement of a good or bad transaction is then sent back to the mobile device 312.

Figures 24, 25:
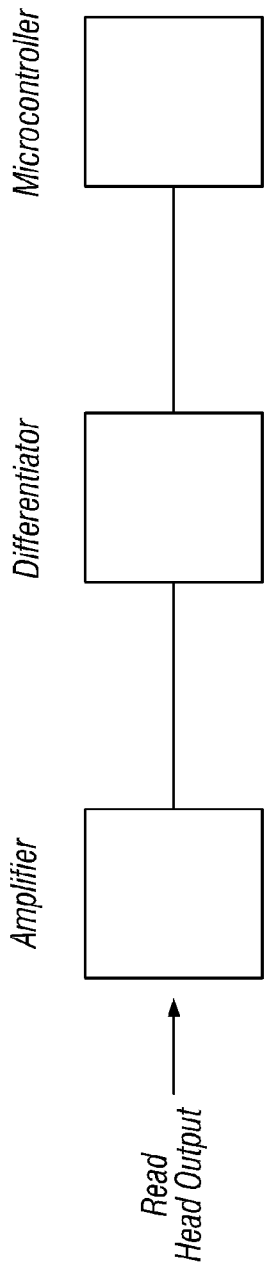
FIG. 24 illustrates one embodiment of the present invention where the output from a read of the track goes to an amplifier, differentiator, into a comparator and then into a microcontroller.
FIG. 25 illustrates one embodiment of the present invention where a card reader accepts a raw signal from a read head and processes the financial transaction card read on the fly.

As illustrated in FIG. 24, the output from a read of the track goes to an amplifier, differentiator, into a comparator and then into a microcontroller. The output to the comparator is analog, and digital into the microcontroller and into the mobile device 312.

Several fields of cardholder information are sent to the server at the back end 326 in either an encrypted or authenticated format. In one embodiment, the protocol has several fields: length of message, counter, hardware id, authenticated message length, issue type, last 4 digits of the financial transaction card, cardholder name, PAN number, expiration date, service code, and an authentication tag.

Referring to FIG. 25, in various embodiments, the card reader 322 accepts a raw signal from the read head 310 and processes the financial transaction card read on the fly. A CRC check is performed. The buyer's name, type of financial transaction card from the ABA table, and the last four numbers of the financial transaction card are in an encrypted packet forwarded to the mobile device 312. In one embodiment part of the CC that are encrypted and parts are authenticated. In one specific embodiment, a 2400 baud 8-N-1 serial protocol is used in the packet sent to the mobile de vice. The mobile device 312 interprets the 2400 baud serial transmission and sends an encrypted packed with other financial transaction card information to the backend 326 of the payment system.

Figure 26:
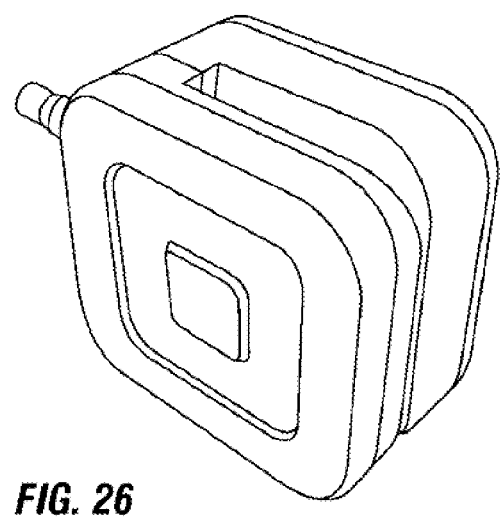
FIG. 26 illustrates one embodiment of the present invention where the slot of a read head has directionality.
Figure 27:
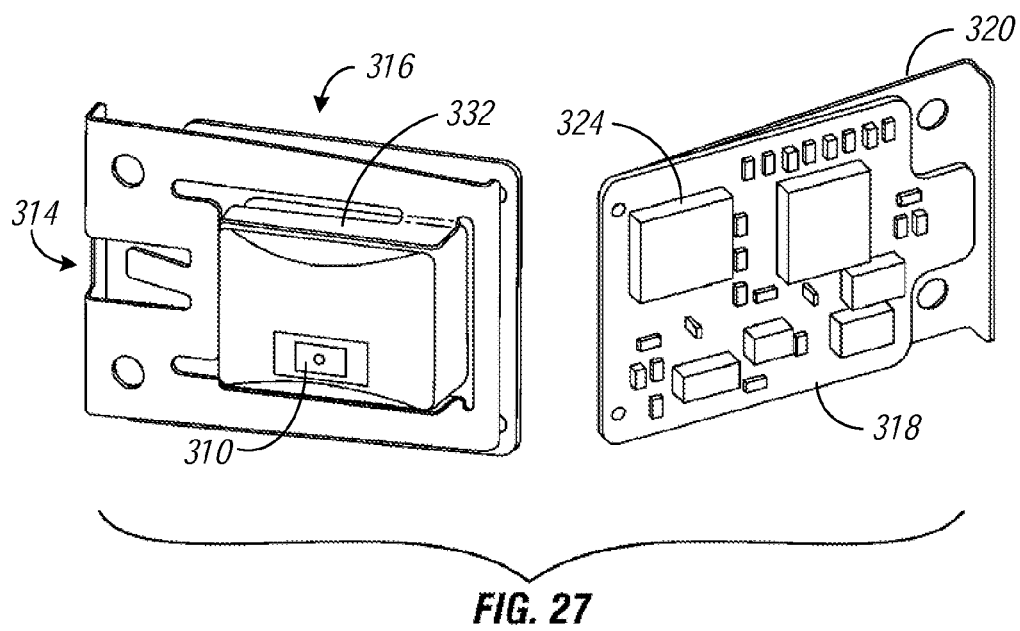
FIG. 27 illustrates an embodiment of the present invention where the read head includes a power source.

Referring to FIG. 26, in one embodiment, the slot of the read head 310 has directionality. In one embodiment, the slot has a wider entrance track and the read head 310 is biased in one direction. These enables a user to rock the financial transaction card through the slot more in one direction that in the other. In one embodiment, the slot can have a wider entrance track and the read head 310 is biased in one direction. These enables a user to rock the financial transaction card through the slot more in one direction that in the other.

Figure 40:
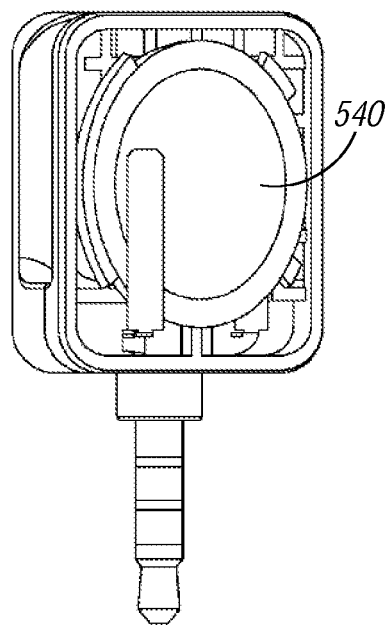
FIG. 40 illustrates a power source that can be used in an embodiment of the present invention.

The read head 310 can include a power source (for example power source 540 as illustrated in FIG. 40). The power source can be a battery coupled to the microprocessor 324. In another embodiment, power to the read head 310 is provided by the mobile device 312. In one embodiment, wake-up detection is provided and the power source is in a sleep mode until a swipe of a transaction card is initiated.

In one embodiment, the read head 310 is a four piece plastic mold. The spring member 314 can be soldered onto the PCB 318 to form the sub-assembly 316.

As a non-limiting example, the read head housing 332 can be heat-staked onto the back side of the backbone 320. The battery can be attached to the front side of the backbone 320 with PSA. With the front cover, it can be attached to the backbone 320 using ultrasonic welding. A TRS connector can be placed onto the back bone and the connection soldered to the PCB 318. The back cover can be attached to the backbone 320 to complete the assembly.

In various embodiments, the card reader 322 is coupled to various ports of the mobile device 312, including but not limited to the microphone port, the USB port, accessory port.

In another embodiment, the card reader is coupled to other ports of the mobile device 100, including but not limited to the USB port, accessory port and the like.

In one embodiment of the present invention, a method is provided of conducting a financial transaction with reduced likelihood of fraud. A financial transaction is entered into using a first party's financial transaction instrument to transfer funds. The first party's financial transaction instrument information is sent externally to the mobile device 100. The financial transaction instrument information is sent from the financial transaction instrument such as a mobile device 100 to a payment system. A determination is made to see if there is fraudulent use of the financial transaction instrument 100 prior to completion of the financial transaction. The mobile device 100 can be a merchant's mobile device 100. The determination of fraudulent use can be made either at the mobile device 100 or the payment system. In one embodiment, the first party's financial transaction instrument information is only sent once to the mobile device 100 and need not be done again for future purposes.

The financial transaction instrument 100 is selected from at least one of those listed above, as well as a person's financial account and the like.

In one embodiment, a location identifier is received from a position-sensing device indicating a location where the request is submitted or information that can lead to identification of the location where the request is submitted. The position-sensing device can be selected from a group of eligible devices. Information identifying the selected position-sensing device can be received by the request processor in advance of the request processor receiving the submitted request; and determining whether to service the request based at least in part on the received location identifier or information. The submission device can be embodied in an apparatus separate from an apparatus housing the position-sensing device. The submission device and the position-sensing device can be integrated in the mobile device 100.

In another embodiment, the first party's financial account information is entered using the first party's mobile device 100 with a single initial entry to a payment service. Funds are transferred to and/or from the first party's financial account using the payment service. The first party is registered with the payment service, or becomes registered prior to transferring funds to and/or from the financial account using the payment service. For future uses of the first party's financial account to transfer funds to and/or from the first party's financial account, the first party's financial account information need not be entered again with the payment service. In response to, (i) entering the first party's financial account information or (ii) using the first party's mobile device 100 for a financial transaction following the single initial entry to the payment service, a determination is made to see if a fraudulent attempt or fraudulent use of the first party's financial account information is committed.

In another embodiment, the first party's financial account information is entered using the first party's mobile device 100 with a single initial entry to a payment service. Funds are transferred from the first party's financial account to a second party using the payment service. The first party is either registered with the payment service, or becomes registered prior to transferring funds to and/or from the first party's financial account using the payment service. For future uses of the first party's financial account to transfer funds to and/or from the first party's financial account, the first party's financial account information need not be entered again with the payment service. In response to, (i) entering the first party's financial account information or (ii) using the first party's mobile device 100 for a financial transaction following the single initial entry to the payment service, a determination is made to see if a fraudulent attempt or fraudulent use of the first party's financial account information is committed.

In another embodiment, the first party's financial account information is entered using the first party's mobile device 100 with a single initial entry to the payment service. The first party's financial account is selected from at least one of, a bank account, credit card, debit card, pre-paid card and a third party funding source. Funds are transferred to and/or from the first party's financial account using the payment service. The first party is either registered with the payment service, or becomes registered prior to transferring funds to and/or from the financial account using the payment service. For future uses of the first party's financial account to transfer funds to and/or from the first party's financial account, the first party's financial account information need not be entered again with the payment service. In response to, (i) entering the first party's financial account information or (ii) using the first party's mobile device 100 for a financial transaction following the single initial entry to the payment service, a determination is made to see if a fraudulent attempt or fraudulent use of the first party's financial account information is committed.

In another embodiment, a first party's financial account information is entered using the first party's mobile device 100 with a single initial entry to a payment service. The first party's financial account is selected from at least one of, a bank account, credit card, debit card, pre-paid card and a third party funding source. Funds are transferred from the first party's financial account to a second party using the payment service. The first party is registered with the payment service, or becomes registered prior to transferring funds to and/or from the first party's financial account using the payment service. For future uses of the first party's financial account to transfer funds to and/or from the first party's financial account, the first party's financial information need not be entered again with the payment service. In response to, (i) entering the first party's financial account information or (ii) using the first party's mobile device 100 for a financial transaction following the single initial entry to the payment service, a determination is made to see if a fraudulent attempt or fraudulent use of the first party's financial account information is committed.

In another embodiment, a first party's financial transaction card information is entered using the first party's mobile device 100 with a single initial entry to a payment service. For future uses of the first party's financial transaction card to transfer funds to and/or from the first party's financial transaction card, the first party's financial transaction card information need not be entered again with the payment service. In response to, (i) entering the first party's financial transaction card information or (ii) using the first party's mobile device 100 for a financial transaction following the single initial entry to the payment service, a determination is made to see if a fraudulent attempt or fraudulent use of the first party's financial account information is committed.

In another embodiment, a first party's financial transaction card information is entered using the first party's mobile device 100 with a single initial entry to a payment service. Funds are transferred from the first party's financial transaction card to a second party using the payment service. The first party is registered with the payment service, or becomes registered prior to transferring funds to and/or from the first party's financial transaction card using the payment service. For future uses of the first party's financial transaction card to transfer funds to and/or from the first party's financial transaction card, the first party's financial transaction card information need not be entered again with the payment service the first party's financial. In response to, (i) entering the first party's financial transaction card information or (ii) using the first party's mobile device 100 for a financial transaction following the single initial entry to the payment service, a determination is made to see if a fraudulent attempt or fraudulent use of the first party's financial account information is committed.

In another embodiment, a first party accesses names of one or more qualified second parties. The qualified second parties are defined as second parties having an association with the payment service, and second parties that if they do not have an established association with the payment service, have an established association with the payment service prior to payment. The first party has an association with the payment service. A tab is opened by the first party that can be selected by the qualified second party at any geographic location of a first party's mobile device 100. The qualified second party is only able to charge a first party's financial account when the first party's mobile device 100 is within a defined geographic area. The tab is a relationship between the first party, the payment service and the qualified second party. The qualified second party can engage in a financial transaction with the first party when the first party is within the defined geographic area. In response to the second party, (i) attempting to charge the first party or (ii) charging the first party, a determination is made to see if a fraudulent attempt or fraudulent use of the first party's financial account is committed.

In another embodiment, names of one or more qualified second parties are accessing by the first party with the first party's mobile device 100. The second parties have an association with the payment service, or if not have one prior to payment. The first party has an association with the payment service. A tab is opened by the first party that can be selected by the qualified second party at any geographic location of the first party's mobile device 100. The qualified second party is only able to charge a first party's financial transaction card when the first party's mobile device 100 is within a defined geographic area. The qualified second party can engage in a financial transaction with the first party when the first party is within the defined geographic area. In response to the use of the first party's mobile device 100 to pay the second party, a determination is made to see if a fraudulent attempt or fraudulent use of the first party's financial transaction card is committed. In another embodiment, a first party accesses a second party on-line entity. The mobile device 100 is configured to communicate with the payment service. The first party considers conducting a transaction with the second party on-line entity. The second party on-line entity is registered with the payment service or in response to the first party's desire to transact with the second party on-line entity, the second party on-line entity becomes registered with the payment service. The first party enters personal identifying information that is sent to the payment service. The first party receives a push notification to the first party's mobile device 100 that enables the first party to complete the transaction with the second party on-line entity. In response to the first party receiving the push notification to the first party's mobile device 100, a determination is made to see if a fraudulent attempt or fraudulent use of the first party's financial transaction card is committed.

In another embodiment, a first party visits a second party on-line entity. The first party considers conducting a transaction with the second party on-line entity. The first party enters personal identifying information using the first party's mobile device 312 and this is sent to the payment service. The first party receives a push notification of the first party's mobile device 312 that enables the first party to complete the transaction with the second party on-line entity. In response to the first party receiving the push notification to the first party's mobile device 312, a determination is made to see if a fraudulent attempt or fraudulent use of the first party's financial transaction card is committed.

Figure 28:
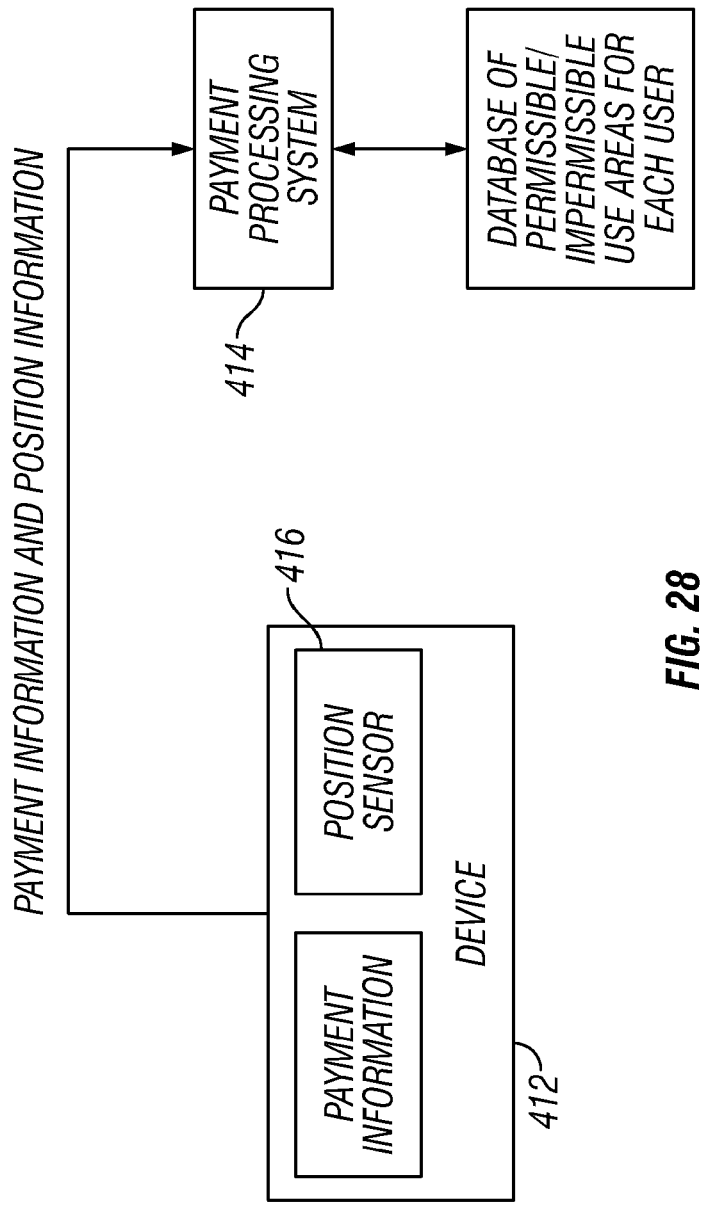
FIG. 28 is a schematic view, according to another embodiment of the present invention, showing a payment device-not-present transaction.

Referring now to FIG. 28, a mobile device 412 can include a position sensor 416. In this embodiment, the mobile device receives financial transaction card information by any of the methods listed above. The financial transaction card information is sent from the mobile device to a payment system for processing. The mobile device 412 can be capable of transmitting position information to the payment system and can include a position sensor 416 configured to detect a position of the mobile device and send this position information to the payment processing system via a variety of methods including but not limited to wireless and the like. Mobile device 412 can send the financial card transaction information substantially simultaneously and position information to payment system. Payment system 414 can includes an associated database of permissible and/or impermissible use areas for a particular user's mobile device 412.

Payment system 414 can be configured to check position information of the mobile device 412 against the permissible and/or impermissible use areas for each user, and thereby determine if the device is being used in an impermissible use area for the user. If so, the payment system 414 is configured to indicate that a possibility of fraud exists in the pending transaction. If the possibility of fraud is detected, the system may be configured to take an action, such as preventing fulfillment of the transaction due to the possibility of fraud.

The payment system 414 can be as described above and can include a conventional computing system with storage medium having programming instructions designed to implement the present invention, and one or more processors to execute the programming instructions.

In one embodiment, when a financial transaction cardholder is issued a financial transaction card, the cardholder may be asked to give the geographic location of their home and office, as well as any other locations that the cardholder frequently place on-line orders and use the credit card. This information may be obtained during the application process or on an ongoing basis. The information may be entered into a database.

Thus, when a financial transaction is conducted using a mobile device 412 current location information can be provided to the payment system 414 where a check can be performed for whether the financial transaction is being conducted from a permissible location. If the financial transaction is not being conducted from a permissible location, the financial transaction may be rejected. Additionally, a warning in the form of a message and/or a call may be provided to the financial transaction cardholder.

Figure 29:
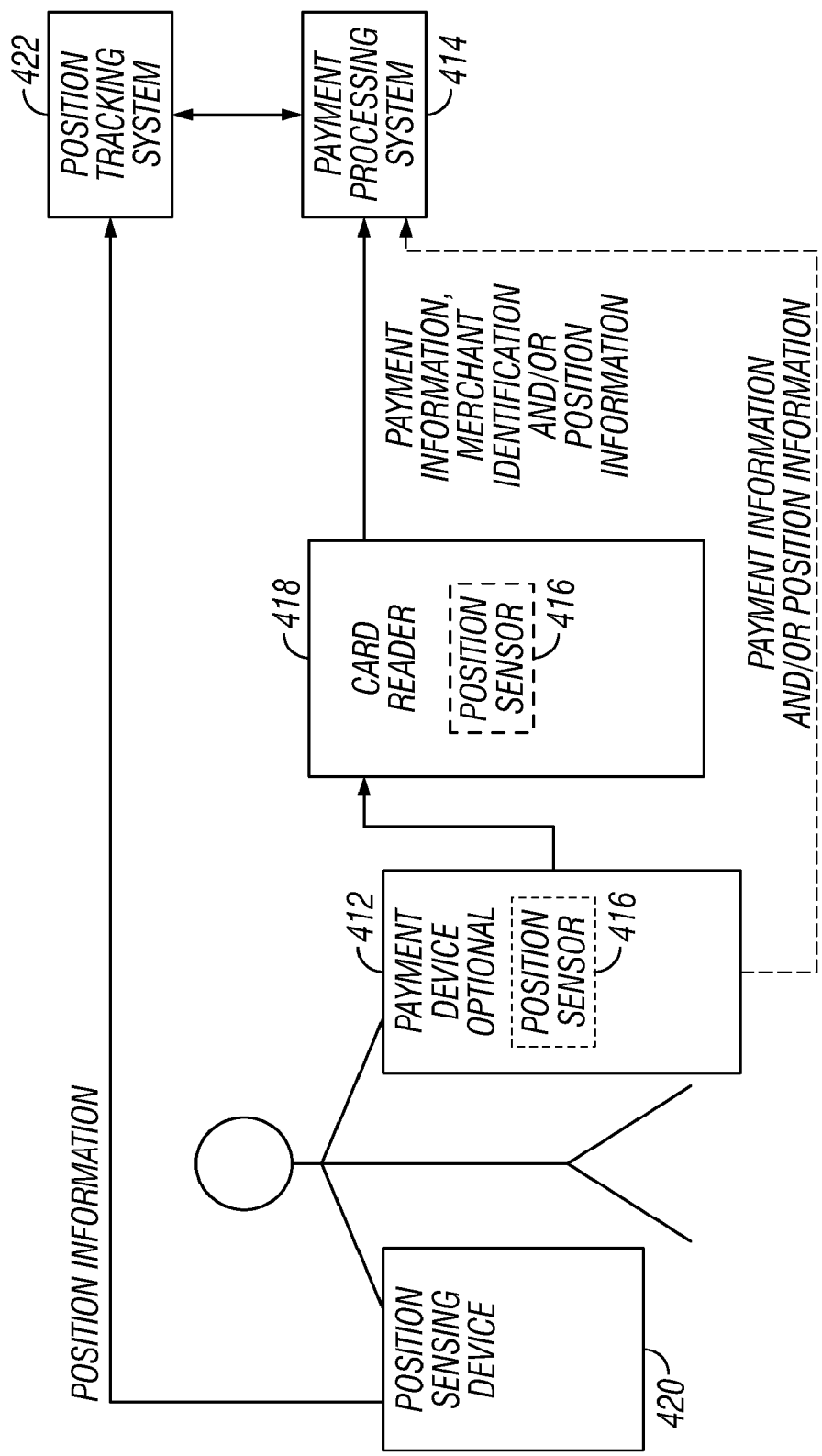
FIG. 29 is a schematic view illustrating a payment device present transaction according to one embodiment of the present invention.

Referring to FIG. 29, in another embodiment, a card reader 416, which can be any of the card readers described herein, can include a position sensor 416. In a financial transaction, the position of the card reader 416 is determined when a financial transaction is entered into, wherein financial card transaction information can be sent to the mobile device 412, and then sent to payment system 414.

The payment processing system 414 can detect the position of the card reader 418 and therefore, the position of the payment device in a payment device-present transaction.

In another embodiment, a position sensing device 420 can be included. The position-sensing device 420 can be configured to send position information to a position tracking system 422. The communication link between position tracking system 422 and position-sensing device 420 may be a satellite link such as used in a global positioning satellite system, radio frequency link, optical link such as infrared, or virtually any other communication link suitable for use in position detection.

Figure 30:
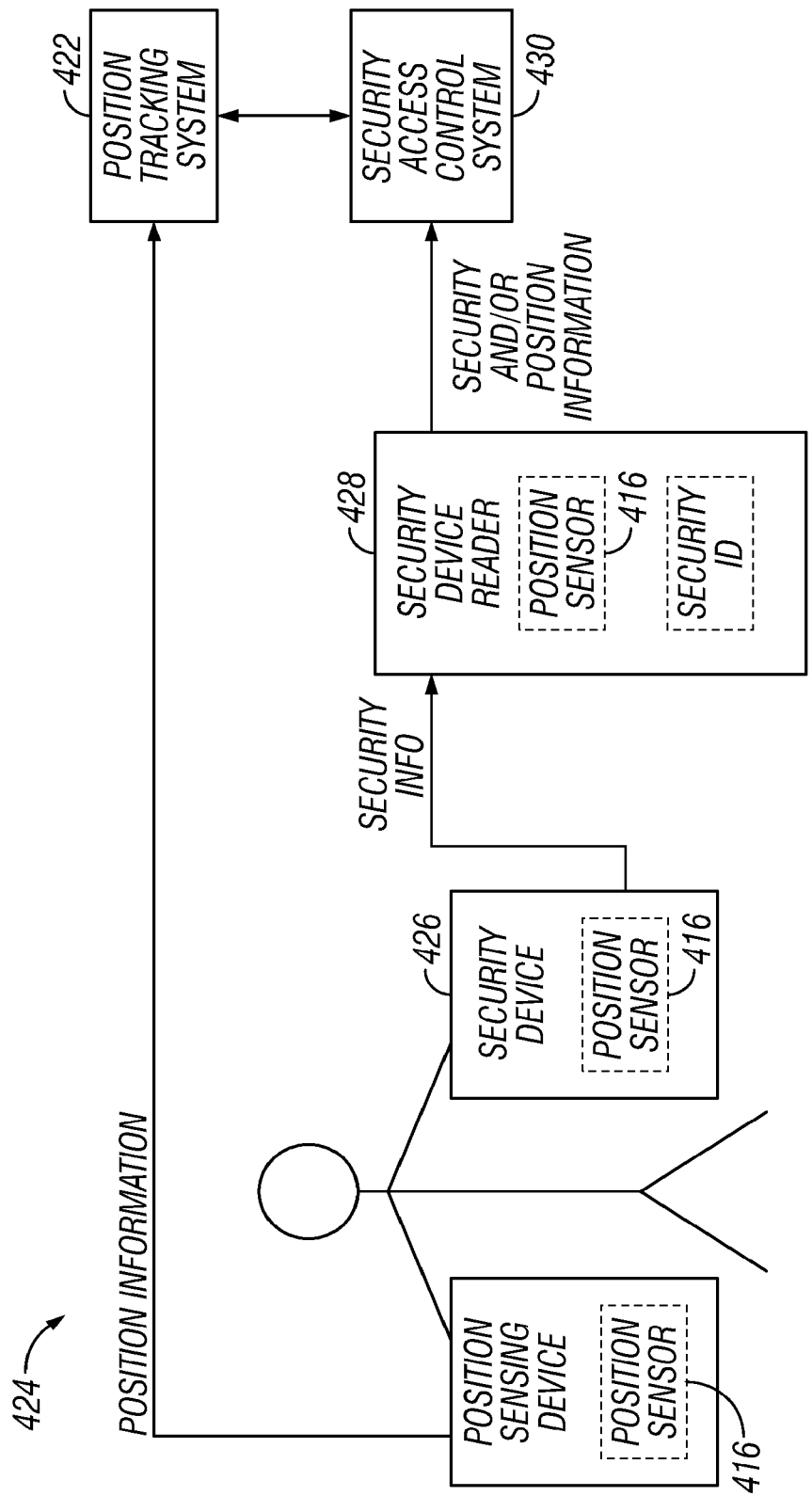
FIG. 30 is a schematic view illustrating a security device-present transaction according to one embodiment of the present invention.

As shown in FIG. 30, a security device-present transaction system 424 can be utilized and can utilize location indicators, alone or in combination with other parameters, to determine the security clearance for access to a particular secured location. Security device-present transaction system 424 can include a security device 426 configured to be read by a security device reader 428. Security device 426 may be a card or badge encoded with security information, such as an access code, a mobile device, a card reader and the like, configured to transmit security information to security device reader 424 via an infrared or other communication link. Further, the security device may be any other device capable of providing the appropriate security and position information to security device reader 424. In particular, security device 426 may include a position sensor 416, configured to transmit information about its relative geographical location.

Security access control system 430 is further configured to detect the location or position of security device 426 and/or security reader 428 by the position information received from position sensor 416. Alternatively, the security access control system 430 can be configured to detect the position of the security device reader (and therefore the position of the security device in a device-present transaction), by resolving a security identifier using a database of known security identifier locations. For example, the security identifier 1234567 may correspond to a gated entrance to a secured building.

In order to detect an improper use of security device 426, security access control system 430 is configured to compare the position of position-sensing device 416 the location or position of a current transaction involving security device 426 (i.e., the location or position of security device 426 and/or security device reader 428). If the locations of the position-sensing device 416 and the security device 426 are different, or alternatively, if the locations of position-sensing device 416 and security reader 428 are different, then the security access control system is configured to determine that there is a possibility of improper use of the security device in the current transaction.

Upon determining the possibility of improper use, the system 430 is configured to take a designated action, such as warning a security attendant and/or by automatically locking an entrance to a secured area.

The security control system may be implemented with conventional computing system with storage medium having programming instructions designed to implement the present invention, and one or more processors to execute the programming instructions.

In one embodiment of the present invention, illustrated in FIGS. 16(b) 16(c), 31 and 32, a card reader, generally denoted as 510, is provided that includes a housing 512 and a read head 514 positioned therein. The read head 514 is configured to be coupled to a mobile device 516 and includes a slot 518 for swiping a magnetic stripe of a card 520. In one embodiment, the card reader 510 with the slot 518 is utilized for a transaction between a buyer and seller. The read head 514 reads data on the magnetic stripe and produces a raw magnetic signal indicative of data stored on the magnetic stripe.

Figure 33:
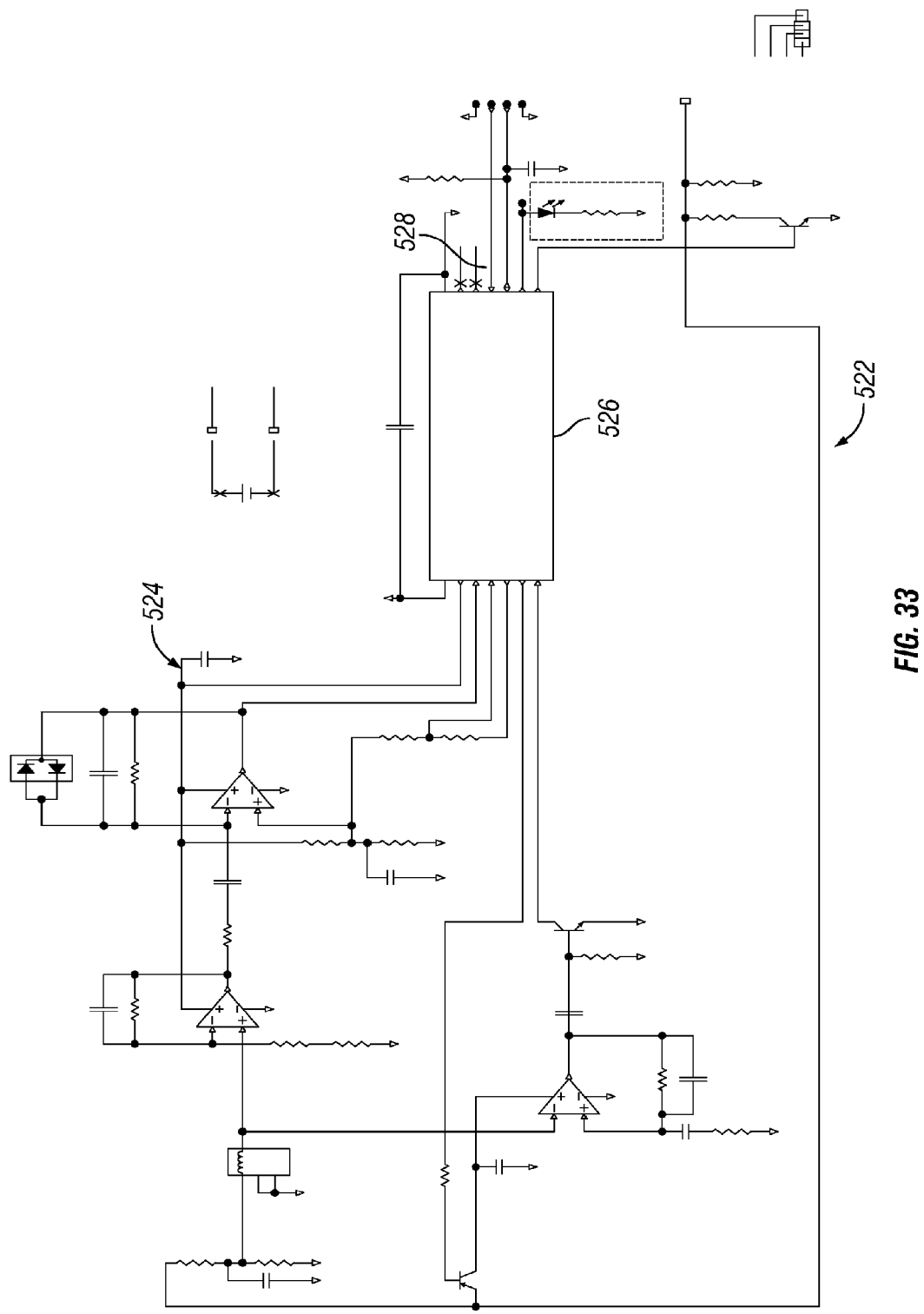
FIG. 33 illustrates an embodiment of device electronics for the card reader in one embodiment of the present invention.
Figure 34:
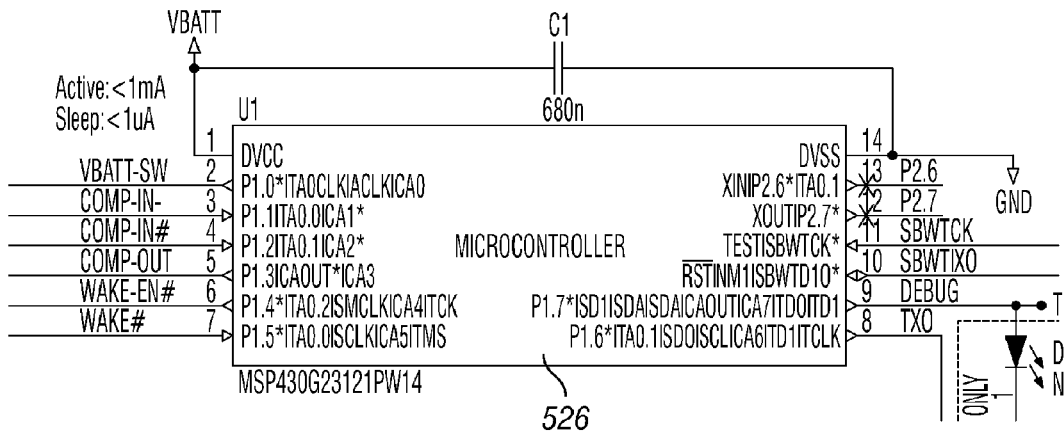
FIG. 34 illustrates an embodiment of the FIG. 33 device electronics with an analog to digital front-end and a microcontroller.
Figure 35:
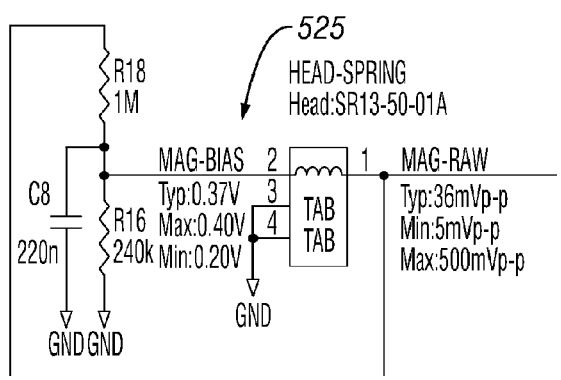
FIG. 35 illustrates an embodiment of the present invention where an analog to digital front end can receive a raw magnetic head signal from the magnetic head and convert it into a processed digital signal that the microcontroller, producing a signal with magnetic read head electronics.

Referring now to FIGS. 33 and 34, device electronics 522 are provided that include an analog to digital front-end 524 and a microcontroller 526. The analog to digital front end 524 is coupled to a processing element 528 in the microcontroller 526. The analog to digital front end 524 receives a raw magnetic head signal from the magnetic head 525, FIG. 35, and converts it into a processed digital signal that the microcontroller 526 can interpret, with the microcontroller 526 producing a signal. An output jack 530 of the card reader 510 is adapted to be inserted in a port of the mobile device 516 and deliver an output jack signal to the mobile device 516.

The microcontroller 526 is configured to convert raw bit patterns into formatted credit card 520 information. The microcontroller 526 can independently determine if the card data is valid. The card reader 510 can accept motion of the card 520 bi-directionally at either end of the slot 518 and at varying velocities as it is swiped through the slot 518. In one embodiment, the mobile device 516 detects the card reader 510 as a microphone.

In various embodiments, the output jack signal is an encrypted output jack signal, and encrypted and signed output jack signal and the like. The signal from the microcontroller 526 can be the output jack signal. The output jack signal can be a synchronous Manchester encoded stream, an asynchronized stream and the like. In one embodiment, the output jack signal is at a frequency that the output jack signal appears to look AC to a microphone input of the mobile device 516. In one embodiment, a frequency of the output jack signal is 2 KHz to 48 kHz, and in another it is 2.4 kHz. The output jack signal can be a low-amplitude analog waveform.

In one embodiment, the read head 514 sends the output jack signal to the mobile device 516 at a constant baud rate. As a non-limiting example, the constant baud rate is 2400 to 9200 baud.

In one embodiment, the microcontroller 526 has a non-volatile memory with a size of 2-8 Kbytes, and RAM with a size 128-512 bytes. In an embodiment, the analog to digital front end 524 is configured to capture card 520 readings that are swept at a rate of 5 inches to 50 inches per second.

Figure 36:
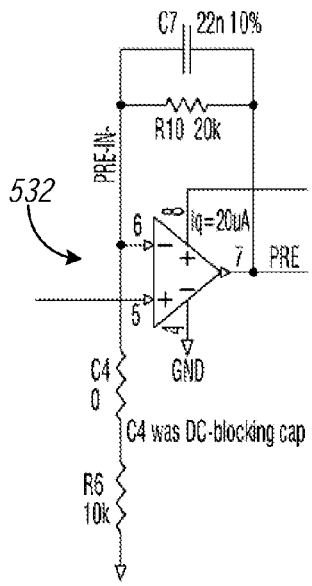
FIG. 36 illustrates an amplifier or amplifier/filter that can be used in an embodiment of the present invention.
Figure 37:
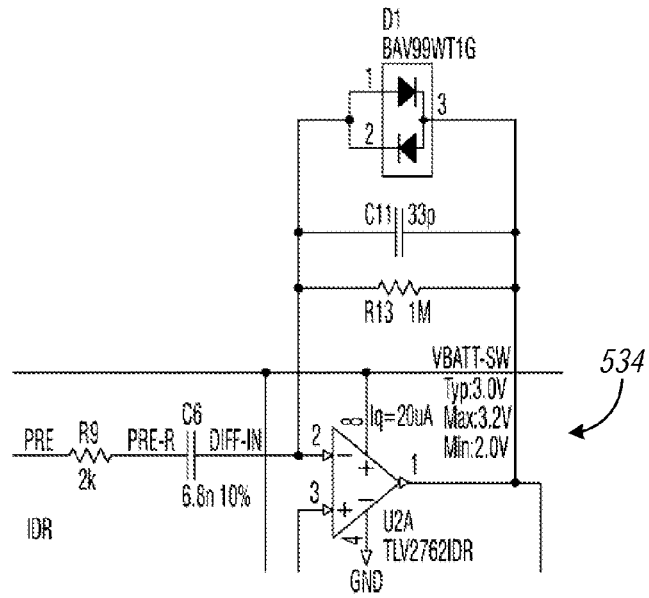
FIG. 37 illustrates a differentiator that can be used in an embodiment of the present invention.
Figure 38:
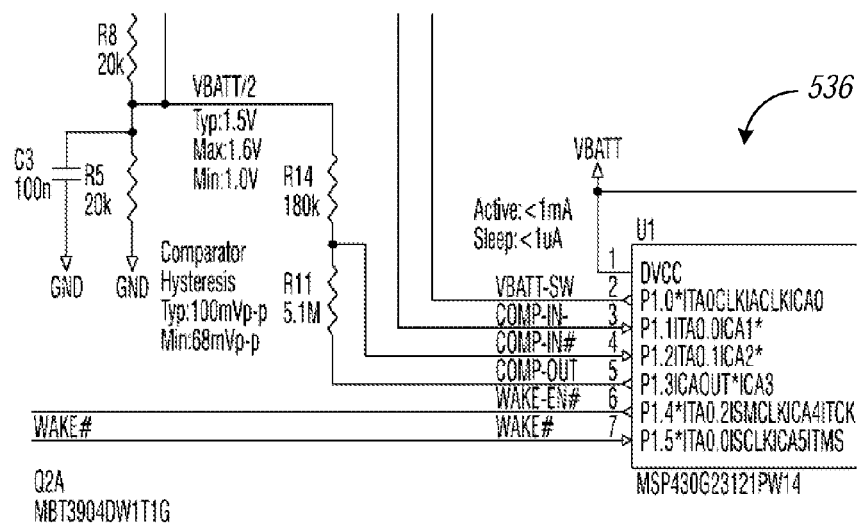
FIG. 38 illustrates a comparator 536 that can be used in an embodiment of the present invention.
Figure 39:
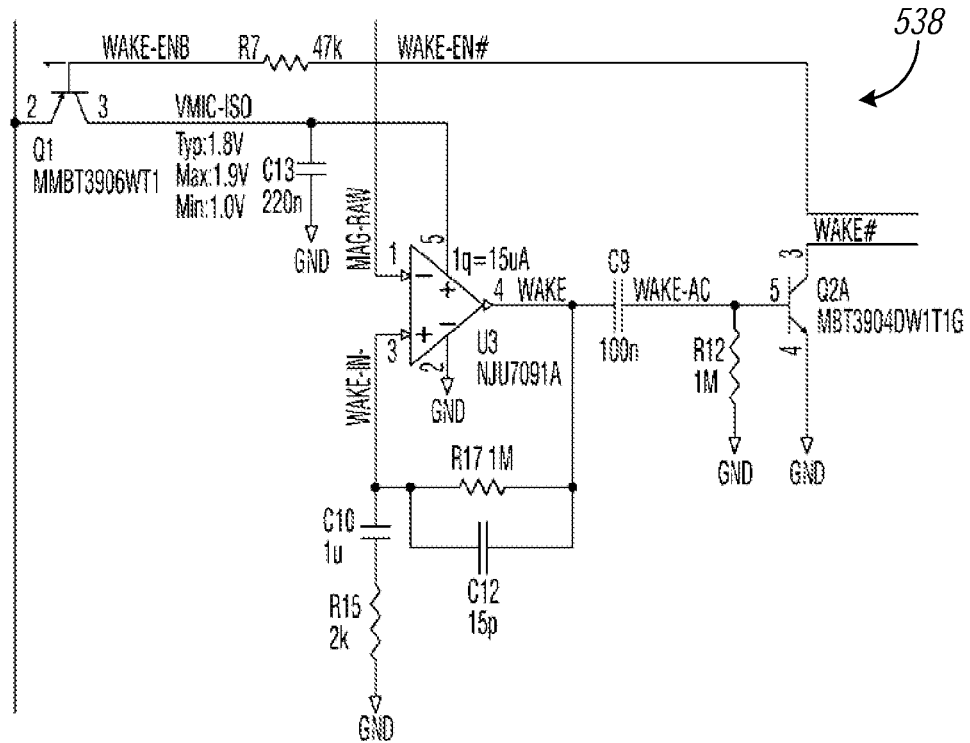
FIG. 39 illustrates wake-up electronics that can be used in an embodiment of the present invention.
Figure 41:
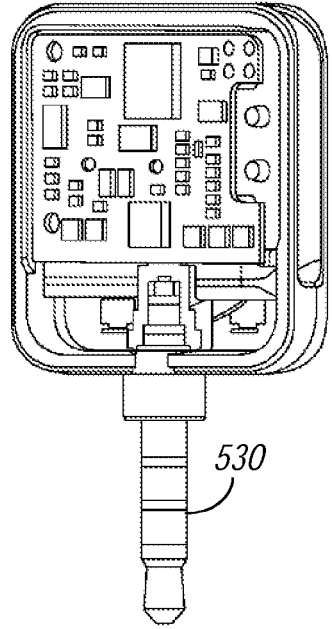
FIG. 41 illustrates a power source that can be used in an alternate embodiment of the present invention.

In one embodiment, the analog to digital front end 524 includes, an amplifier or amplifier/filter, (collectively 532) (FIG. 36), differentiator 534 (FIG. 37), a comparator 536 (FIG. 38) and can include have wake-up electronics 538 (FIG. 39) which can be a wake-up circuit. A power source 540 (FIGS. 40 and 41), including but not limited to a battery, can be coupled to the wake-up electronics 538. The wake-up electronics 538 signals the microcontroller 526, which in turn puts the device electronics 522 into an active mode from a sleep mode and back into the sleep mode when a card 520 swipe signal stops. The wake-up electronics 538 is powered down by the microcontroller 526 when the device electronics 522 is in the active mode. In various embodiments the wake-up electronics 538, (i) utilize an op-amp, (ii) utilize an op-amp, a discrete transistor, and associated passive components and the like. Portions of the analog circuitry can be powered-down to conserve power when not in use, and automatically powered-up when the beginning of a card 520 swipe is detected.

In one embodiment, the wake-up electronics 538 are powered by a microphone bias of a mobile device 516. In another embodiment, the microphone-bias line is used both for power and for data transmission back to the mobile device 516.

The wake-up electronics 538 detects when there is an edge from leading zeros of a card 520 being swiped and alerts to wake up the microcontrolier 526 and device electronics 522. The device electronics 522 wakes up in enough time to process and encrypt a card 520 swipe signal.

The device electronics 522 can include the amplifier/filter 532, differentiator 534, comparator 536, transmission electronics 542 (FIG. 42), the microcontrolier 526 and optionally the wake-up electronics 538.

The raw magnetic head signal is amplified by the amplifier/filter 532 and processed before the microcontroller 526 accepts it as an input. The differentiator 534 takes the output of the amplifier/filter 532 and differentiates it, looking for peaks in the input signal. The comparator 536 takes the output of the differentiator 534 and compares it to a reference voltage and produces an output that is a processed digital version of a magnetic swipe. The comparator 536 looks for where an input signal crosses zero. The microcontrolier 526 accepts the comparator 536 inputs, processes the comparator 536 inputs and encrypts at least a portion of data of the comparator 536 input. The microcontrolier 526 controls power to the amplifier/filter 532, differentiator 534 and the comparator 536. The comparator 536 can be included as part of the microcontrolier 526. The transmission electronics 542 accepts output data of the microcontrolier 526 as an input and uses this to modulate a microphone-bias line of the mobile device 516.

In another embodiment, a method is provided of transmitting information to a mobile device 516 using the card reader 510. In this embodiment, the raw magnetic head signal is received at the analog to digital front end 524 and converted into a processed digital signal that the microcontrolier 526 can interpret. The output jack signal is thereafter delivered to the mobile device 516.

In another embodiment, the card reader 510 includes a housing 512. The read head 514 is positioned in the housing 512 and is configured to be coupled to the mobile device 516. In this embodiment, the power supply is coupled to the wake-up electronics 538 and the microcontrolier 526. The output jack 530 is adapted to be inserted in a port of the mobile device 516 and deliver the output jack signal to the mobile device 516. The wake-up electronics 538 is powered by a microphone bias of a mobile device 516.

In another embodiment, a method is provided of transmitting information to a mobile device 516. The read head 514 includes the power supply coupled to wake-up electronics 538 and the microcontrolier 526. The wake-up electronics 538 is powered by a microphone bias of the mobile device 516.

In another embodiment, the card reader 510 includes a housing 512, a read head 514 positioned in the housing 512, the power supply coupled to wake-up electronics 538 and the microcontrolier 526 and the output jack 530 adapted to be inserted in a port of the mobile device 516 and deliver an output jack signal to the mobile device 516.

In another embodiment, a method is of transmitting information to a mobile device 516. A card reader 510 is provided with a read head 514 that has a slot 518 for swiping a magnetic stripe of a card 520, a power supply, the card reader 510 including wake-up electronics 538 and a microcontrolier 526, and a power supply coupled to the wake-up electronics 538 and the microcontrolier 526. Data is read from the magnetic stripe. A raw magnetic signal is produced indicative of data stored on the magnetic stripe. The raw magnetic head signal is converted into a processed digital signal that the microcontrolier 526 interprets. An output jack signal is thereafter sent to the mobile device 516.

Figure 42:
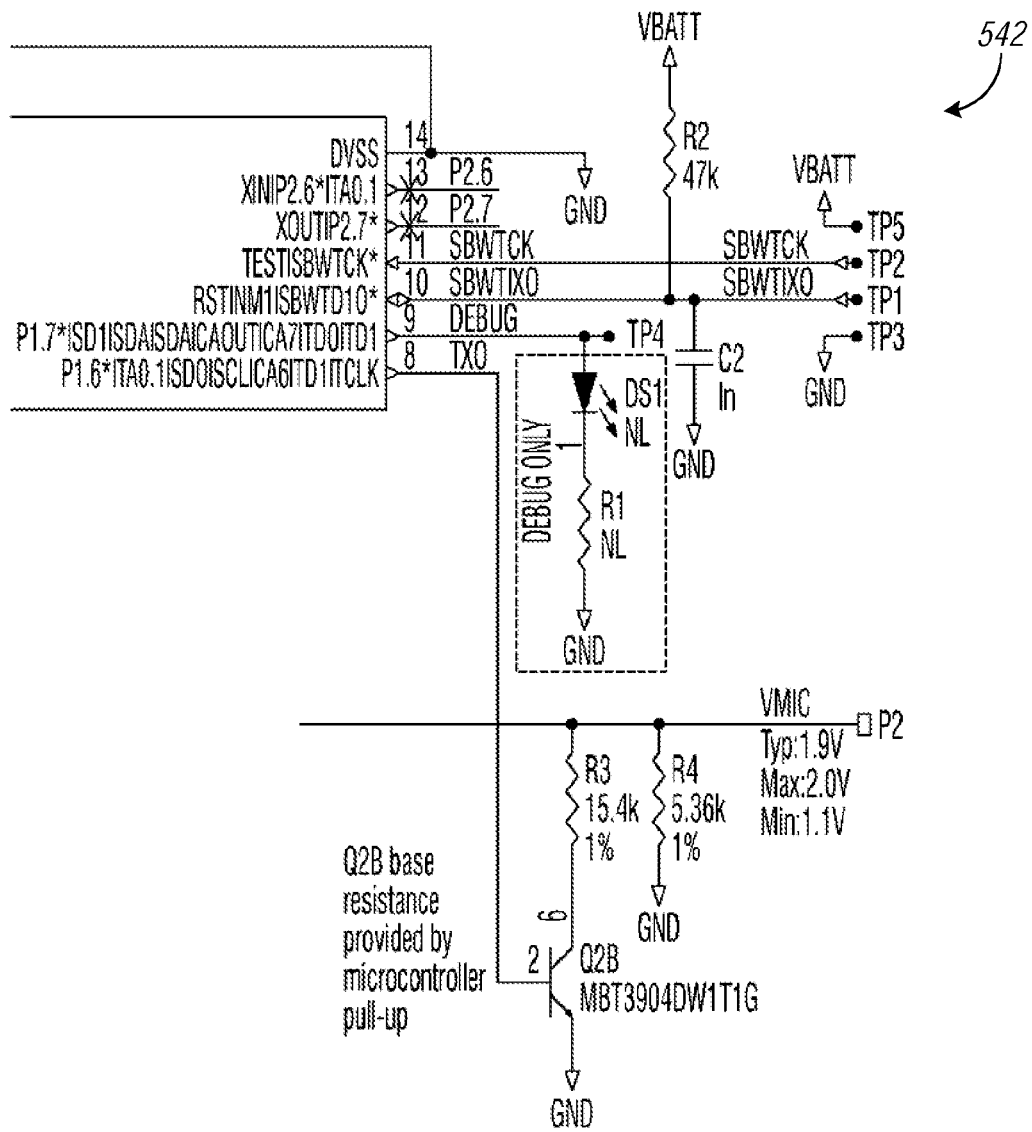
FIG. 42 illustrates transmission electronics that can be used in an embodiment of the present invention.

In another embodiment of the present invention, illustrated in FIG. 42, a card reader 510 is provided with the housing 512 and the read head 514 positioned in the housing 512. The read head 514 includes the slot 518. The read head 514 is positioned, and configured, to accommodate rocking of a card 520 while being swept in the slot 518, and produce a successful read of the magnetic stripe of the card 520. In one embodiment, the rocking is in an amount of 1 to 10 degrees of rotation from the bottom surface of the card away to the bottom surface of the slot.

In various embodiments, the rocking can be, 2 to 10 degrees of rotation, 3 to 10 degrees of rotation, 4 to 10 degrees of rotation and the like.

Figure 31:
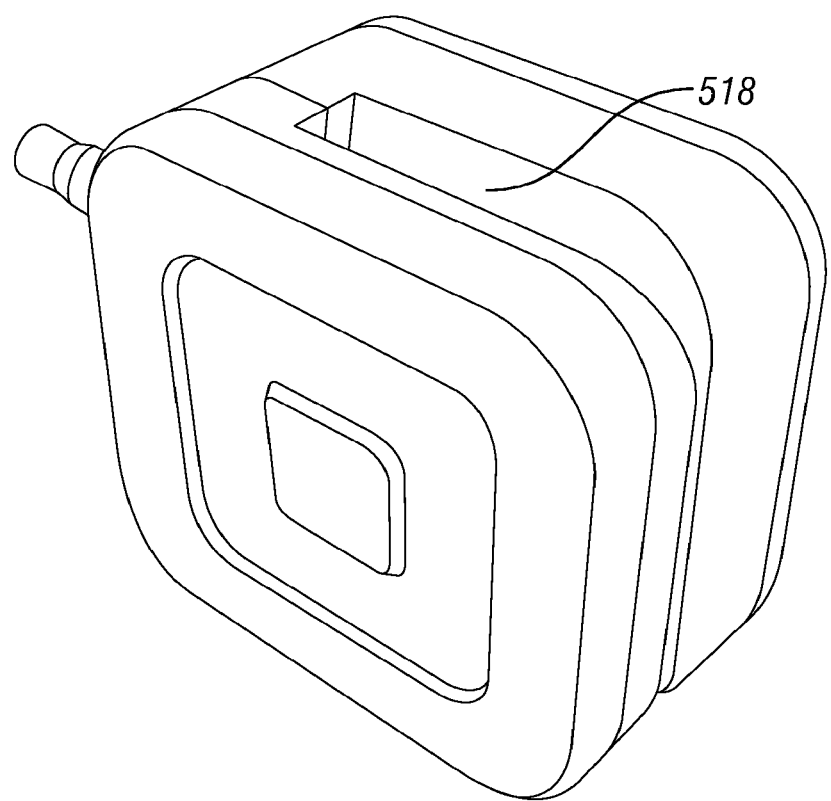
FIG. 31 is a perspective view of a card reader in one embodiment of the present invention, with a slot with a varying width, and one end of the slot is broader than the opposite end, and the exterior housing including indicia for directionality.
Figure 32:
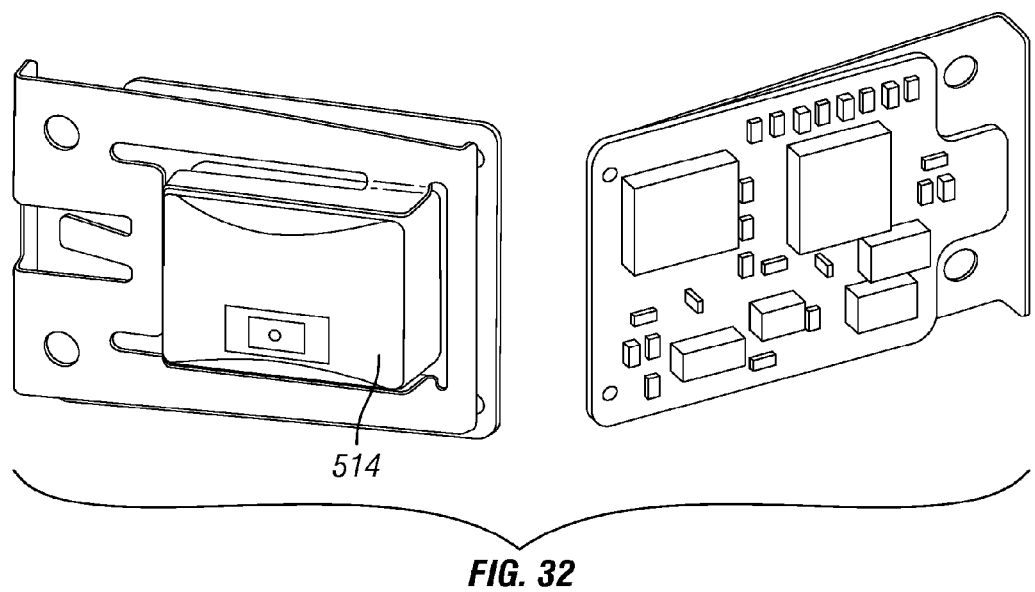
FIG. 32 illustrates an interior review of a card reader of the present invention, showing the read head on one side, and electronics and circuitry on an opposite side.
Figure 43:
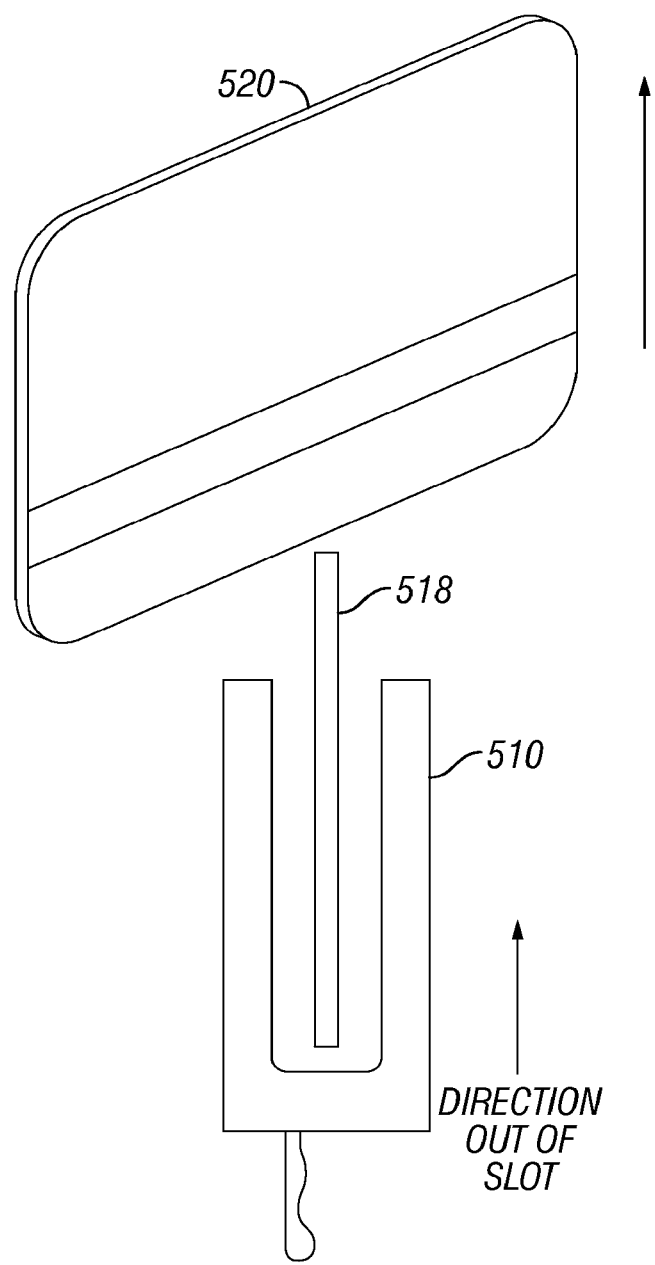
FIG. 43 illustrates a card in a slot of a read head in an embodiment of the invention, illustrates how the card can rotate at an angle away from a bottom of the slot, and also exit at an angle relative to the slot.
Figure 44:
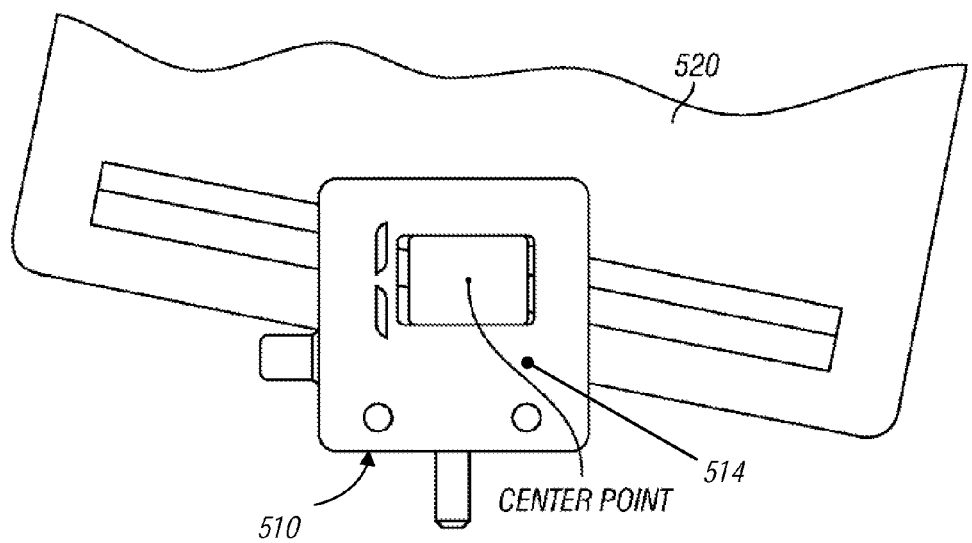
FIG. 44 illustrates an embodiment of the present invention with the read head positioned offset from a center of an associated housing, movement of a card through a slot an angle relative to the card reader and a coupled mobile device.

The rotation can be in a direction of a plane of the card 520. Accommodation of rocking enables a bottom of the card 520 to be moved in a direction away from a bottom of the slot 518 while the card 520 is slid through the slot 518 (FIG. 43). In one embodiment, the read head 514 has a side where the output jack 530 extends with a width of no more than 5 mm. In one embodiment, the slot 518 is configured to provide for directionality of card 520 swipe directions (FIG. 31). This can be achieved by, the slot 518 having a wider entrance track at one end to receive a card 520, providing direction indicia on the housing 512, and the like. As illustrated in FIG. 44, in one embodiment, the read head 514 is biased in a direction to one edge of a magnetic track of the card 520 when the card is in the slot 518. The read head 514 can be biased to one edge of a magnetic track of the card 520 and to one side of the card slot 518. The result of this is that a card in the slot can be rotated more on one side of the card slot. In another embodiment, a method is provided of transmitting information to a mobile device 516 with a small reader 510. The card reader 510 has length and height dimensions that are less than length or height dimensions of a coupled mobile device 516 (FIG. 16(*b*)). A card 520 is slid in the slot 518, data is read from the magnetic stripe, a raw magnetic signal indicative of data stored on the magnetic stripe is produced, and the raw magnetic head signal is processed into a processed digital signal that the microcontroller 526 can interpret. Rocking of the card 520 in the slot 518 is accommodated with a successful read of the magnetic stripe of the card 520. The rocking is in an amount of 1 to 10 degrees of rotation of a bottom surface of the card 520 away from a bottom surface of the slot 518. An output jack signal is thereafter sent to the mobile device 516.

Figure 45:
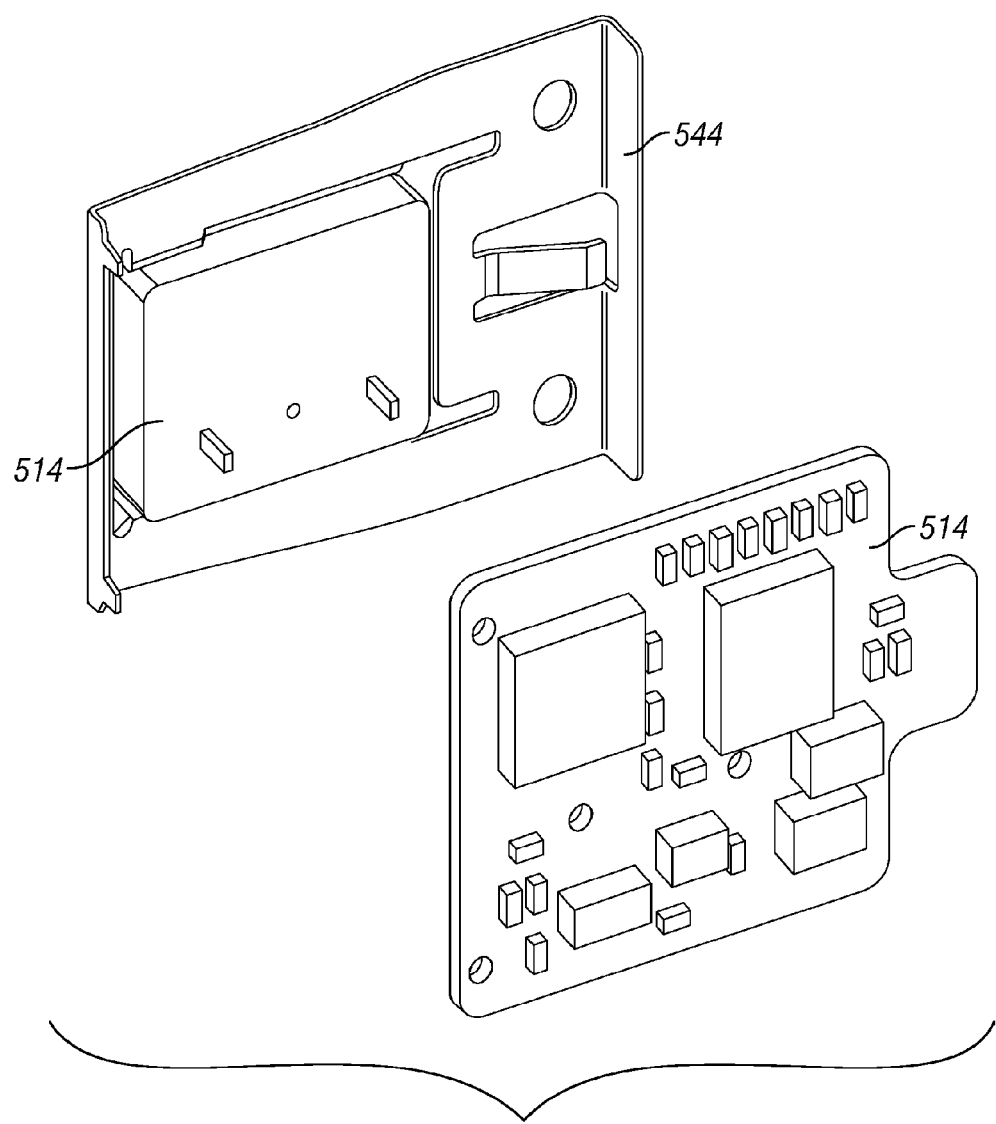
FIG. 45 illustrates an asymmetric spring that can be used in an embodiment of the present invention.

Referring now to FIG. 45, in another embodiment of the present invention, a card reader 510 includes a housing 512 with length, height and width dimensions. A read head 514 is positioned in the housing 512. The read head 514 is configured to be coupled to a mobile device 516. The read head 514 has a slot 518 for swiping a magnetic stripe of a card 520. The read head 514 reads data on the magnetic stripe and produces a signal indicative of data stored on the magnetic stripe. An asymmetric spring 544 is coupled to the read head 514. The asymmetric spring 514 positions the read head 514 to be offset in the housing 512, with the housing length and height edges being non-symmetrical in respect to the length and height edges of the read head 514. An output jack 530 is adapted to be inserted in a port of the mobile device and deliver an output jack signal to the mobile device.

The asymmetric spring 544 can be a cantilever with a pre-load onto an opposing wall on a back bone to provide that the read head 514 is substantially perpendicular to the magnetic strip of the card 520 when the card 520 is read by the read head 514. The asymmetric spring 544 can be configured to provide read head 514 positional adjustment when a card 520 is in the card reader slot 518. Accommodation of rocking enables a card 520 to be moved in a direction away from a bottom of the slot 518 while the card 520 is slid through the slot 518. The asymmetric spring 544 can be attached at a single point to a side of the housing 512.

In one embodiment, the asymmetric spring 544 angles the read head 514 to create an angled read head 514. This provides that when a card 520 is inserted in the slot 518 the read head 514 is parallel to the card 520. The angled head is substantially parallel with a card 520 as it is swiped through the slot 518.

As illustrated in FIG. 44, the asymmetric spring 544 shifts the read head 514 off center relative to the housing 512. In various embodiments, offsetting of the read head 514, (i) increases successful card 520 readings when the card 520 is rotated about a corner of a bottom of the slot 518; (ii) allows the card 520 to be rotated at a greater angle while still keeping the read head's active area on the magnetic track of the card 520; (iii) allows for more card 520 rotation by the user as the card 520 is swept through the slot 518; and the like.

In one embodiment, the read head 514 is shifted up with respect to a center line of the magnetic track. The card 520 can be rotated farther off a bottom of the slot 518 before a read head active area is no longer on the magnetic track of the card 520. In various embodiments, the read head 514 is configured to be positioned to, (i) be offset from a center of track 1 or track 2 of the card 520; provide up to 10 degrees of rotation and still register on track 1 or track 2 of the card 520, and the like.

As shown in FIG. 44, in one embodiment, the read head 514 is positioned away from the center point of the housing 512. The read head 514 is offset from track 1 of the card 520 when the card 520 is positioned in the slot 518 and is in contact with a bottom of the slot 518. Offsetting the read head 514 from track 1 of a card 520 is used to bias the slot 518 to a bottom of track 1 of the card 520. When the read head 514 is offset the user is provided with a flexibility to move the card 520 in a direction away from a bottom of the slot 518 as the card 520 is slid.

By offsetting, the housing 512 has a bottom surface that is adjacent to the mobile device 516, and the read head 514 is positioned in the housing 512 to be non¬parallel to the bottom surface and the associated surface of the mobile device 516. Offsetting provides a higher success rate of swipes achieved with rotation of the card 520 in the slot 518.

In one embodiment, the device electronics receives a raw signal from the read head 514 and converts it into a process digital signal that the microcontroller 526 can interpret. The microcontroller 526 has associated logic resources and code that receives a digital signal from the device electronics 522 and creates an encrypted and signed message based on the contents of the signal. The output jack 530 delivers an encrypted and signed output jack signal to the mobile device 516, with at least a portion of the output jack signal being encrypted. The message created can contain both encrypted and non-encrypted data, and a signature that can be used to verify that the data has not been modified.

In one embodiment, the microcontroller code uses a block cipher for encryption and signing. In one embodiment, the microcontroller uses the CCFB+H cipher mode for encryption and signing. Some embodiments of the encryption logic are described in Two-Pass Authenticated Encryption Faster than Generic Composition, S. Lucks, University of Mannheim, Germany; http://ttllinformatic-uni¬mannheim/de/people/lucksl; and Comparing Block Cipher Modes of Operation on MICAz Sensor Nodes, G. Bauer et ai., Institute for Applied Information Processing and Communications, Gran University of Technology, both fully incorporated herein by reference.

The microcontrollers code can include a unique identifier and cryptographic key. The code can inspect itself to see if it, its cryptographic key, or its identifier has been modified. In one embodiment, the code includes countermeasures to detect tampering and attacks on the card reader.

In one embodiment, the card reader 514 disables itself when modification or tampering is detected. In one embodiment, the code is no more than 8 kilobytes in size.

The cryptographic key can be expanded before programming, and the microcontroller code does not include or require key expansion functionality. The microcontroller can be configured to recalculate the bit period in real time to capture variable-speed swipes. In one embodiment, the microcontrollers is configured to parse and error-check card data. Additionally, the microcontrollers can be configured to run periodic checksums on code and memory.

In one embodiment, the microcontrollers uses thresholds to filter out erroneous data and/or false edges. The microcontrollers can be configured to determine 1's and 0's by checking the frequency of polarity changes within a bit period.

In one embodiment, the microcontrollers 526 is configured to produce a synchronous Manchester encoded stream that makes a greater number of 0 crossings. The output jack 530 is adapted to be inserted in a port of the mobile device 516 and deliver a Manchester encoded stream via the output jack 530 to the mobile device 516.

The number of 0 crossings is sufficient to simulate a signal with a sufficiently high frequency so that the mobile device's active filter does not cut off the output jack signal. AC coupling/filtering can be applied to the output jack signal.

Figure 46:
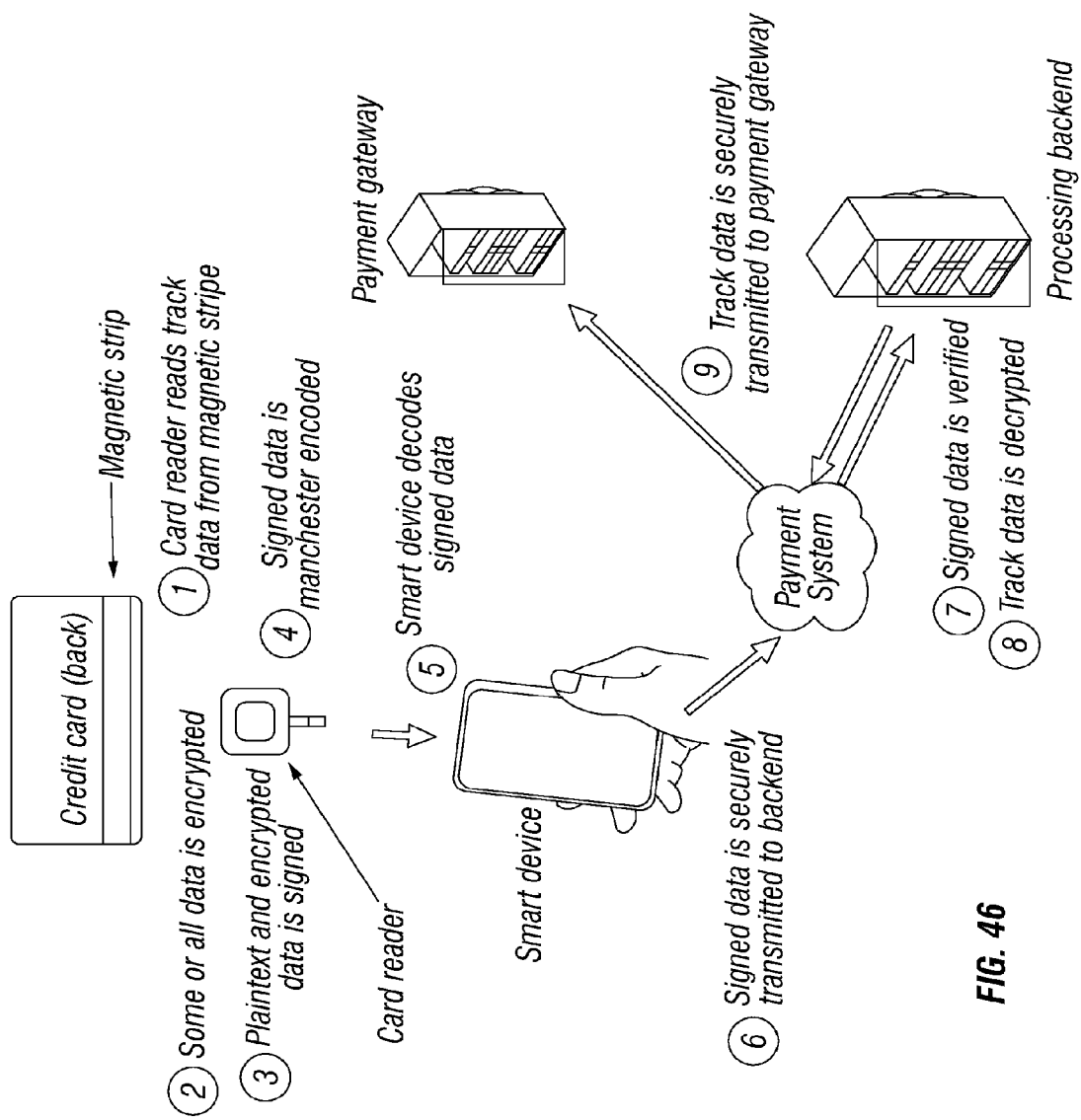
FIG. 46 illustrates a flow of a card read with a card reader of the present invention, its' interaction with a mobile device and a back end of a payment system.

Referring to FIG. 46, in another embodiment a method of reconstructing a packet that includes financial card information from a mobile device uses a card reader 510 with a read head 514 and a slot 518 for swiping a magnetic stripe of a card 520. Device electronics 522 includes a microcontrollers 526 with logic resources with code. The card reader 514 has a unique identifier and associated cryptographic key. The same code is used to produce an encrypted and signed signal. The encrypted and signed signal, that includes the card reader identifier, is delivered to the mobile device 516. The mobile device 516 sends an encrypted and signed packet to a back end of a payment system. A cryptographic key is used to decrypt and verify the contents of the packet at the back end. Non-encrypted card 520 information is sent to a payment gateway.

The packet can contain both encrypted and non-encrypted data. The signature can be used to verify that the data has not been modified. In one embodiment, the encrypted and signed packet includes an identifier that is unique to the card reader 510. The cryptographic key associated with the card reader 510 is derived from a master secret and the card reader's unique identifier. The master secret can be created in a hardware security module and never transmitted to or shared with the card reader 510 manufacturing facility, payment gateway, mobile devices, or any other third party.

The back end derives the cryptographic key used to encrypt a packet based on the unique identifier contained within the packet. In one embodiment, the back end uses a block cipher algorithm to decrypt and verify the contents of the packet, and the CCFB+H cipher mode to decrypt and verify the contents of the packet.

An acknowledgment of successful or unsuccessful transactions can be sent from the back-end to the mobile device. Selected information about the packet and transaction can be stored at the back-end and used for data mining. The stored information can be used for communicating to a purchaser relative to the purchaser's purchasing history and activity.

In one embodiment, the encrypted and signed signal is created by the microcontroller 526 with no more than 8 kilobytes of code. The microcontroller 526 can be used to recalculate a bit period in real time to capture variable-speed swipes. Additionally, the microcontroller 526 can be used to parse and error-check card 520 data. In one embodiment, the microcontroller 526 is used to run periodic checksums on code and memory.

Thresholds can be used to filter out erroneous data and/or false edges. The microcontroller 526 can be used to determine 1's and 0's by checking the frequency of polarity changes within a bit period.

Figure 47:
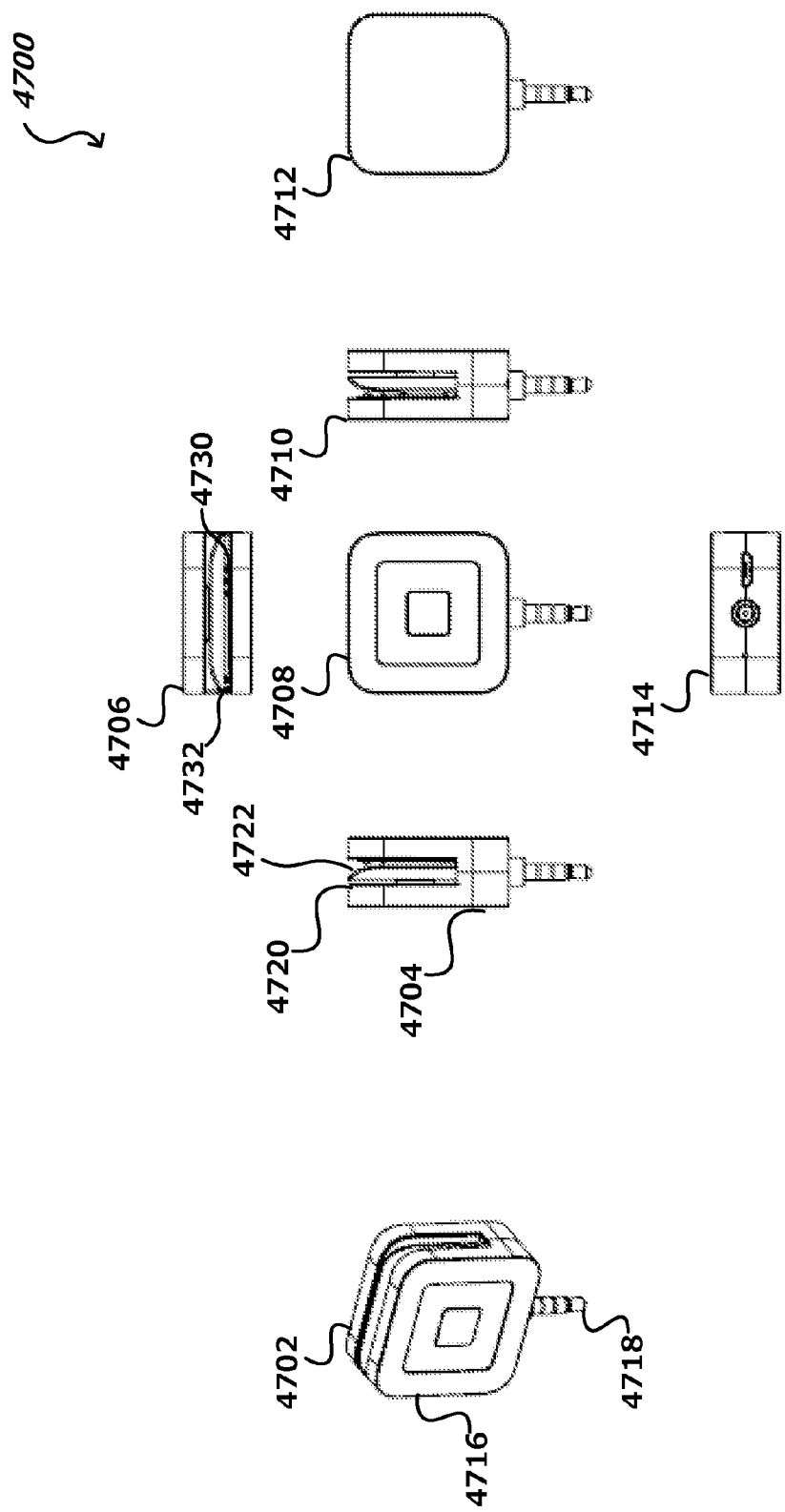
FIG. 47 depicts an example of an external structural diagram of a miniaturized card reader in accordance with an embodiment.

FIG. 47 depicts an example 4700 of an external structural diagram of a miniaturized card reader in accordance with an embodiment. In accordance with various embodiments, the card reader can accept financial information from chip cards. Chip cards, e.g., Europay, Mastercard, Visa (EMV) cards, are cards that include an integrated circuit that can provide authentication, identification, and application processing for conducting a transaction. In some implementations, the integrated circuit stores sensitive data, e.g., a personal identification number (PIN). Card readers, such as those depicted in FIG. 47, can read data from the integrated circuit on the chip card and provide the data to a host, e.g., a computer or point of sale terminal or mobile wireless device.

To perform a transaction using a chip card and a chip card reader, a user inserts the chip card into the chip card reader. The integrated circuit of the chip card resides at a predetermined position on the chip card, e.g., according to standard chip card specifications. Generally, housing of the chip card reader includes sides that are wide enough, e.g., slightly wider than the chip card, to form a close-ended groove so, upon insertion, the ends of the groove constrain the chip card so that the chip card will not move laterally. The chip card reader also can read the chip card using circuitry positioned over the integrated circuit when the chip card reaches a final position inside the groove. The circuitry can be a printed circuit board that interacts with the integrated circuit. When the chip card is inserted into the chip card reader, the printed circuit board can be coupled to contacts that come into physical contact with contacts of the chip card's integrated circuit. The chip card reader can communicate with the chip card reader through the contacts Illustrated in FIG. 47 are views 4702, 4704, 4706 4708, 4710, 4712, and 4714 of such a card reader. The views includes a front-facing view 4708, side views 4704 and 4710, back-side view 4712, bottom view 4717, top view 4706, and three quarter view 4702. As shown in view 4702, the card reader includes a housing 4716 and a signal plug 4718 extending out from the housing. The housing can be physically and communicatively coupled to the signal plug, which can be removably inserted into a headphone port of a host device, such as a smart phone, personal computer, tablet device, or the like. The signal plug can form part of an audio bus that includes left and right audio output channels, an audio input channel (via microphone contact), and a ground connection (via ground contact). Once the signal plug is inserted into the compatible jack of a host device, such as a smartphone, bi-directional communication between the card reader device and the host is enabled e.g., via the left/right audio output channels and audio input channel, using the methods and systems discussed above.

For example, the housing can include two slots (4720 and 4722), a read head configured to accepts at least two types of contact with a card, and an optional and various circuitry. The two different types of slots can be configured for conducting a financial transaction between entities. In accordance with an embodiment, a first slot 4722 can allow for a magnetic stripe element of a card to be swiped. The second slot 4720 includes contact elements which allow the card to be "dipped in". Accordingly, in accordance with various embodiments, the device can receive a swipe and/or a "dipping" of a card into the one of the slots for conducting a financial transaction. It should be noted that other components, elements, and/or aspects of the card reader including structural and internal and described further in the application.

In accordance with various embodiments, the second slot can include a plurality of contact elements which allow the card to be "dipped" into the read head to conduct a financial transaction. In certain embodiments, the number of contact leads of the reader can allow the card to be dipped into the card reader in one or more orientations. In various embodiments, instead of having closed sides, the card reader can have an open side that allows the card to move laterally when inserted into a slot, as illustrated in top view 4706 and side views 4704 and 4710. For example, as shown in view 4706, sidewall 4732 can close one of the two sides.

The card reader can include an array of contacts 4730 coupled to a frame of the card reader. The array of contacts can have more contacts than a number of contacts on an integrated circuit of the chip card. The array of contacts can be positioned off-center as illustrated in view 4706. It should be noted that the array of contacts can be positioned in any number of positions on the card reader and the view shown is merely an example placement of the array of contacts. When a card is dipped into the card reader, the array of contacts can align with the card contacts due to, for example, the spacing between the array of contacts and the sidewall 4732. Thereafter, the card reader can determine which contacts of the array of contacts, e.g., reader contacts, are in contact with the contacts of the integrated circuit, e.g., card contacts, and the card reader can select those reader contacts to communicate with the chip card.

In accordance with various embodiments, the density of the plurality of card reader contacts can be twice as high as density of the plurality of card contacts. In various embodiments, there can be an equal number of reader contacts as card contacts or some other ration of reader contacts to card contacts. In accordance with an embodiment, the subset of contacts can be positioned to engage with the plurality of card contacts when the insertion of the chip card reaches a bottom edge of the card reader, for example, when a bottom edge portion of the chip card reaches the sidewall 4732. An audio jack comprising circuitry configured to communicate with a mobile device. Circuitry configured to communicate with magnetic stripe cards. The frame comprises a transparent panel that overlays at least a portion of the plurality of reader contacts. Circuitry that displays an indication when the subset of reader contacts is selected. Circuitry that outputs an audio signal when the subset of reader contacts is selected. Circuitry is configured to perform operations comprising: applying, for one or more reader contacts in the plurality of reader contacts, power to the respective contact; measuring, for the one or more reader contacts, whether power is being drawn from the respective contact; and selecting the subset of reader contacts based on whether power is drawn from the one or more reader contacts.

In accordance with various embodiments, as described, the housing includes a first slot through which a payment card, such as a credit or debit card, may be swiped. Passage of a magnetic stripe of the payment card past a read head can enable payment information to be received via the read head. The resulting signal provided by the read head is typically an analog signal that must be digitized e.g., using ADC, before the resulting digital information is provided to microcontroller. Different types of information can be read from a magnetic stripe, depending on implementation. For example, user and payment card account information can be read from track 1 and track 2 of the magnetic stripe, respectively. However, in other implementations, any track (or combination of tracks) may be read from the magnetic stripe, including any combination, or all of tracks 1, 2 and 3.

Figure 48A:
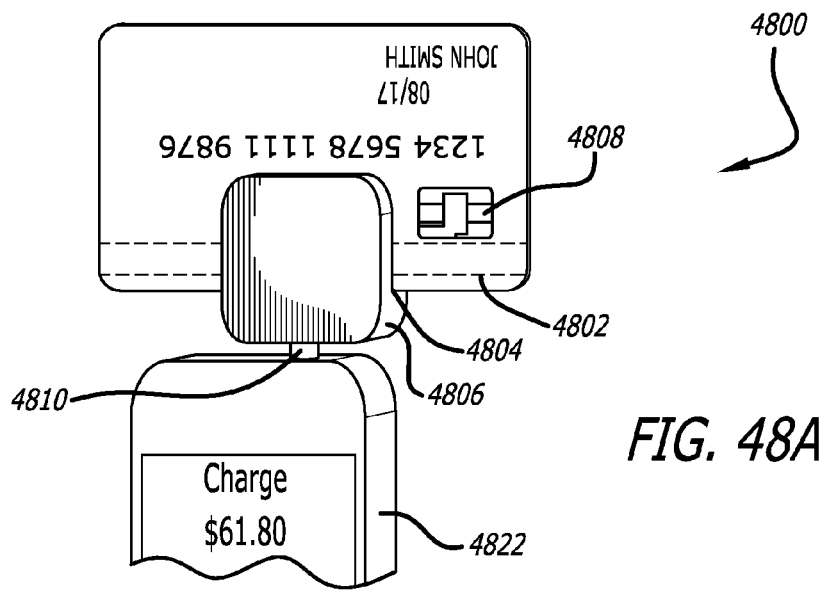
FIGS. 48A and 48B depict an example of a system diagram to support financial transaction between a payer and a payee through a miniaturized card reader connected to a mobile device in accordance with an embodiment.
Figure 48B:
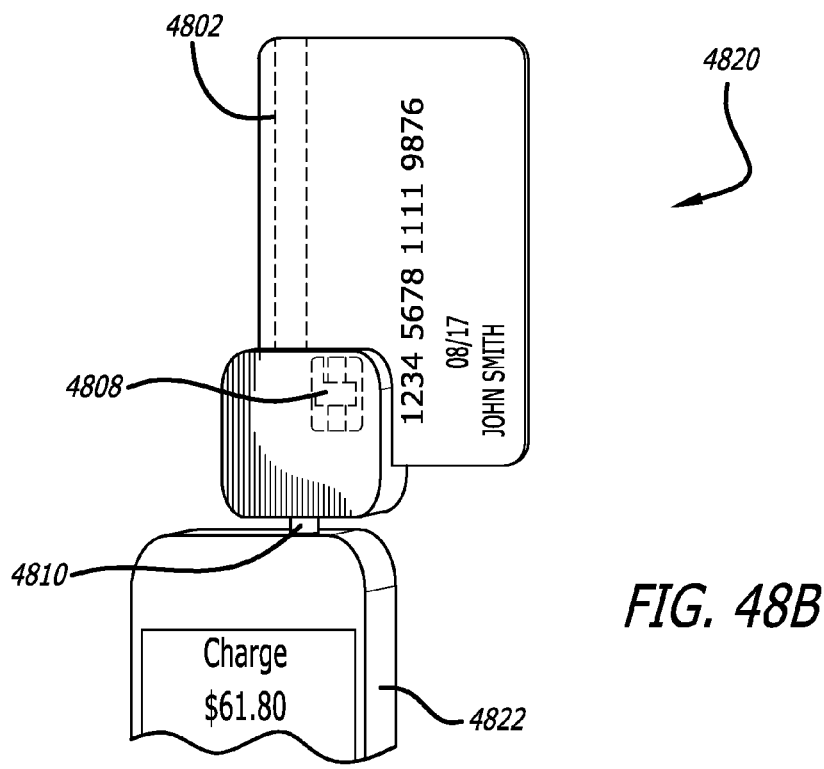

FIGS. 48A and 48B depict examples 4800 and 4820 of a financial transaction between a payer and a payee through a miniaturized card reader connected to a mobile device in accordance with an embodiment. As shown in example 4800 of FIG. 48A, a financial transaction card includes a magnetic stripe 4802 that can be swiped through the magnetic read portion 4804 of the card reader 4806. The card can also include an integrated circuit (IC) 4808, also known as a chip, on the card. In this example, the card reader can be configured to read data encoded in the magnetic strip being swiped by a buyer and send a signal that corresponds to the data read to the mobile device via the signal plug 4810. This signal is at least partially if not fully decoded in the mobile device.

As shown in FIG. 48B, the card including the chip 4810 (shown in phantom) is being inserted into the card reader connected to a mobile device 4822. The chip card, also known as an EMV card or a smart card, includes the integrated circuit (IC) 4810 (shown in phantom), also known as a chip, on the card. The IC generally resides at a predetermined position on the chip card. For example, the predetermined position can be dictated by specifications for manufacturing chip cards. As described, the card reader can also include the audio jack 4808. When the chip card is inserted into the card reader, the card reader can transfer data between the chip card and a device, e.g., a mobile device, e.g., a smartphone or tablet computer, using the audio jack.

The IC can have a contact area comprising several conductive contact pads (also referred to in this description as "card contacts"), e.g., gold-plated contact pads. For example, according to the ISO/IEC 7816 specification, a standard for chip cards, the IC includes eight contacts. A first card contact can be used as Vcc (supply voltage) to power the card. A second card contact can be used as a GND output. A third card contact can be used as a serial input and output. Other card contacts can receive a clock signal, a variable supply voltage, or can be reserved for future use. When functioning properly, the contacts also draw a standard amount of power as defined by the specification. The specification also defines position of each of the contacts relative to each other and to edges of the chip card, e.g., the supply voltage contact should be 5 mm from the GND contact and 2 mm from a reset contact.

The chip card can be inserted into the card reader, e.g., in a vertical direction as shown. The card reader can include a slot to receive the chip card. Upon insertion, when the chip card reaches a bottom edge of the card reader, the contacts come in contact with a portion of a contact array, which resides on an inside face of the slot. The contact array comprises many contacts (also referred to in this description as "reader contacts"), each of which can engage with any of the contacts of the IC. For example, the contact array can include more than thirty contacts. The contact array can cover an area spanning up to an entire width of the card reader. In this way, as long as the IC is positioned within the area of the contact array, the card reader can communicate with the chip card. For example, example card reader with a contact array and a chip card having an integrated circuit inserted into the card reader. The contact array can span up to a width of the card reader. Therefore, the card can be inserted in different positions while still being accessed by the contact array.

For example, in accordance with various embodiments, the card having the integrated circuit is inserted and rests at a bottom edge of the card reader. The card reader can determine which contacts to use. For example, the card reader can start by testing whether a contact of the integrated circuit is at a first contact. In the situation that a first contact does not engage with any contact of the integrated circuit, the card reader can continue until determining that a second contact and a third contact engage with pins of the integrated circuit. For example, the card reader can determine that the second contact and the third contact are the ground and supply voltage contacts, respectively, e.g., by testing protocol responses or comparing an amount of power drawn. The card reader can then determine, based on a specification, to engage with the contacts to communicate with the card. In the situation where the card is inserted at a slightly shifted position, e.g., is slightly inserted to the right of the card reader, the card reader can determine which contacts should engage with the integrated circuit.

In accordance with various embodiments, the card reader can include a high density contact array. In some implementations, the density of the contacts in the contact array is higher than density of contacts in the integrated circuit. For example, the density in the contact array can be twice as high as the density of contacts in the integrated circuit. In this way, no matter how the card is inserted, contacts within the contact array can engage with contacts of the integrated circuit. As described, there can be an equal number of reader contacts as card contacts as well as any one of a number of different combinations of reader contacts to card contacts. The card reader can have an open side that allows the card to move laterally when inserted into a slot. For example, a sidewall can close one of the two sides and can limit the lateral motion of the card in the slot such that an array of card contacts can align with an array of card contacts. In this example, when a card is dipped into the dip-slot, the reader contacts can align with the card contacts according to, for example, the spacing between the contact array and the sidewall.

Figure 49:
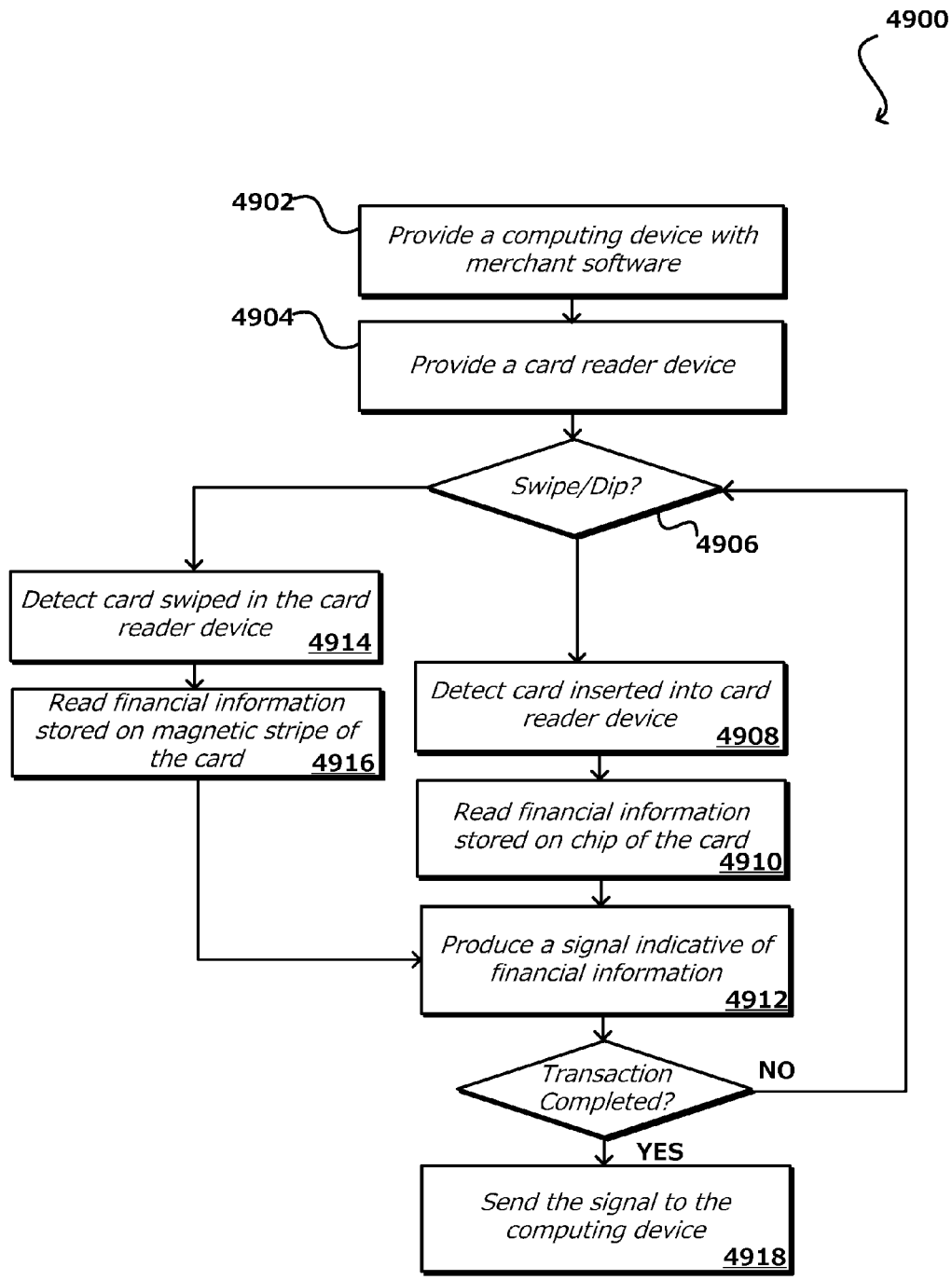
FIG. 49 illustrates an example process for conducting a financial transaction in accordance with various embodiments.

FIG. 49 illustrates an example process 4900 for conducting a financial transaction in accordance with various embodiments. A portable computing device (e.g., a mobile phone, a tablet computer, etc.) configured to run a merchant application or other software can be provided 4902. A card reader device or other electronic device can be provided 4904, where the card reader device can include, for example, a read head including a slot for swiping of a magnetic stripe of a buyer's financial transaction card with the slot in response to a financial transaction between a buyer and seller, the read head configured to read data on the magnetic stripe and producing a signal indicative of data stored on the magnetic stripe. In various embodiments, the card reader head can include a dip slot for accepting integrated circuit cards, such as those conforming to the Europay, Mastercard, and Visa (EMV) standard.

The card reader determines 4906 whether the magnetic stripe of the card is swiped or whether the card is dipped into the card reader. In the situation where the card is dipped into the card reader to perform a transaction, the card reader detects 4908 that a user has inserted the chip card into the chip card reader. The integrated circuit of the chip card resides at a predetermined position on the chip card, e.g., according to standard chip card specifications. Generally, housing of the chip card reader includes sides that are wide enough, e.g., slightly wider than the chip card, to form a close-ended groove so, upon insertion, the ends of the groove constrain the chip card so that the chip card will not move laterally. The chip card reader also can read 4910 the chip card using circuitry positioned over the integrated circuit when the chip card reaches a final position inside the groove. For example, the circuitry can be a printed circuit board that interacts with the integrated circuit. When the chip card is inserted into the chip card reader, the printed circuit board can be coupled to contacts that come into physical contact with contacts of the chip card's integrated circuit. The chip card reader can communicate with the chip card reader through the contacts. The chip card reader can read financial information stored on the financial transaction card, and produce 4912 a signal indicative of the financial information. In the situation where the financial transaction is complete, the device can send 4918 the signal that corresponds to the financial information to the computing device via a signal plug. In the situation where the financial transaction is not complete, the device can attempt to determine one of a swipe or dip of the financial transaction card to complete the transaction. In this way, the card reader is configured to enable a financial transaction between a first entity and a second entity when the card is dipped into the card reader.

In the situation where the card is swiped in the card reader, the device can detect 4914 that the magnetic stripe element of the card was swiped through the magnetic read portion of the card reader. The card reader can read data encoded in a magnetic strip of a card being swiped by a buyer and produce a signal indicative of the financial information. Thereafter, in the situation where the financial transaction is complete, the device can send the signal that corresponds to the financial information to the computing device via a signal plug. In the situation where the financial transaction is not complete, the device can attempt to determine one of a swipe or dip of the financial transaction card to complete the transaction.

Figure 50:
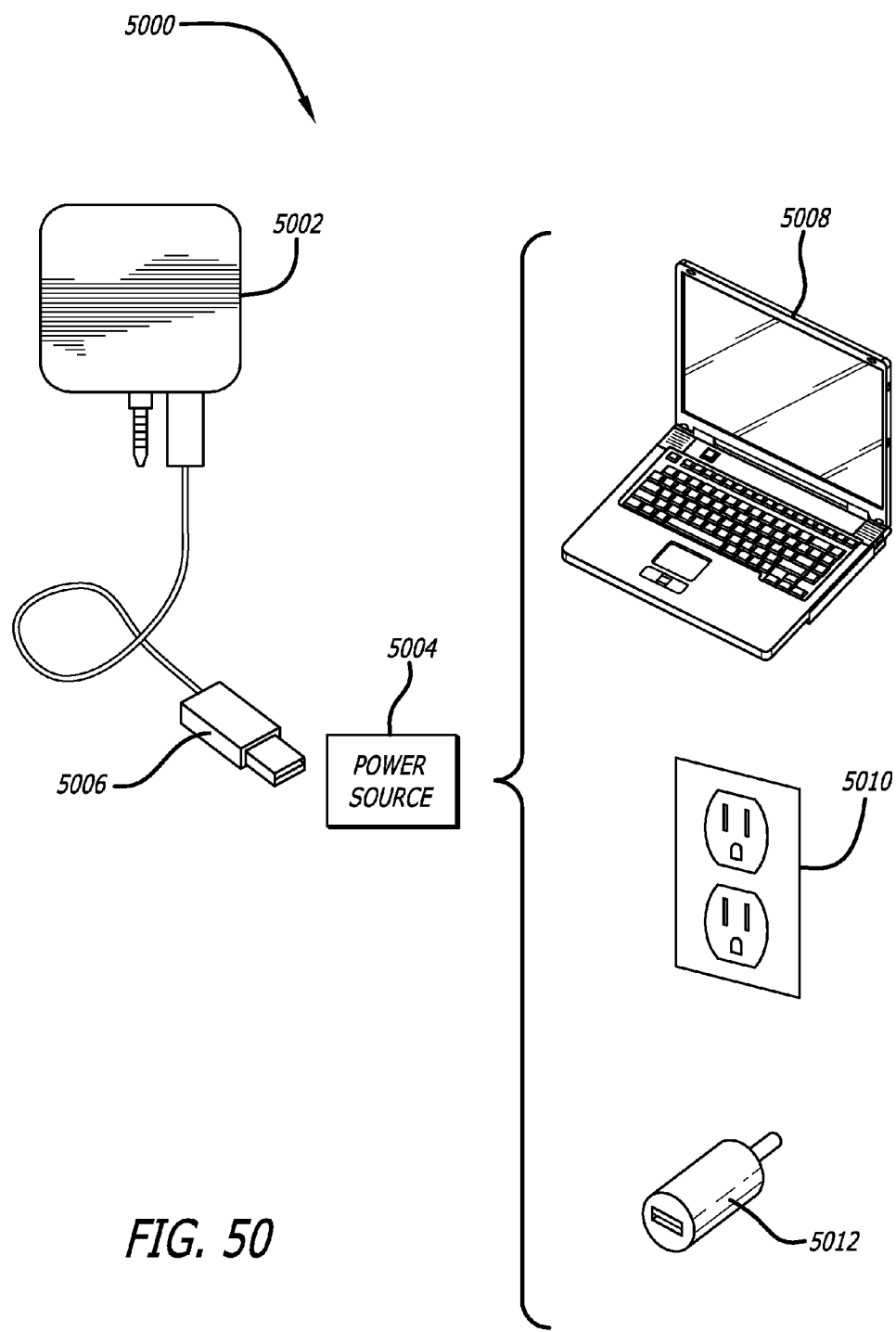
FIG. 50 illustrates an example operation of a miniaturized card reader in accordance with various embodiments.

FIG. 50 illustrates an example operation 5000 of a miniaturized card reader 5002 in accordance with various embodiments. As described, the card reader can include circuitry configured to facilitate a financial transaction, as may include encryption, peak detection, among other circuitry. In various embodiments, the device includes processing, memory, and power components. In various embodiments, the device can be charged and/or provided power to operate by connecting the card reader to a power source 5004. In accordance with various embodiments, the power source can include one of a number of sources, any such source configured to provide power. For example, the card reader can be charged using a computing device such as a laptop, mobile phone, tablet, or other computing device. In this situation, the card reader can be coupled to the computing device via a cable 5006 or other component capable of connecting the card reader to a power source. When connected, the card reader can be charged via the cable from the connected computing device. In some situations the card reader can be charged via the signal plug of the device. For example, as described herein, the card reader can be attached to a mobile phone or other device. In the situation where the card reader is attached to the computing device, the card reader can be powered and/or charged. In this situation, data and/or power can be transferred between the card reader and computing device. The card reader can be charged via a wall outlet. In this example, the card reader can couple to the wall outlet via any appropriate cable and/or connector such as connector 5012. In this situation, when the card reader is connected to the outlet, power provided from the outlet can charge and/or power the card reader. In certain embodiments, the card reader can be provided power through one or more wireless approaches. This can include various inductive charging approaches as is known in the art.

Figure 51:
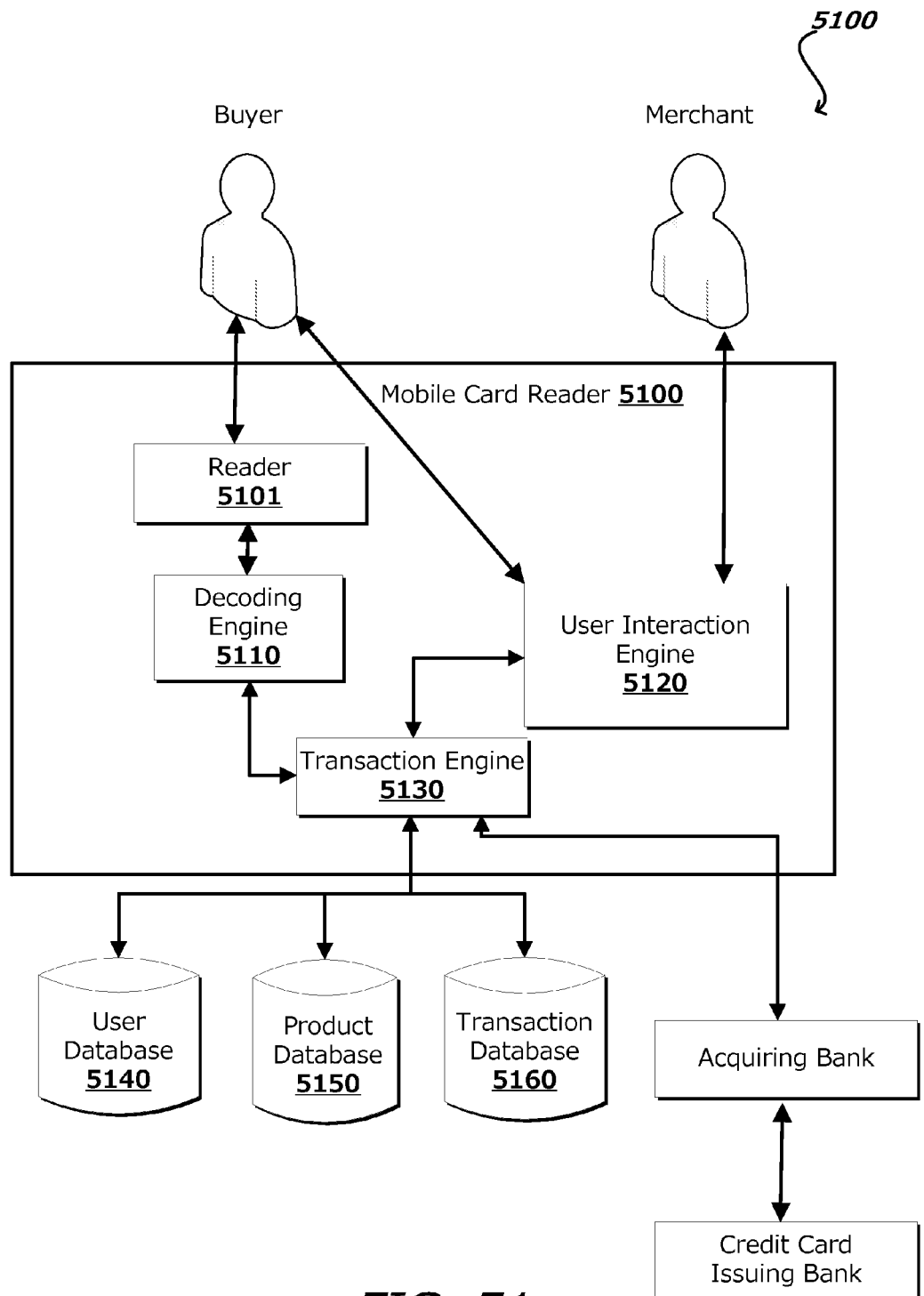
FIG. 51 illustrates an example environment for conducting a financial payment transaction in accordance with various embodiments.

FIG. 51 illustrates an example of an environment 5100 in which a reader of the subject technology is used to facilitate a financial transaction between a buyer and a merchant. Although the diagrams depict components as functionally separate, such depictions are merely for illustrative purposes. It will be apparent that the components portrayed in this figure can be arbitrarily combined or divided into separate software, firmware and/or hardware components, such as combined into a common device or mobile card reader. Furthermore, it will also be apparent that such components, regardless of how they are combined or divided, can execute on the same host or multiple hosts, and wherein multiple hosts can be connected by one or more networks.

In the example environment, the system includes a mobile card reader 5100, including reader 5101, decoding engine 5110, a user interaction engine 5120, and a transaction engine 5130. Additionally, the mobile card reader may also include (or have access to) one or more of a user database 5140, a product or service database 5150, and a transaction database 5160, which are all coupled to transaction engine 5130.

As used herein, the term engine refers to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical. As used herein, the term database is used broadly to include any known or convenient means for storing data, whether centralized or distributed, relational or otherwise.

The mobile card reader 5100 can include various software and hardware modules including software, firmware, hardware, or any combination capable of at least receiving the signal, decoding if needed, exchanging information with a transaction server, for example to validate merchant information (form mobile card reader activation) or to verify the buyer and/or seller's account information, conducting the transaction, and generating a receipt. Typical components of mobile card reader 5100 can include but are not limited to a battery, LCD driver, a display, a radio frequency (RF) antenna (e.g., a cellular antenna), a speaker, a Bluetooth circuit, and Wi-Fi circuitry.

In response to a financial transaction between a buyer and a seller, mobile card reader 5100 accepts information selected including but not limited to information from a financial transaction or information pertaining to financial transaction card used by the buyer in the transaction. Additionally, a financial transaction device can be utilized. Non-limiting examples of financial transaction devices include but are not limited to a wristband, RFID chip, cell phone, biometric marker and the like. At least a portion of this information is communicated to a third party financial institution or payment network to authorize the transaction.

Payment confirmation can be made with a communication channel of the buyer's choice. As non-limiting examples, confirmation of payment can be an electronic notification in the form selected from at least one of, email, SMS message, MMS message, email message, tweet (message delivered via Twitter), instant message, communication within a social network and the like. In response to the transaction, a confirmation (e.g., an authorization response) is made that the buyer is authorized to use the financial transaction card. In certain implementations, a confirmation can be provided that indicates a sufficiency of funds available to the buyer.

Reader 5101 is configured to read data encoded in a magnetic strip of a card being swiped by a buyer and send a signal that corresponds to the data read to mobile card reader 5100. As discussed above, reader 5101 can be configured to receive various payment card types, including but not limited to IC cards that can be provided to reader 5101 using a dip slot. For example, a read head of the card reader can include a first slot configured to receive a magnetic stripe of the financial transaction card and a second slot configured receive at least a portion of a plurality of financial transaction card contacts. The second slot can include, for example, a plurality of card reader contacts positioned to be contacted by the portion of the plurality of financial transaction card contacts and an open side that allows the financial transaction card to move laterally when the financial transaction card is inserted into the second slot. Circuitry included in the card reader can be configured to, for example, communicate with an integrated circuit embedded in the financial transaction card through the portion of the plurality of financial transaction card contacts, read financial information stored on the financial transaction card, and produce a signal indicative of the financial information. In this way, the card reader is configured to enable a financial transaction between a first entity and a second entity using one of the first slot or the second slot.

The size of mobile card reader 5100 can be miniaturized for portability. In addition, the mobile card reader 5101 is also designed to reliably read the card with minimum error via a single swipe by counteracting vendor specific filtering. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A card reader, comprising:
    a housing including a first slot and a second slot for receiving a financial transaction card for initiating a financial transaction between a first entity and a second entity, wherein the first slot is configured to receive a magnetic stripe of the financial transaction card, and the second slot is configured to have a plurality of card reader contacts positioned to be contacted by at least a portion of a plurality of contacts of the financial transaction card, wherein a first planar interior of the first slot is parallel to a second planar interior of the second slot;
    circuitry configured to communicate with the financial transaction card to read financial information stored on the financial transaction card and produce a signal indicative of the financial information;
    circuitry including an encryption system for encrypting the signal indicative of the financial information to a mobile device as encrypted; and
    an output jack adapted to be inserted into a microphone input associated with the mobile device for providing the encrypted signal indicative of the financial information stored on the financial transaction card to the mobile device.

2. The card reader of claim 1, wherein the circuitry to communicate with the financial transaction card is a read head in the housing for reading data stored on a magnetic stripe of the financial transaction card.

3. The card reader of claim 1, wherein the second slot includes an open side and a closed side, the closed side being closed by a sidewall, the second slot including a plurality of card reader contacts positioned to be contacted by the portion of the plurality of financial transaction card contacts when the financial transaction card is inserted into the second slot, and wherein a distance between the sidewall and the plurality of card reader contacts establishes an appropriate position of the plurality of card reader contacts to read the portion of the plurality of contacts of the financial transaction card.

4. The card reader of claim 3, wherein the circuitry is further configured to communicate with an integrated circuit embedded in the financial transaction card through the portion of the plurality of financial transaction card contacts.

5. The card reader of claim 3, wherein the card reader is configured to enable a financial transaction between the first entity and the second entity using one of the first slot or the second slot.

6. The card reader of claim 3, further configured to:
    determine a subset of the plurality of card reader contacts that engage the portion of contacts of the financial transaction card; and
    communicate with the financial transaction card through the subset of the plurality of card reader contacts.

7. The card reader of claim 6, further configured to:
    provide power to a contact of the plurality of card reader contacts;
    measure an amount of power drawn from the contact; and
    select the subset of the plurality of card reader contacts based at least in part on the amount of power reaching a power threshold.

8. The card reader of claim 3, wherein at least a subset of the plurality of card reader contacts is positioned to couple with the portion of a plurality of contacts of the financial transaction card when the financial transaction card is inserted at least a threshold distance into the second slot.

9. The card reader of claim 3, wherein the financial transaction is conducted by one of swiping the magnetic portion of the financial transaction card through the first slot or inserting the at least the portion of the plurality of financial transaction card contacts into the second slot.

10. The card reader of claim 3, wherein the plurality of card reader contacts is one of at least greater or equal than a number of a plurality of financial card reader contacts.

11. The card reader of claim 3, wherein the card reader is further configured to:
    receive a swipe of the financial transaction card in the first slot to determine the signal indicative of the financial information; and
    convert the signal into a processed digital signal that merchant software on the mobile device is configured to interpret.

12. The card reader of claim 3, wherein the card reader is further configured to:

receive an insertion of the financial transaction card in the second slot to determine the signal indicative of the financial information; and convert the signal into a processed digital signal that merchant software on the mobile device is configured to interpret.

13. A card reader, comprising:

an output jack configured to couple to a microphone input associated with a computing device for providing a signal indicative of financial information stored on a financial transaction card;

a read head including:
- a first slot configured to receive a magnetic stripe of the financial transaction card, and
- a second slot configured to receive at least a portion of a plurality of financial transaction card contacts of the financial transaction card, wherein a first planar interior of the first slot is parallel to a second planar interior of the second slot;

wherein the read head is configured to read data stored on the financial transaction card and for producing a signal indicative of data stored on the financial transaction card; and circuitry including an encryption system for encrypting a portion of the signal indicative of data stored on the financial transaction card, wherein the card reader is configured to enable a financial transaction between a first entity and a second entity using one of the first slot or the second slot.

14. The card reader of claim 13, wherein the second slot includes an open side and a closed side, the closed side being closed by a sidewall, the second slot including a plurality of card reader contacts positioned to be contacted by the portion of the plurality of financial transaction card contacts when the financial transaction card is inserted into the second slot, and wherein a distance between the sidewall and the plurality of card reader contacts establishes an appropriate position of the plurality of card reader contacts to read the portion of the plurality of financial transaction card contacts.

15. The card reader of claim 13, further including circuitry configured to:

communicate with an integrated circuit embedded in the financial transaction card through the portion of the plurality of financial transaction card contacts;

read financial information stored on the financial transaction card; and produce the signal indicative of the financial information.

16. A financial transaction card reader device in communication with a payment system, comprising:

a housing having a first slot and a second slot for receiving at least a portion of a financial transaction card to complete a financial transaction between a buyer and seller, wherein a first planar interior of the first slot is parallel to a second planar interior of the second slot, wherein:

the first slot is configured to receive a magnetic stripe of the financial transaction card and including a magnetic stripe reader for reading the magnetic stripe of the financial transaction card and providing a signal of a financial information stored on the financial transaction card, and the second slot includes a plurality of card reader contacts positioned to be contacted by at least a portion of a plurality of contacts of the financial transaction card, the plurality of card reader contacts for reading the plurality of contacts of the financial transaction card and providing the signal of the financial information stored on the financial transaction card; and an output jack configured to be inserted into a port of a seller's mobile device and to provide the signal indicative of the financial information stored on the financial transaction card to the mobile device; and circuitry including an encryption system for encrypting and providing at least a portion of the signal indicative of the financial information stored on the financial transaction card to the mobile device as encrypted.

17. The financial transaction card reader device of claim 16, wherein the second slot includes an open side and a closed side, the closed side being closed by a sidewall, and wherein a distance between the sidewall and the plurality of card reader contacts establishes an appropriate position of the plurality of card reader contacts to read the portion of the plurality of financial transaction card contacts.

18. The financial transaction card reader device of claim 16, wherein the circuitry is further configured to communicate with an integrated circuit embedded in the financial transaction card through the portion of the plurality of financial transaction card contacts.

* * * * *